(12) United States Patent
Chavva et al.

(10) Patent No.: US 12,119,914 B2
(45) Date of Patent: Oct. 15, 2024

(54) METHOD AND APPARATUS FOR SELECTING BEAM PAIRS IN A BEAMFORMING BASED COMMUNICATION SYSTEM

(71) Applicants: Samsung Electronics Co., Ltd., Suwon-si (KR); INDIAN INSTITUTE OF SCIENCE, BANGALORE, Bangalore (IN)

(72) Inventors: Ashok Kumar Reddy Chavva, Bangalore (IN); Neelesh B Mehta, Bangalore (IN); Shubham Khunteta, Bangalore (IN); Sripada Kadambar, Bangalore (IN); Anirudh Reddy Godala, Bangalore (IN); Chaiman Lim, Suwon-si (KR)

(73) Assignees: Samsung Electronics Co., Ltd., Suwon-si (KR); INDIAN INSTITUTE OF SCIENCE, BANGALORE, Bangalore (IN)

( * ) Notice: Subject to any disclaimer, the term of this patent is extended or adjusted under 35 U.S.C. 154(b) by 422 days.

(21) Appl. No.: 17/726,129

(22) Filed: Apr. 21, 2022

(65) Prior Publication Data
US 2022/0255611 A1 Aug. 11, 2022

Related U.S. Application Data

(63) Continuation of application No. PCT/KR2021/008997, filed on Jul. 13, 2021.

(30) Foreign Application Priority Data

Jul. 13, 2020 (IN) .............................. 202041029783

(51) Int. Cl.
*H04B 7/06* (2006.01)
*H04B 17/318* (2015.01)

(52) U.S. Cl.
CPC ......... *H04B 7/0695* (2013.01); *H04B 17/318* (2015.01)

(58) Field of Classification Search
CPC .... H04B 7/0695; H04B 17/318; H04B 7/088; H04B 17/382
See application file for complete search history.

(56) References Cited

U.S. PATENT DOCUMENTS

2018/0131434 A1* 5/2018 Islam .................... H04B 7/0408
2018/0199226 A1* 7/2018 Tsai ....................... H04W 24/10
(Continued)

OTHER PUBLICATIONS

Rappaport et al., Millimeter wave mobile communications for 5G cellular: It will work!, May 10, 2013.
(Continued)

*Primary Examiner* — Tejis Daya
(74) *Attorney, Agent, or Firm* — Jefferson IP Law, LLP

(57) ABSTRACT

A method is provided. The method includes receiving, by a User Equipment (UE), a plurality of transmit (Tx) beams from a Base Station (BS), on a plurality of receive (Rx) beams. The method includes determining the beam parameters associated with a plurality of Tx and Rx beam pairs changing at a frequency above a first threshold. The method includes deriving a beam selection metric for the plurality of Tx and Rx beam pairs using the associated beam parameters. The method includes identifying a subset of Tx and Rx beam pairs from the plurality of Tx and Rx beam pairs with the beam selection metric above a second threshold. The method includes prioritizing scanning of the identified subset of Tx and Rx beam pairs to select a Tx and Rx beam pair for communication.

20 Claims, 25 Drawing Sheets

(56) References Cited

U.S. PATENT DOCUMENTS

| | | | |
|---|---|---|---|
| 2018/0368149 A1 | 12/2018 | Raghavan et al. | |
| 2019/0052331 A1* | 2/2019 | Chang | H04B 7/08 |
| 2019/0238202 A1 | 8/2019 | Chavva et al. | |
| 2019/0342871 A1* | 11/2019 | Tang | H04B 17/309 |
| 2020/0163073 A1 | 5/2020 | Li et al. | |
| 2020/0204242 A1 | 6/2020 | Zhou et al. | |
| 2020/0212991 A1 | 7/2020 | Cho et al. | |

OTHER PUBLICATIONS

Rangan et al., Millimeter-wave cellular wireless networks: Potentials and challenges, Jan. 11, 2014.
Heath Jr et al., An overview of signal processing techniques for millimeter wave MIMO systems, Dec. 9, 2015.
Giordani et al., A tutorial on beam management for 3GPP NR at mmWave frequencies, Nov. 4, 2019.
3GPP, TS 38.211, v15.6.0 NR—Physical channels and modulation, Jun. 24, 2019.
3GPP TS 38.213, v15.6.0 NR—Physical layer procedures for control, Jun. 24, 2019.
Qi et al., Three-dimensional millimetre-wave beam tracking based on smart phone sensor measurements and direction of arrival/time of arrival estimation for 5G networks, Jan. 1, 2018.
Jeong et al., Random access in millimeter-wave beamforming cellular networks: Issues and approaches, Jan. 1, 2015.
Giordani et al., Comparative analysis of initial access techniques in 5G mmWave cellular networks, Apr. 30, 2016.
Li et al., Beam management in millimeter-wave communications for 5G and beyond, Dec. 1, 2019.
Garcia et al., Fast in-band position-aided beam selection in millimeter-wave MIMO, Aug. 13, 2019.
Zhang et al., Beam allocation for millimeter-wave MIMO tracking systems, Jul. 1, 2019.
Lee et al., Efficient channel AoA/AOD estimation using wide beams for millimeter wave MIMO systems, May 10, 2019.
Va et al., Online learning for position-aided millimeter wave beam training, Jan. 11, 2019.
Polese et al., Improved handover through dual connectivity in 5G mmWave mobile networks, Jul. 17, 2017.
Akdeniz et al., Millimeter wave channel modeling and cellular capacity evaluation, Apr. 25, 2014.
Simon et al., Digital Communication over Fading Channels, A Unified Approach to Performance Analysis, Jan. 1, 2000.
Polese et al., Impact of channel models on the end-to-end performance of mmwave cellular networks, Jun. 15, 2018.
Andrews et al., Modeling and analyzing millimeter wave cellular systems, May 13, 2016.
Hashemi et al., Efficient Beam Alignment in Millimeter Wave Systems Using Contextual Bandits, Dec. 22, 2017.
Abramowitz et al., Handbook of Mathematical Functions with Formulas, Graphs, and Mathematical Tables, Jun. 1, 1964.
Le et al., On the Throughput Performance of TCP Cubic in Millimeter-Wave Cellular Networks, Dec. 23, 2019.
Nakagami, The m-distribution—a general formula of intensity distribution of rapid fading, Jan. 1, 1955.
Gradshteyn et al., Tables of Integrals, Series and Products, Jan. 1, 2007.

* cited by examiner

METHOD AND APPARATUS FOR SELECTING BEAM PAIRS IN A BEAMFORMING BASED COMMUNICATION SYSTEM

CROSS-REFERENCE TO RELATED APPLICATION(S)

This application is a continuation application, claiming priority under § 365(c), of an International application No. PCT/KR2021/008997, filed on Jul. 13, 2021, which is based on and claims the benefit of an Indian patent application number 202041029783, filed on Jul. 13, 2020, in the Indian Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd., and 2) Indian Institute of Science, Bangalore.

BACKGROUND

1. Field

The disclosure relates to the field of beamforming-based communication systems. More particularly, the disclosure relates to selecting a beam pair in a beamforming-based communication system based on a beam selection metric.

2. Description of Related Art

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a 'beyond 4G network' or a 'post long term evolution (LTE) system'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In the quest to provide higher throughputs and accommodate a large number of mobile devices, a 5G cellular communication technology has moved towards the mmWave bands, where larger bandwidths are available. However, communication in the mmWave bands may be subjected to challenges such as, but are not limited to, severe propagation loss, attenuation from atmospheric gases and precipitation, line-of-sight (LoS) blockage and scattering, diffraction, and so on.

Beamforming with antenna arrays address the above-described challenges. A small wavelength allows implementation of the antenna arrays with a large number of antennas at both a base station (BS) and a user equipment (UE). The antenna arrays with the large number of antennas may result in narrow beams with large array gains, which compensates for the severe propagation loss. However, the narrow beams require accurate alignment. Further, in case of the implementation of the antenna arrays with the large number of antennas, a number of transmit (Tx) and receive (Rx) beam pairs to cover a full angular space in elevation and azimuth increases.

In order to allow the UE to estimate channel gain on each transmit-receive beam pair, the BS has to periodically send out reference signals on all the Tx beams. For example, in a 5G New Radio (NR) standard, the BS periodically transmits the synchronization signal block (SSB) or channel state information reference signals (CSI-RS) on each Tx beam of interest sequentially. During an initial beam acquisition, the UE uses the SSBs transmitted by the BS. Subsequently, during the connected mode, the UE uses the CSI-RS along with the SSBs for beam tracking and selection. For initial beam acquisition, the BS transmits the SSBs from all the Tx beams in an SSB burst of duration 5 milliseconds (ms). Thereby, allowing the UE to measure the channel gains from all the Tx beams to one of the Rx beams in an SSB burst. Thus, to estimate the channel gains of all the Tx and Rx beam pairs, multiple SSB bursts are required, one for each UE Rx beam. The SSB bursts are transmitted with a period that ranges from 5 ms to 160 ms. Thus, the initial beam acquisition may require a considerable amount of time. Therefore, a difference between the time of transmission of the reference signal and the time at which the Tx and Rx beam pair is selected depends on the Tx and Rx beam pair. Consequently, channel estimates obtained for the different Tx and Rx beam pairs may be outdated by different extents in a time-varying environment.

During the connected mode, the UE has to report its beam measurements periodically to the BS. Based on the reported beam measurements by the UE, the BS reselects the Tx beam and transmits data to the UE on the reselected Tx beam. In addition, the UE periodically feeds back-channel quality information (CQI) to the BS, which allows the BS to adjust its modulation and coding scheme (MCS) and data rate. The BS adjusts the MCS and the data rate at a rate faster than a rate at which the beam measurements are fed back.

In addition, a change in an orientation of the UE relative to the serving BS poses another new challenge. Typical user movements may change the orientation of the UE at a rate that ranges from 600/s to 1100/s. For example, in gaming scenarios, the orientation of the UE can even go up to 8000/s, which occurs even in nomadic, low mobility environments. The change in the orientation of the UE not only exacerbate the time variations in the channel, but also leads to a beam misalignment, which causes a change in a mean channel power of the serving Tx and Rx beam channel gain. This requires frequent beam selection and orientation tracking, as a radio link quality would degrade rapidly otherwise.

The communication system with mmWave bands further requires the beamforming (with the antenna arrays) to recover from excessive path loss, as continuous alignment of Tx and Rx beams may be required for maintaining the radio link. The beamforming is required due beam change due to the change in orientation of the UE. An amount of time spent on finding a new optimum beam is proportional to a product of number of beams at transmission and reception. The amount of time spent on finding the new beam is significantly intensive, which may lead to high power consumption and throughput degradation.

Various methods used for selecting the Tx and Rx beam pair/beam are, according to the related art, as follows:
  performing an exhaustive search based on the importance of beamforming and beam selection to select the Tx and Rx beam pair. In accordance with the exhaustive search, the UE sequentially measures all Tx and Rx beam pairs to select the Tx and Rx beam pair, which maximizes signal-to-noise ratio (SNR);
  performing a two-step iterative beam search method to select the beam. In accordance with the two-step iterative beam search, the BS sends reference signals using wide beams in a first step and then using narrow beams in a second step. The UE selects the beam that maximizes the SNR;
  selecting the beam based on signal to interference plus noise ratio (SINR) and a reference signal of the received power measured at both the UE and the BS;
  estimating an angle of arrival (AoA) and tracking the beam by measuring the received signal at specific pre-defined perturbations to the beam pattern;
  selecting the beam using capacity-based beam selection methods with respect to multiple-input multiple output (MIMO) channels;
  separating users into interfering and non-interfering users, assigning the beams to non-interfering users first, and subsequently assigning the beams to the interfering users;
  using LoS and non-LoS (NLoS) paths to estimate the position of the UE and then to select the beam;
  training the same Tx and Rx beam pair multiple times to improve the received signal powers in a specific direction and maximize the probability of tracking the beam pair that is aligned;
  obtaining high resolution AoA and angle of departure (AoD) estimates using the wide beam and then orienting the wide beam in an estimated direction to select the beam;
  using multi-armed bandit-based approaches for beam selection;
  selecting the beam or the beam pair with the highest SNR or measured signal power; and
  using a numerical ray-tracing method to select the beam.

However, the above-described conventional methods do not consider a time varying nature of the channel and channel measurements of the different beams for selecting the Tx and Rx beam pair. In some of the above-described conventional methods, only NLoS paths may be considered without a model for measurement and data transmission.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for selecting a transmit (Tx) and receive (Rx) beam pair over a time-varying channel.

Another aspect of the disclosure is to provide methods and systems for configuring a statistical model based on dynamically changing beam parameters associated with each of a plurality of Tx and Rx beam pairs.

Another aspect of the disclosure is to provide methods and systems for deriving a beam selection metric for each Tx and Rx beam pair using the configured statistical model.

Another aspect of the disclosure is to provide methods and systems for identifying a subset of Tx and Rx beam pairs from the plurality of Tx and Rx beam pairs using the beam selection metric and prioritizing scheduling of the identified subset of Tx and Rx beam pairs to select the Tx and Rx beam pair for communication.

Additional aspects will be set forth in part in the description which follows and, in part, will be apparent from the description, or may be learned by practice of the presented embodiments.

In accordance with an aspect of the disclosure, methods and systems for selecting beam pairs in a beamforming-based communication system are provided. The method includes receiving, by a user equipment (UE), a plurality of transmit (Tx) beams from a base station (BS), on a plurality of receive (Rx) beams. The method includes determining, by the UE, beam parameters associated with a plurality of Tx and Rx beam pairs changing at a frequency above a first threshold. The method includes deriving, by the UE, a beam selection metric for the plurality of Tx and Rx beam pairs using the associated beam parameters. The method includes identifying, by the UE, a subset of Tx and Rx beam pairs from the plurality of Tx and Rx beam pairs with the beam selection metric above a second threshold. The method includes prioritizing scanning of the identified subset of Tx and Rx beam pairs to select a Tx and Rx beam pair for communication.

Accordingly, the embodiments herein provide the method further comprises at least one of reporting, by the UE, the selected Tx and Rx beam pair to the BS for reselecting at least one Tx beam to transmit data to the UE, and prioritizing, by the UE, beam measurements in at least one beam measurement scenario based on the selected Tx and Rx beam pair.

Accordingly, the embodiments herein provide the beam parameters including at least one of, channel gain, an orientation of the UE, a beam gain pattern, an angle of arrival (AoA) of the Tx beams, channel gain measurement, and channel correlation in time, the first threshold indicates a time-varying nature of a channel over that the UE receives the Tx beams, and the second threshold is a beam selection metric value defined by monitoring the beam selection metric associated with at least one Tx and Rx beam pair from a sorted list of beam selection metric associated with the plurality of Tx and Rx beam pairs in a descending order.

Accordingly, the embodiments herein provide determining the orientation of the UE includes receiving raw sensor data associated with the UE from at least one sensor, and combining the received sensor data using a sensor fusion method to determine the orientation of the UE.

Accordingly, the embodiments herein provide determining the orientation of the UE further includes determining a difference between a currently sensed raw sensor data and a previously sensed raw sensor data by the at least one sensor, computing a variance using the determined difference, comparing the variance with an anomaly threshold, detecting absence of an anomaly in the at least one sensor, if the variance is lesser than the anomaly threshold, and detecting presence of the anomaly in the at least one sensor and allowing a round-robin based beam tracking to select the Tx and Rx beam pair for the communication, if the variance is greater than the anomaly threshold.

Accordingly, the embodiments herein provide determining the AoA includes defining an AoA monitor time window, monitoring the plurality of Tx and Rx beam pairs and measuring RSRP values and corresponding orientation of the UE for each of the Tx and Rx beams during the AoA monitor time window, storing the highest RSRP values among the measured RSRP values and the corresponding orientation of the UE for each Tx and Rx beam monitored during the AoA monitor time window, averaging the highest RSRP values and determining a beam index using the averaged RSRP values, determining the AoA using the beam index and the orientation of the UE, wherein the determined AoA is in a Local coordinate system, and converting the AoA in the local coordinate system (LCS) to an AoA in a global coordinate system using the stored orientation of the UE.

Accordingly, the embodiments herein provide determining the beam parameters includes determining the beam parameters associated with each of the plurality of Tx and Rx beam pairs at a first-time instance, wherein the first-time instance is time at which beam measurements are received by the UE for each Tx and Rx beam pair.

Accordingly, the embodiments herein provide deriving the beam selection metric includes determining subsequent beam parameters associated with each of the plurality of Tx and Rx beam pairs at a second-time instance, wherein the second-time instance is time at which the UE wants to select the Tx and Rx beam pair or time at which the UE wants to receive the data from the BS or to transmit the data to the BS, configuring a statistical model to characterize joint statistics of the beam parameters of each Tx and Rx beam pair determined at the first-time instance and the subsequent beam parameters of each Tx and Rx beam pair determined at the second-time instance, and deriving the beam selection metric for each Tx and Rx beam pair based on the configured statistical model.

Accordingly, the embodiments herein provide the beam parameters of each Tx and Rx beam pair determined at the first-time instance and the subsequent beam parameters of each Tx and Rx beam pair determined at the second-time instance is non-negatively correlated, or the beam parameters of each Tx and Rx beam pair determined at the first-time instance and the subsequent beam parameters of each Tx and Rx beam pair determined at the second-time instance is negatively correlated.

Accordingly, the embodiments herein provide that the statistical model is one of a bivariate probability density function (PDF) model, a PDF model, and a modified bivariate Nakagami-m (MBN) model.

Accordingly, the embodiments herein provide that the statistical model is a function of at least one of, mean channel power, power correlation coefficient and a first set of parameters, wherein the power correlation coefficient is based on the orientation of the UE, speed, and a second set of parameters.

Accordingly, the embodiments herein provide deriving the beam selection metric using the configured statistical model includes measuring a third set of parameters corresponding to each Tx and Rx beam pair, utilizing the configured statistical model to derive the beam selection metric for each Tx and Rx beam pair based on the third set of parameters, if the beam parameters of each Tx and Rx beam pair determined at the first-time instance and the subsequent beam parameters of each Tx and Rx beam pair determined at the second-time instance is non-negatively correlated, and utilizing the configured statistical model to derive the beam selection metric for each Tx and Rx beam pair based on the third set of parameters and a constant (a), if the beam parameters of each Tx and Rx beam pair determined at the first-time instance and the subsequent beam parameters of each Tx and Rx beam pair determined at the second-time instance is negatively correlated.

Accordingly, the embodiments herein provide the third set of parameters include at least one of, an average channel gain measured at the first-time instance, an average channel power gain measured at the second-time instance, a correlation between the channel gain measured at the first-time instance and the subsequent channel gain measured at the second-time instance and channel power measurement.

Accordingly, the embodiments herein provide deriving the beam selection metric further including deriving a bound-based selection rule for both the non-negatively and negatively correlated beam parameters of each Tx and Rx beam pair determined at the first-time instance and the second-time instance, based on the beam selection metric and a fourth set of parameters, wherein the fourth set of parameters includes at least one of, the orientation of the UE, the speed, and previous history of beam parameter estimates.

Accordingly, the embodiments herein provide the method further comprises detecting, by the UE, presence of a Transmission Configuration Indicator (TCI) field in Downlink (DL)-related Downlink Control Information (DCI) configured on the UE, selecting, by the UE at least one Tx and Rx beam pair for DL transmissions from the plurality of Tx and Rx beam pairs indicated by the TCI field in the DCI, using the beam selection metric, and selecting, by the UE, the least one Tx and Rx beam pair for the DL transmissions from the plurality of Tx and Rx beam pairs that are not indicated by the TCI field in the DCI, using the round-robin based beam tracking.

Accordingly, the embodiments herein provide the method further comprises storing the beam selection metric of each Tx and Rx beam pair and the selected Tx and Rx beam pair in a memory and transitioning into a sleep state, on receiving a connected mode discontinuous reception (CDRX) sleep initiation signal, resetting the selection of the Tx and Rx beam pair, if a sleep duration is greater than a sleep threshold, and exiting from the sleep state and continuing the selection of the Tx and Rx beam pair for the communication, on receiving a CDRX wakeup initiation signal.

Accordingly, the embodiments herein provide the method further comprises adding the identified subset of Tx and Rx beam pairs based on the beam selection metric in a prioritized queue, adding other Tx and Rx beam pairs of the plurality Tx and Rx beam pairs in a starvation queue, and scheduling the scanning of Tx and Rx beams present in the starvation queue, after scanning a defined number of Tx and Rx beam pairs from the subset of Tx and Rx beam pairs present in a prioritized queue, wherein the number of Tx and Rx beam pairs is defined based on a starvation cycle parameter.

Accordingly, the embodiments herein provide the method further comprises computing a serving module metric (SM) for a currently serving radio frequency (RF) module and another module metric (OM) for non-serving RF modules of a plurality of RF modules, comparing a ratio of the SM to the OM with a module metric threshold, and selecting the RF module associated with highest RSRP values among the plurality of RF modules for the communication, if the ratio of the SM to the OM is greater than the module metric threshold.

In accordance with another aspect of the disclosure, a user equipment (UE) in a beamforming-based communication system is provided. The UE includes a radio frequency (RF) module configured to receive a plurality of transmit (Tx) beams from a base station (BS), on a plurality of receive (Rx) beams. The UE further includes a control processor (CP) coupled to the RF module configured to determine beam parameters associated with a plurality of Tx and Rx beam pairs changing at a frequency above a first threshold. The CP is configured to derive a beam selection metric for the plurality of Tx and Rx beam pairs using the associated beam parameters. The CP is configured to identify a subset of Tx and Rx beam pairs from the plurality of Tx and Rx beam pairs with the beam selection metric above a second threshold. The CP is configured to prioritize scanning of the identified subset of Tx and Rx beam pairs to select a Tx and Rx beam pair for communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be apparent from the following description taken in conjunction with the accompanying drawings, in which.

The same reference numerals are used to represent the same elements throughout the drawings.

DETAILED DESCRIPTION

Figure 1:
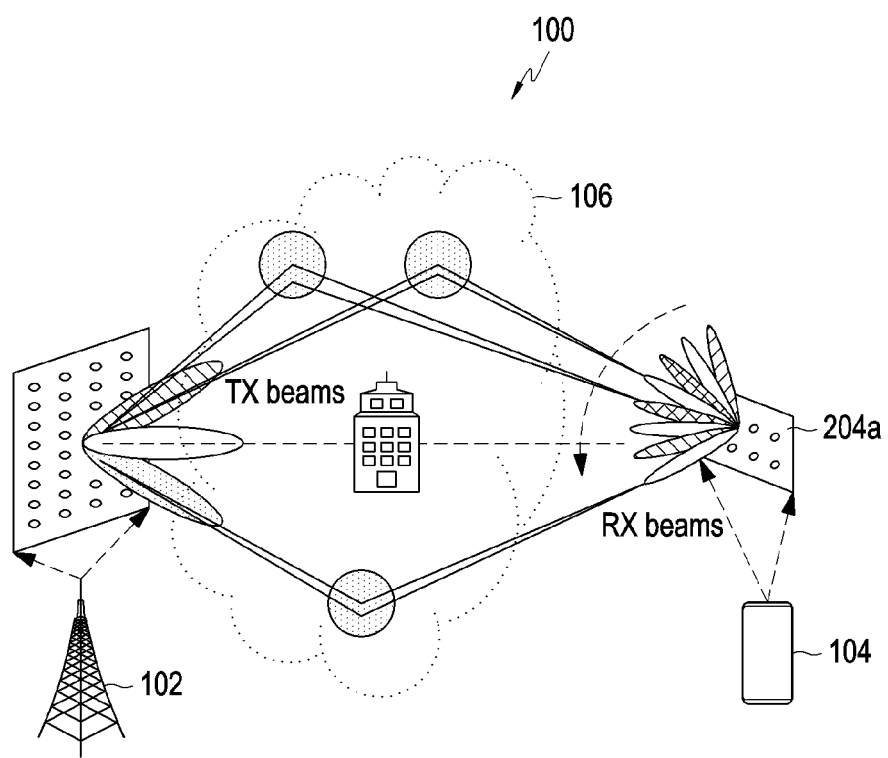
FIG. 1 depicts a communication system/beamforming based-communication system, according to an embodiment of the disclosure.

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terms and names as defined in the 5G system standard are used herein for ease of description, embodiments of the disclosure are not limited thereto or thereby, and the same may apply likewise to systems conforming to other standards.

Hereinafter, embodiments of the disclosure are described in detail with reference to the accompanying drawings. When making the gist of the disclosure unnecessarily unclear, the detailed description of known functions or configurations is skipped.

The electronic device according to various embodiments may be one of various types of electronic devices. The electronic devices may include, for example, a portable communication device (e.g., a smart phone), a portable multimedia device, a portable medical device, a camera, a wearable device, or a home appliance. According to an embodiment of the disclosure, the electronic device is not limited to the above-listed embodiments. It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It may be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2$^{nd}$," or "first" and "second" may be used to simply distinguish a corresponding component from another and does not limit the components in other aspect (e.g., importance or order). It may be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. According to an embodiment, a module may be implemented in the form of an application-specific integrated circuit (ASIC).

Various embodiments as set forth herein may be implemented as software (e.g., a program) including one or more instructions that are stored in a storage medium (e.g., internal memory or external memory) that is readable by the electronic device. For example, a processor of the electronic device may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the electronic device may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM) or digital video disc (DVD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Embodiments herein disclose methods and systems for selecting a transmit (Tx) and receive (Rx) beam pair in a beamforming-based communication system.

Referring now to the drawings, and more particularly to FIGS. 1 through 16, where similar reference characters denote corresponding features consistently throughout the figures, there are shown example embodiments.

FIG. 1 depicts a communication system/beamforming based-communication system, according to an embodiment of the disclosure.

Referring to FIG. 1, a beamforming-based communication system 100 can support communication in millimeter wave (mmWave) frequency bands by performing beamforming, thereby providing high throughput and low latency. The mmWave frequency bands can be Extremely High Frequency (EHF) bands as defined by International Telecommunications Union (ITU). In an example, the communication involves at least one of, but not limited to, broadcast signals, data plane messages, control signaling, control plane messages, and so on. Examples of the beamforming-based communication system 100 may be, but are not limited to, a $5^{th}$-Generation (5G) New Radio (NR) network/system, an mmWave based communication system, a terahertz (THz) wireless system or any other next generation networks capable of performing the beamforming for the communication.

The beamforming-based communication system 100 includes at least one base station (BS) 102, and at least one user equipment (UE) 104.

The BS/Radio Access Network (RAN) (e.g., BS 102) referred herein may be nodes such as, but are not limited to, next generation nodes (gNBs), or the like. The BS 102 may be configured to connect the UE 104 with a core network (CN) (not shown). The CN creates bearers for routing data/traffic between a particular gateway in the CN and the UE 104. Examples of the data referred herein can be, but not limited to, voice packets, video packets, data packets, and so on.

The UE 104 referred herein may be a user device capable of performing the beamforming to communicate with the BS 102. Examples of the UE 104 may be, but are not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a universal serial bus (USB) dongle, or any other processing devices capable of performing the beamforming.

In the beamforming-based communication system 100, the BS 102 and the UE 104 support directional communication by performing the beamforming. The BS 102 uses uniform rectangular arrays (URA) to perform the beamforming. The URA may include one or more antenna elements/ports arranged in a grid. The URA may also include antenna arrays including a plurality of antenna elements. The BS 102 uses the one or more antenna elements of the URA to form beams having different widths. Examples of the beams may be, but are not limited to, wider beams, narrow beams, and so on. The beams may be in various shapes or patterns. The shapes or patterns of the beams may be regular. The shapes or patterns of the beams may also be irregular. In an example herein, the shapes or patterns of the beams may include at least one of, but is not limited to, a pencil beam shape, a cone beam shape, an irregular main lobe with side lobes, and so on. In an embodiment, the beams transmitted by the BS 102 are referred to hereinafter as transmission/transmit (Tx) beams.

The BS 102 may transmit at least one of, but is not limited to, downlink control channel information, broadcast signals and messages, broadcast data channels, multicast and unicast data, control signals and messages, and so on (hereinafter collectively referred to as signals) to the UE 104 in the Tx beams. The BS 102 transmits the signals in the Tx beams over at least one transmit path of an mmWave channel 106 in different directions.

Similarly, the UE 104 uses a URA 204a to perform the beamforming. The URA 204a may include one or more antenna elements/ports arranged in a grid. The URA 204a may also include antenna arrays including a plurality of antenna elements. The UE 104 uses the antenna elements of the URA to form beams with different widths (e.g., wider beams, narrow beams, etc.) at specific orientations/directions. In an embodiment, the beams formed at the UE 104 are referred to hereinafter as receive (Rx) beams. The UE 104 receives the signals transmitted in the Tx beams by the BS 102 on the formed one or more Rx beams in the specific orientation (an angle of arrival (AoA)) over receive paths of the mmWave channel 106.

In an embodiment, the UE 104 may be configured to select a Tx and Rx beam pair among a plurality of Tx and Rx beam pairs for the communication over the mmWave channel 106 that varies in time (referred hereinafter as a time-varying channel) due to mobility/orientation of the UE 104. The plurality of Tx and Rx beam pairs refers to a mapping of the Tx beams received from the BS 102 with the corresponding Rx beams formed on the UE 104 to receive the signals transmitted in the Tx beams.

For selecting the Tx and Rx beam pair, the UE 104 determines beam parameters associated with each of the plurality of Tx and Rx beam pairs changing at a frequency above a first threshold. Examples of the beam parameters may be, but are not limited to, channel gain/Reference Signal Received Power (RSRP) value, an orientation of the UE, a beam gain pattern, a direction of arrival of signal estimate/angle of arrival (AoA), channel gain measurement, and channel correlation in time. The first threshold depicts a threshold frequency identifying the time-varying channel. In an example, the UE 104 defines the first threshold by monitoring a number of channel gain variation cycles within a duration of time or channel gain level crossing rate. Embodiments herein use the terms "first threshold," "frequency threshold," and so on, interchangeably to refer to the frequency that identifies the time-varying channel. The UE 104 uses the one or more sensors to determine the orientation (an example beam parameter). The UE 104 uses the received signals from the BS in the Tx beams to measure the other beam parameters.

The UE 104 derives the beam selection metric for each of the plurality of Tx and Rx beam pairs using the associated beam parameters. The beam selection metric is a beam selection rule depicting the mapping from the beam parameters to the Tx and Rx beam pair. Deriving the beam selection metric is described in detail in conjunction with FIGS. 2A-2C, and 3.

On deriving the beam selection metric, the UE 104 identifies a subset of Tx and Rx beam pairs from the plurality of Tx and Rx beam pairs with the beam selection metric above a second threshold. The second threshold depicts a beam selection metric value. In an example, for defining the second threshold, the UE 104 forms a list of the beam selection metrics derived for the plurality of Tx and Rx beam pairs and sorts the list of the beam selection metrics in a descending order. The UE 104 defines the second threshold by monitoring the one or more beam selection metrics of the Tx and Rx beam pairs in the sorted list, which have the highest values compared to the other beam selection metrics of the other Tx and Rx beam pairs. Embodiments herein use terms such as "second threshold," "beam selection metric threshold," and so on, interchangeably to refer to a beam selection metric value defined by monitoring the beam selection metrics for top few Tx and Rx beam pairs from the sorted list of beam selection metrics.

The UE 104 prioritizes scanning/scheduling of the identified subset of Tx and Rx beam pairs to select the Tx and Rx beam pair for the communication. Scanning/scheduling of the Tx and Rx beam pairs is referred to as a beam scheduling throughout the document. In the prioritized scanning, the UE 104 measures RSRP value associated with each of the identified subset of the Tx and Rx beam pairs one by one or in an incremental cycle. The UE 104 selects one of the Tx and Rx beam pairs associated with the RSRP value greater than a defined RSRP threshold for the communication. The UE 104 defines the RSRP threshold by choosing the highest RSRP value measured among the Tx and Rx beam pairs. The UE 104 defines the RSRP threshold to maintain a sustainable communication link between the BS 102 and the UE 104.

The UE 104 reports the selected Tx and Rx beam pair to the BS 102. Alternatively, the UE 104 prioritizes beam measurements in at least one subsequent beam measurement scenario based on the selected Tx and Rx beam pair. The BS 102 may be configured to reselect the Tx beam based on the reported Tx and Rx beam pair by the UE 104 and transmits the data to the UE 104 on the reselected Tx beam.

In an embodiment, the UE 104 may also be configured to perform one or more functions such as:
- manage selection of Tx and Rx beam pairs for downlink transmissions. Thereby optimizing complexity of the prioritized scheduling for Physical Downlink Shared Channel (PDSCH) receptions. The Tx and Rx beam pairs used for the DL transmissions may be referred herein to as DL beams through the document;
- manage selection of Tx and Rx beam pairs for uplink (UL) transmissions. Thereby optimizing the complexity of the prioritized scheduling of Physical Uplink Shared Channel (PUSCH) transmissions. The Tx and Rx beam pairs used for the UL transmissions may be referred herein to as UL beams through the document;
- manage Connected mode Discontinuous Reception (CDRX) cycles, while selecting the Tx and Rx beam pairs for the communication;
- handle measurement starvation of the Tx and Rx beam pairs during the prioritized beam scheduling;
- detect failure/anomaly in the one or more sensors and accordingly select the subset of Tx and Rx beam pairs for the prioritized beam scheduling; and
- manage selection of a Radio Frequency (RF) module for the communication. The above stated one or more functions of the UE 104 are described in detail in conjunction with FIGS. 2A to 2C.

Referring to FIG. 1, various units of a beamforming-based communication system 100 are shown, but it is to be understood that other embodiments are not limited thereon. In other embodiments, the beamforming-based communication system 100 may include less or more number of units. Further, the labels or names of the units are used only for illustrative purpose and does not limit the scope of the embodiments herein. One or more units can be combined together to perform same or substantially similar function in the beamforming-based communication system.

Figure 2A:
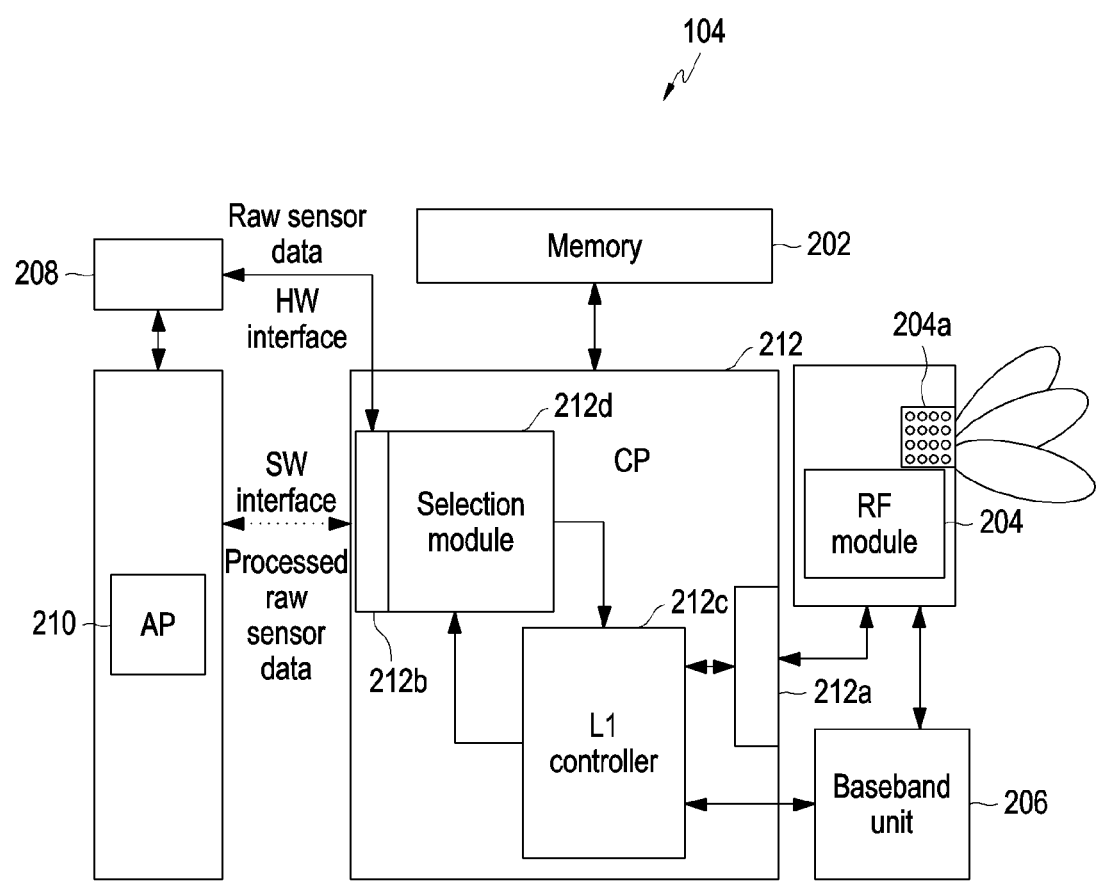
FIGS. 2A, 2B, and 2C are example block diagrams depicting various components of a user equipment (UE), according to various embodiments of the disclosure.
Figure 2B:
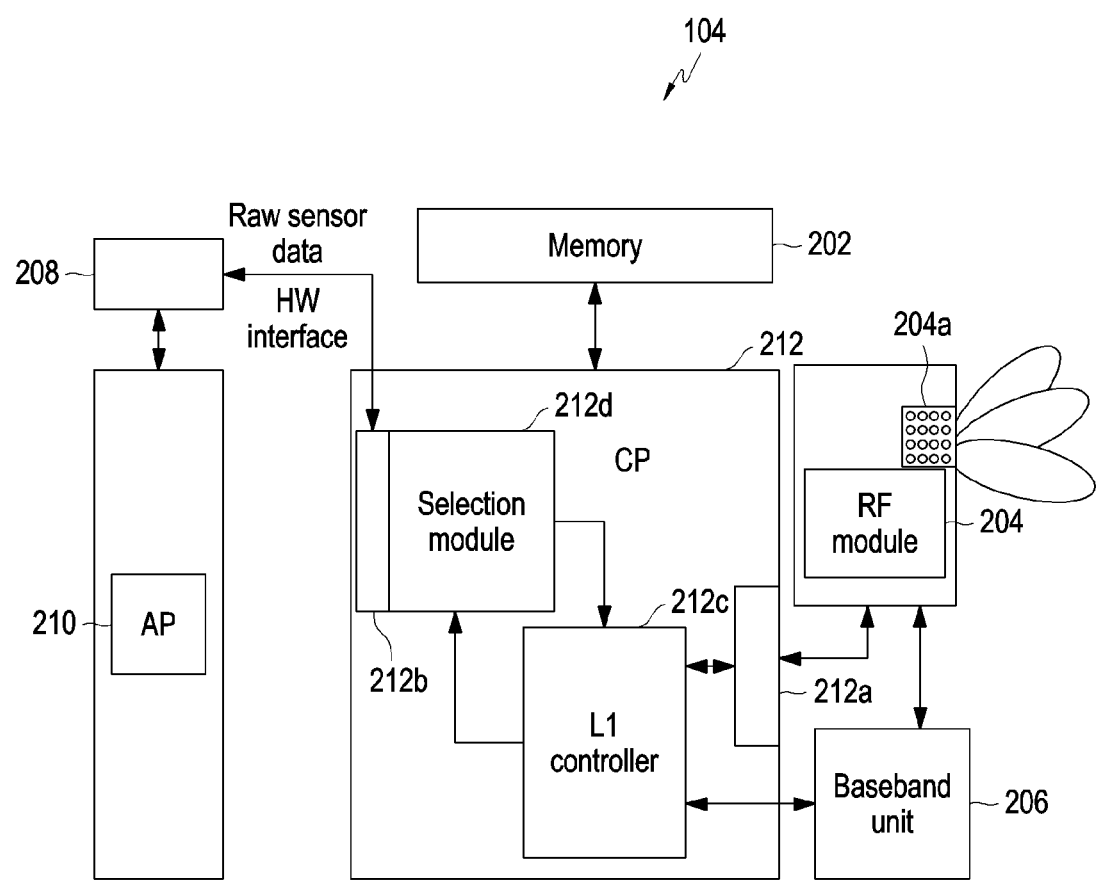
Figure 2C:
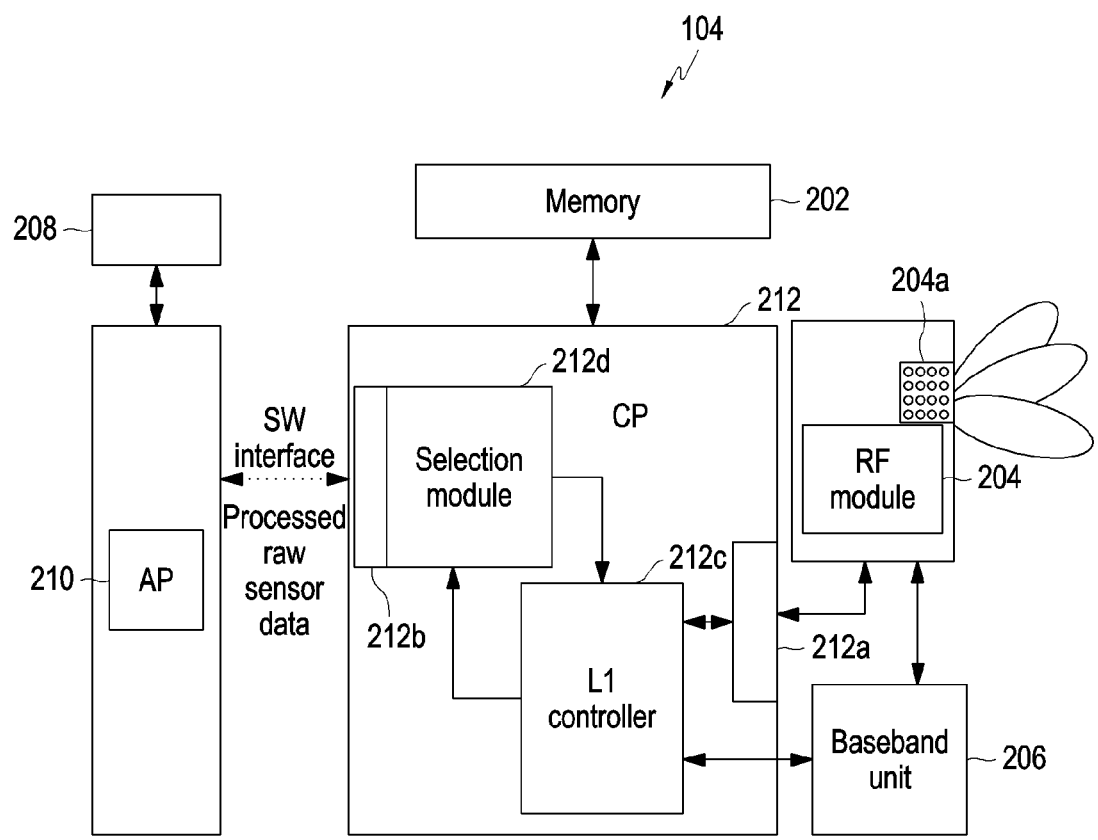

FIGS. 2A, 2B, and 2C are example block diagrams depicting various components of a UE, according to embodiments as disclosed herein.

Referring to FIGS. 2A to 2C, a UE 104 includes a memory 202, a radio frequency (RF) module 204 with a URA 204a, a baseband unit 206, a sensor unit 208, an application processor (AP) 210, and a control processor (CP) 212. The UE 104 may include one or more RF modules 204 for the data transmissions and receptions.

The memory 202 may store at least one of, information about the antenna elements, the beam parameters, the beam selection metric, the selected Tx and Rx beam, the first threshold, the second threshold, the RSRP threshold, a sensor data-based queue, an AoA monitor time window, and so on. Further, the memory 202 may include one or more computer-readable storage media. The memory 202 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in random access memory (RAM) or cache).

The URA 204a of the RF module 204 includes the one or more antenna elements, which can be arranged in the grid. The antenna elements may be used to form the Rx beams with different widths, so that the UE 104 can receive the signals/Tx beams from the BS 102 on the formed Rx beams.

The baseband unit 206 may be configured to receive the signals transmitted by the BS 102 over the Tx beams through the RF module 204, convert the received signals into digital signals and provide the digital signals to the CP 212. The baseband unit 206 may also be configured to receive the digital signals from the CP 212 (for example, depicting the selected Tx and Rx beam pair), convert the digital signals to the RF signals and transmit the RF signals to the BS 102 through the RF module 204.

The sensor unit 208 includes one or more sensors such as, but are not limited to, an accelerometer, a gyroscope, a magnetometer, a grip sensor, and so on. The one or more sensors of the sensor unit 208 may be configured to sense raw data (referred hereinafter raw sensor data) associated with the UE 104. A function of each of the sensors referred herein may be intuitively inferred by one of ordinary skill in the art based on its name, and thus, its detailed description is omitted.

The sensor unit 208 may provide the raw sensor data to the CP 212 through a hardware (HW) interface, as depicted in FIG. 2B. Alternatively, the sensor unit 208 may provide the raw sensor data to the AP 210 through a software (SW) interface, as depicted in FIG. 2C. The sensor unit 208 may provide the raw sensor data to the AP 210 or the CP 212, based on a mode of the UE 104. The UE 104 may operate in an AP sensor mode (as depicted in FIG. 2C) or a CP sensor mode (as depicted in FIG. 2B). In the AP sensor mode, the sensor unit 208/sensors of the sensor unit 208 may provide the raw sensor data to the AP 210. In the CP sensor mode, the sensor unit 208/sensors of the sensor unit 208 may provide the raw sensor data to the CP 212.

The AP 210 may be configured to pre-process the received raw sensor data of the UE 104 from the sensor unit 208. The AP 210 provides the pre-processed raw sensor data to the CP 212 through the SW interface. The AP 210 may be allowed to collect and pre-process the raw sensor data from the sensor unit 208, when the UE 104 is in the AP sensor mode (as depicted in FIG. 2C).

The CP 212 includes at least one of, a single processor, a plurality of processors, multiple homogeneous or heterogeneous cores, multiple Central Processing Units (CPUs) of different kinds, microcontrollers, special media, and other accelerators.

The CP 212 includes a driver 212a, a sensor core module 212b, an L1 controller 212c, and a selection module 212d for performing one or more intended functions. The components of the CP 212 may be a combination of hardware and software modules.

The driver 212a may be configured to control operations of the L1 controller 212c, based on the Tx beams received from the BS 102.

The sensor core module 212b and the L1 controller 212c may be configured to determine the beam parameters associated with each of the plurality of Tx and Rx beam pairs. Examples of the beam parameters may be, but are not limited to, channel gain, an orientation of the UE, a beam gain pattern, a direction of arrival of signal estimate, channel gain measurement, and channel correlation in time, and so on. The beam parameters may be the parameters changing at the frequency above the first threshold (which indicates the time-varying channel). The sensor core module 212b and the L1 controller 212c determine the beam parameters for each Tx and Rx beam pair at a first-time instance. The sensor core module 212b and the L1 controller 212c determines the subsequent beam parameters for each Tx and Rx beam pair at a second-time instance. The first-time instance may be referred to determining of the beam parameters at physical downlink shared channel (PDSCH) slots. The first-time instance is a time at which the UE 104 receives beam measurements for a given beam pair. The beam measurements may be used to determine the beam parameters. The second-time instance may be referred to a subsequent measurement occasion following the PDSCH slots. The second-time instance is a time at which the UE 104 is intended to select a new Tx and Rx beam pair. Also, the second-time instance is a time in future, where the UE 104 receives the data or transmits the data. The beam parameters determined at the first-time instance and the second-time instance may be used to select the Tx and Rx beam pair.

The sensor core module 212b may be configured to determine the orientation of the UE 104 based on the raw sensor data. In an example, the sensor core module 212b receives the raw sensor data from the sensor unit 208 through the HW interface, when the UE 104 is operating in the CP sensor data mode (as depicted in FIG. 2B). In another example, the sensor core module 212b receives the raw sensor data from the AP 210 through the SW interface, when the UE 104 is operating in the AP sensor data mode. The raw sensor data received from the AP 210 may be the pre-processed raw sensor data.

The sensor core module 212b filters the raw sensor data, performs axes alignment of the raw sensor data, and determines the orientation of the UE 104. In an example, the sensor core module 212b uses a sensor fusion method to determine the orientation of the UE 104 by combining the raw sensor data received from the one or more sensors of the sensor unit 208.

The sensor core module 212b may also be configured to:
select or update type of sensors to be used for determining the orientation of the UE 104;
selectively enable or disable the sensors of the sensor unit 208;
set or update the frequency of determining the orientation of the UE using the raw sensor data; and
select or change between the AP sensor data mode and the CP sensor data mode of the UE 104 or use a combination of the AP sensor data mode and the CP sensor data mode of the UE 104 for at least one of, but is not limited to, power saving, handling SW or HW interface failures, and so on.

The L1 controller 212c may be configured to determine the beam parameters for each Tx and Rx beam pair such as, but are not limited to, the channel gain/RSRP value, the beam gain pattern, the direction of arrival of signal estimate/AoA, the channel gain measurement, the channel correlation in time, and so on, based on the signals received from the BS 102 on the Tx beams.

Embodiments herein explain the determination of an example beam parameter AoA, as an example, but it may be obvious to a person skilled in the art that any other beam parameters may be determined in a similar or different manner. The AoA parameter may be used to estimate sensor gain/beam gain. Based on the change in the orientation of the UE 104, the L1 controller 212c estimates the change in the sensor gain in the direction of AoA, where a beam heat map or the beam gain pattern is provided for the UE 104.

For determining the AoA, the L1 controller 212c initially determines a direction of a serving beam pattern peak gain of the UE 104 as the AoA. The L1 controller 212c assumes the determined AoA as constant for a period of time, since the AoA does not change until the change in the orientation of the UE 104 (the positional change in the UE 104).

Consider an example scenario, wherein $i^{th}$ is the serving beam initially. In such a scenario, the L1 controller 212c determines the AoA as:

AoA=$(\theta_i, \varphi_i)$ wherein $(\theta_i, \varphi_i)$ is the direction for the beam pattern peak gain for the $i^{th}$ beam. The direction depicts the current orientation of the UE 104 in a local coordinate system (LCS). Thus, the determined AoA may be referred as the LCS AoA. The L1 controller 212c converts the LCS AoA into a global coordinate system (GCS) AoA as:

$(\theta, \varphi)_{GCS}(t) = R(O_t) * (\theta, \varphi)_{LCS}(t)$ wherein $(\theta, \varphi)_{GCS}(t)$ is the GCS AoA, $R(O_t)$ is a rotation matrix, and $(\theta, \varphi)_{LCS}(t)$ is the current orientation of the UE 104 in the LCS.

The L1 controller 212c assumes the determined AoA to be fixed or constant until there is the change in the orientation or position of the UE (i.e., UEGCS $((\theta, \varphi)_{GCS}(t) \sim (\theta, \varphi)_{GCS})$.

When there is a change in the orientation or position of the UE 104, the L1 controller 212c determines the LCS AoA using the GCS AoA. The L1 controller 212c uses the determined AoA to determine the beam gain. The L1 controller 212c further updates the AoA periodically to compensate the changes in the orientation of the UE 104.

In an alternative embodiment, the L1 controller 212c determines the AoA for the Tx and Rx beam pairs based on the RSRP value associated with the Tx and R beam pairs. For determining the AoA, the L1 controller 212c defines a AoA monitor time window. The L1 controller 212c defines the AoA monitor time window in such a way that the UE 104 can consider the determined AoA for further process (for example: for deriving the beam selection metric to select the Tx and Rx beam pair for the communication).

The L1 controller 212c monitors the Tx and Rx beam pairs and measures the RSRP values and corresponding orientation of the UE 104 for each of the Tx and Rx beams during the AoA monitor time window. The L1 controller 212c stores highest K RSRP values (i.e., top K RSRP values) among the measured RSRP values and the corresponding orientation of the UE 104 for each Tx and Rx beam monitored during the AoA monitor time window.

On an expiry of the AoA monitor time window, the L1 controller 212c averages the highest K RSRP values for each of the plurality of Tx and Rx beam pairs as:

$R_{avg}$=average($K$RSRP values)

The L1 controller 212c determines a beam index corresponding to the highest averaged RSRP as:

beam index $bi^*$=argmax($R_{avg}$)

wherein the beam index depicts the beam pattern peak gain.

The L1 controller 212c determines the AoA using the beam index and the orientation of the UE 104. The determined AoA is the LCS AOA. In an example, the L1 controller 212c determines the AoA as:

LCS AOA=direction corresponding to the highest average RSRP for the beam index $bi^*$ The L1 controller 212c converts the LCS AoA into the GCS AoA using the stored orientation of the UE 104. The L1 controller 212c estimates the sensor gain/beam gain using the determined GCS AoA, until the next AoA update cycle.

The L1 controller 212c provides the determined beam parameters for each of the plurality of Tx and Rx beam pairs to the selection module 212d.

In an embodiment, the selection module 212d may be configured to select the Tx and Rx beam pair for the communication in the time-varying channel, based on the beam parameters determined for the plurality of Tx and Rx beam pairs.

For selecting the Tx and Rx beam, the selection module 212d receives the beam parameters associated with each Tx and Rx beam pair from the sensor core module 212b and the L1 controller 212c, which have been determined at the first-time instance. The beam parameters measured at the first-time instance herein refers to the beam parameters determined at the PDSCH slots. The selection module 212d also receives the subsequent beam parameters associated with each Tx and Rx beam pair from the sensor core module 212b and the L1 controller 212c, which have been determined at the second-time instance. The beam parameters measured at the second-time instance herein refers to the beam parameters determined during the subsequent measurement occasions.

The selection module 212d configures a statistical model to characterize joint statistics of the beam parameters of each Tx and Rx beam pair determined at the first-time instance and the subsequent beam parameters of each Tx and Rx beam pair determined at the second-time instance. Examples of the statistical model may be, but are not limited to, a bivariate probability density function (PDF) model, PDF model, a modified bivariate Nakagami-m (MBN) model, and so on.

In an example, the characterized joint statistics depict that the beam parameters of each Tx and Rx beam pair determined at the first-time instance and the subsequent beam parameters of each Tx and Rx beam pair determined at the second-time instance may be non-negatively/positively correlated. The joint statistics of the non-negatively/positively correlated beam parameters depicts that an increase or decrease in the beam parameters determined at the first-time instance results in an increase or decrease, respectively, in the same beam parameters at the second-time instance.

In another example, the characterized joint statistics depict that the beam parameters of each Tx and Rx beam pair determined at the first-time instance and the subsequent beam parameters of each Tx and Rx beam pair determined at the second-time instance may be negatively correlated. The joint statistics of the negatively correlated beam parameters depicts that an increase or decrease in the beam parameters measured at the first-time instance results in a decrease or an increase, respectively, in the same beam parameters at the second-time instance.

In an embodiment, the statistical model may be a function of mean channel power, power correlation coefficient, first set of parameters, and so on, which have been derived from the beam parameters. The power correlation coefficient is derived based on at least one of, the orientation of the UE 104 (an example beam parameter), speed, and a second set of parameters. Examples of the first set of parameters may be, but are not limited to, bivariate Nakagami parameters, bivariate PDF parameters, and so on. Examples of the second set of parameters may be, but are not limited to, spatial channel model (SCM) parameters, and so on. Examples of the SCM parameters may be, but are not limited to, a number of clusters, a number of rays per cluster, an angle of departure per cluster and an associated spread, an angle of arrival per cluster and an associated spread, and so on. Thus, the statistical model may include the changeable orientation of the UE 104, the channel correlated over time, the AoA towards the UE 104 that do not change significantly with time, and so on. The statistical model also handles Line of Sight (LoS) and non-LoS (NLoS) conditions.

The selection module 212d derives the beam selection metric for each Tx and Rx beam pair based on the configured statistical model.

For deriving the beam selection metric, the selection module 212d derives a third set of parameters based on the beam parameters of each Tx and Rx beam pair determined at the first-time instance and the subsequent beam parameters of each Tx and Rx beam pair determined at the second-time instance. Examples of the third set of parameters may be, but are not limited to, an average of each of the beam parameters determined at the first-time instance, an average of each of the beam parameters determined at the second time-instance, a correlation between the beam parameters determined at the first-time instance and the subsequent beam parameters determined at the second-time instance, channel power measurement, and so on.

The selection module 212d uses the configured statistical model to derive the beam selection metric for each Tx and Rx beam pair, based on the third set of parameters. Consider an example scenario, wherein the beam parameters of each Tx and Rx beam pair determined at the first-time instance and the subsequent beam parameters of each Tx and Rx beam pair determined at the second time are non-negatively correlated and the beam parameters include the channel gain, the orientation of the UE 104, the AoA, and so on. In such a scenario, the selection module 212d uses the configured statistical model to derive the beam selection metric for each Tx and Rx beam pair as:

$$d_{i,p}(t) = \frac{\Omega_{i,p}(t)}{\Omega_{i,p}(T_{i,p})}\left[(1 - \rho_{i,p}(t))\Omega_{i,p}(T_{i,p}) + \rho_{i,p}(t)g_{i,p}^2(T_{i,p})\right]$$

wherein $\Omega_{i,p}(t)$ represents an average channel gain determined at the first-time instance, $\Omega_{i,p}(T_{i,p})/(\Omega_{i,p}(t+1))$ represents an average channel power gain measured at the second-time instance, $(\rho_{i,p}(t))$ represents a correlation between the channel gain determined at the first-time instance and the subsequent channel gain determined at the second-time instance $(\rho_{i,p}(t))$, and $(g_{i,p}(T_{i,p}))^2$ represents the channel power measurement. The average channel gain determined at the first-time instance and the average channel gain determined at the second-time instance, the correlation, and the channel power measurement may be the third set of parameters derived from the beam parameters.

Consider an example scenario, wherein the beam parameters of each Tx and Rx beam pair determined at the first-time instance and the subsequent beam parameters of each Tx and Rx beam pair determined at the second time are negatively correlated and the beam parameters include the channel gain. In such a scenario, the selection module 212d uses the configured statistical model to derive the beam selection metric for each Tx and Rx beam pair as:

$$d_{i,p}(t) = \frac{\Omega_{i,p}(t)}{\Omega_{i,p}(T_{i,p})}\left[(1 - |\rho_{i,p}(t)|)\Omega_{i,p}(T_{i,p}) + |\rho_{i,p}(t)|(\alpha - g_{i,p}(T_{i,p}))^2\right]$$

wherein $\alpha$ represents an alpha parameter.

The selection module 212d further derives a bound-based selection rule for both the non-negatively and negatively correlated beam parameters of each Tx and Rx beam pair determined at the first-time instance and the second-time instance, in order to optimize the beam selection metric derived for each Tx and Rx beam pair. The selection module 212d derives the bound based selection rule based on the beam selection metric and a fourth set of parameters. Examples of the fourth set of parameters may be, but are not limited to, the orientation of the UE, the speed, and previous history of beam parameter estimates. An example method of deriving the beam selection metric using the configured statistical model and the bound-based selection rule is described in detail in conjunction with FIG. 3A.

On deriving the beam selection metric for each of the plurality of Tx and Rx beam pairs, the selection module 212d identifies/selects the subset of Tx and Rx beam pairs from the plurality of Tx and Rx beam pairs having the beam selection metric above the second threshold.

The selection module 212d updates the selected subset of Tx and Rx beam pairs in a sensor data-based queue/prioritized queue. The selection module 212d performs the prioritized beam scheduling of the Tx and Rx beam pairs present in the prioritized queue to select the Tx and Rx beam pair for the communication.

The selection module 212d reports the selected Tx and Rx beam pair to the BS 102. The BS 102 reselects the Tx beam based on the reported Tx and Rx beam pair by the UE 104 and sends the data to the UE 104 in the reselected Tx beam. Alternatively, the selection module 212d uses the selected Tx and Rx beam pair to prioritize the beam measurements in the at least one beam measurement scenario based on the selected Tx and Rx beam pair.

In an embodiment, the selection module 212d may also be configured to perform the selection of the DL beams for the DL transmissions. Thereby optimizing the complexity of prioritized measurement scheduling for the PDSCH receptions. The selection module 212d manages selection of the DL beams, since the BS 102 may have the plurality of wide beams (e.g., 64 synchronization signal block (SSB)) and the plurality of narrow beams (e.g., 192 channel state information reference signals (CSI-RS)) to support the DL and UL transmissions and a UE beam management or a UE beam tracking has to be performed independently for each Tx beam. The UE 104 may receive the indication of beams used for the DL or UL transmissions as a combination of radio resource control (RRC) and medium access control (MAC) control element (MAC-CE) signaling. The RRC and MAC CE signaling includes a tci-PresentInDCI, which indicates if Transmission Configuration Indicator (TCI) field is present or not present in DL-related Downlink Control Information (DCI). If the tci-PresentInDCI is not provided to the UE 104 as part of the RRC configuration, then a PDSCH (DL) or PUSCH (UL) data beam is same as the PDCCH beam corresponding to a control resource set (CORESET). When the tci-PresentInDCI is configured, a set of DL or UL beams for data communication is dynamic. In such a scenario, the UE 104 receives the set of DL or UL beams via the MAC-CE activation and deactivation.

The selection module 212d may be configured to manage selection of the DL beams, when the tci-PresentInDCi is not configured on the UE 104. For managing the selection of the DL beams, the selection module 212d adds all the CORESET TCI-states (i.e., the DL beams) to a beam selection metric-based beam set. The beam selection metric-based beam set may include the Tx and Rx beam pairs, which have been selected for the beam scheduling based on the associated beam selection metric. The selection module 212d initializes a beam selection metric-based tracking for the DL beams present in the beam selection metric-based beam set. The beam selection metric-based tracking includes selecting/monitoring the DL beams for the beam scheduling based on the beam selection metric derived for the DL beams. The selection module 212d initializes a round-robin based beam tracking method for the DL beams that have not been present in the beam selection metric-based beam set. The round-robin based beam tracking method may be intuitively inferred by one of ordinary skill in the art based on its name, and thus, its detailed description is omitted.

On receiving the MAC-CE reception from the BS 102 for a CORESET PDCCH TCI-state change to update the DL beams, the selection module 212d adds the new/updated DL beams of the CORESET indicated by the MAC-CE to the beam selection metric-based beam set and allows the beam selection metric-based tracking for the updated DL beams. The selection module 212d deletes the current DL beams of the CORESET from the beam selection metric-based beam set, if the current DL beams have been unused by other CORESET and deletes the beam selection metric-based tracking for the deleted DL beams.

The selection module 212d may also be configured to manage selection of the DL beams, when the tci-PresentInDCi is configured on the UE 104. When the tci-PresentInDCi is configured on the UE 104, the selection module 212d receives the DL beams corresponding to the activated PDSCH TCI-states for each bandwidth part (BWP)-Downlink-Dedicated. The selection module 212d adds the DL beams corresponding to the activated PDSCH TCI-states received for each CORESET to the beam selection metric-based beam set. The selection module 212d initializes the beam selection metric-based tracking for the DL beams present in the beam selection metric-based beam set. The selection module 212d initializes the round-robin based beam tracking method for the DL beams that have not been present in the beam selection metric-based beam set.

On receiving the MAC-CE reception from the BS 102 for the PDCCH TCI-state activation/deactivation to update the DL beams, the selection module 212d adds the new/updated DL beams of the CORESET indicated by the MAC-CE to the beam selection metric-based beam set and allows the beam selection metric-based tracking for the updated DL beams. The selection module 212d deletes the current DL beams of the CORESET from the beam selection metric-based beam set, if the current DL beams have been unused by any other bandwidth part (BWP)-Downlink-Dedicated configured on the UE 104 and allows the round-robin based beam tracking method for the deleted DL beams.

In an embodiment, the selection module 212d may also be configured to perform the selection of the UL beams for the UL transmissions. Thereby optimizing the complexity of prioritized measurement scheduling for the PUSCH transmissions. Every sounding reference signal (SRS) resource is configured on the UE 104 with SRS spatial relationship information, which may be used as a reference for the PUSCH beam. The SRS spatial relationship information depicts a configuration of the spatial relation between a reference signal (RS) and a target SRS. Further, an SRS resource indicator (SRI) may be indicated to the UE 104 from the BS 102 through a DCI format 0_1.

For managing the selection of the UL beams for transmissions, the selection module 212d adds all the Tx reference signals/UL beams present in the SRS resources to the beam selection metric-based beam set.

The selection module 212d sets the beam selection metric-based tracking for the UL beams present in the beam selection metric-based beam set. The selection module 212d sets the round-robin based beam tracking method for the UL beams, which have not been present in the beam selection metric-based beam set. The selection module 212d selects the Rx beam used for the reception of the SRS resources from the BS 102 as the UL beam. The selection module 212d allows the UE 104 to transmit the SRS to the BS 102 using the selected UL beam. The selection module 212d selects the Rx beam used for the reception of the SRI from the BS 102 as the UL beam. The selection module 212d uses the selected UL beam to transmit the PUSCH to the BS 102.

The selection module 212d further checks if an RRC reconfiguration message is received for SRS addition or deletion. If the SRS resources are added or deleted through the RRC reconfiguration message, the selection module 212d updates the beam selection metric-based beam set to include and delete the associated UL beams for the deleted SRS resources using the SRS spatial relation information.

In an embodiment, the selection module 212d may also be configured to handle the CDRX cycles, while selecting the Tx and Rx beam pair for the communication. The CDRX cycles may be used for power saving by transitioning the selection module 212d to sleep state in the RRC connected mode of the UE 104. Thus, the data (related to the selection of the Tx and Rx beam pair, or the like) stored in volatile memory (e.g., memory 202) is lost and information such as the beam selection metric may be outdated during the transition of the selection module 212d into the sleep state. Therefore, the selection module 212d handles the CDRX cycles.

The selection module 212d may receive a CDRX sleep initiation signal from the driver 212a to transit into the sleep mode. On receiving the CDRX sleep initiation signal, the selection module 212d stores the beam selection metric and the selected Tx and Rx beam pair in the memory 202. The selection module 212d transits into the sleep state.

On receiving a CDRX wake up signal from the driver 212a, the selection module 212d exit from the sleep state. The selection module 212d retrieves the beam selection metric and the selected Tx and Rx beam pair for further process.

If the sleep duration of the selection module 212d exceeds than a defined sleep threshold, the driver 212a resets the beam selection process, which is being performed by the selection module 212d. The selection module 212d may define the sleep threshold based on at least one of, mobility/velocity of the UE 104, channel coherence time, changes in surroundings of the UE 104, and so on.

The selection module 212d may also be configured to handle the measurement starvation of the Tx and Rx beam pairs, during the prioritized scanning/scheduling of the subset of the Tx and Rx beam pairs. In an example, when the UE 104 is stationary, the identified subset of Tx and Rx beam pairs from the plurality of Tx and Rx beam pairs, based on the beam selection metric may remain same/constant over time. In such a scenario, the selection module 212d scans only the identified subset of Tx and Rx beam pairs (i.e., the prioritized Tx and Rx beam pair) and does not scan non-prioritized Tx and Rx beam pairs, which may affect performance of the UE. In addition, the beam selection metric associated with the prioritized Tx and Rx beam pairs may results invalid, without scanning of the non-prioritized Tx and Rx beam pairs. Thus, the selection module 212d scans the non-prioritized Tx and Rx beam pairs to avoid the starvation.

For handling the measurement starvation of the Tx and Rx beam pairs, the selection module 212d initializes the prioritized queue and a starvation queue. The selection module 212d adds the prioritized Tx and Rx beam pairs in the priority queue and the non-prioritized Tx and Rx beams (starvation beams) in the starvation queue. The selection module 212d arranges the Tx and Rx beam pairs in the starvation queue based on an associated starved time. The starved time may be a difference between the Tx and Rx beam pair last measured and measured at the current instance.

The selection module 212d schedules the scanning of the Tx and Rx beams present in the starvation queue, after every N prioritized Tx and Rx beams present in the prioritized queue, wherein N is lesser than the prioritized number of Tx and Rx beam pairs (M) (i.e., N<M). The selection module 212d may select the N number of prioritized Tx and Rx beam pairs based on a starvation cycle parameter. The starvation cycle parameter determines time required to complete one round of measurement of all the non-prioritized beams. After every Tx and Rx beam scanning, the selection module 212d updates the prioritized queue and the starvation queue.

In an embodiment, the selection module 212d may also be configured to detect the failure/anomaly in the one or more sensors of the sensor unit 208. The selection module 212d detects the failure/anomaly in the one or more sensors based on a correlation between consecutively sensed raw sensor data.

When there is a change in the orientation of the UE 104, the selection module 212d computes a difference between currently sensed raw sensor data and previously sensed raw sensor data by the one or more sensors of the sensor unit 208. The selection module 212d computes a variance using the computed difference between the currently sensed raw sensor data and the previously sensed raw sensor data. The selection module 212d compares the variance with an anomaly threshold. The anomaly threshold may be a legible value corresponding to typical movements of the UE 104. If the variance is lesser than the anomaly threshold, the selection module 212d detects no failure/anomaly in the one or more sensors. If the variance is greater than the anomaly threshold, the selection module 212d detects the failure/anomaly in the one or more sensors. On detecting the anomaly in the one or more sensors, the selection module 212d uses the round-robin based beam tracking method to select the Tx and Rx beam pairs for the beam scheduling.

In an embodiment, the selection module 212d may also be configured to select the RF module 204 for the data transmissions and reception, when the UE 104 is equipped with one or more RF modules 204 and simultaneous data reception and measurements cannot be performed on multiple modules.

The selection module 212d computes a serving module metric (SM) for the currently serving RF module(s) 204 and a non-serving module metric/other module metric (OM) for the non-serving RF modules 204. In an example, the selection module 212d computes the serving module metric for the serving RF module 204 as:

$$SM = \max_{j} G_{i_1,j}(\theta, \phi)$$

wherein ($\theta$, $\phi$) represents the current LCS AoA, $G_{i,j}(\theta, \varphi)$ represents the beam gain for $i^{th}$ module and $j^{th}$ beam in ($\theta$, $\phi$) direction and $i_1$ represents the serving RF module 204.

The selection module 212d computes the OM for the non-serving RF module as:

$$OM = \max_{i \neq i_1, j} G_{i,j}(\theta, \phi)$$

The selection module 212d compares the ratio of the SM to the OM with a module metric threshold $$\left(\frac{OM}{SM} > \delta,\right.$$

wherein $\delta$ represents the module metric threshold). If the ratio of the SM to the OM is greater than the module metric threshold, the selection module 212d selects the RF module 204 associated with the highest RSRP values, compared to other RF modules 204. The selection module 212d switches to the selected RF module 204 for the data transmissions and receptions.

Alternatively, the selection module 212d selects one of the RF modules 204 for the data transmissions and receptions, based on at least one of, the raw sensor data, the beam parameters determined using the raw sensor data, and so on.

Referring to FIGS. 2A, 2B, and 2C various units of a UE 104 are shown, but it is to be understood that other embodiments are not limited thereon. In other embodiments, the UE 104 may include less or more number of units. Further, the labels or names of the units are used only for illustrative purpose and does not limit the scope of the embodiments herein. One or more units can be combined together to perform same or substantially similar function in the UE 104.

Figure 3A:
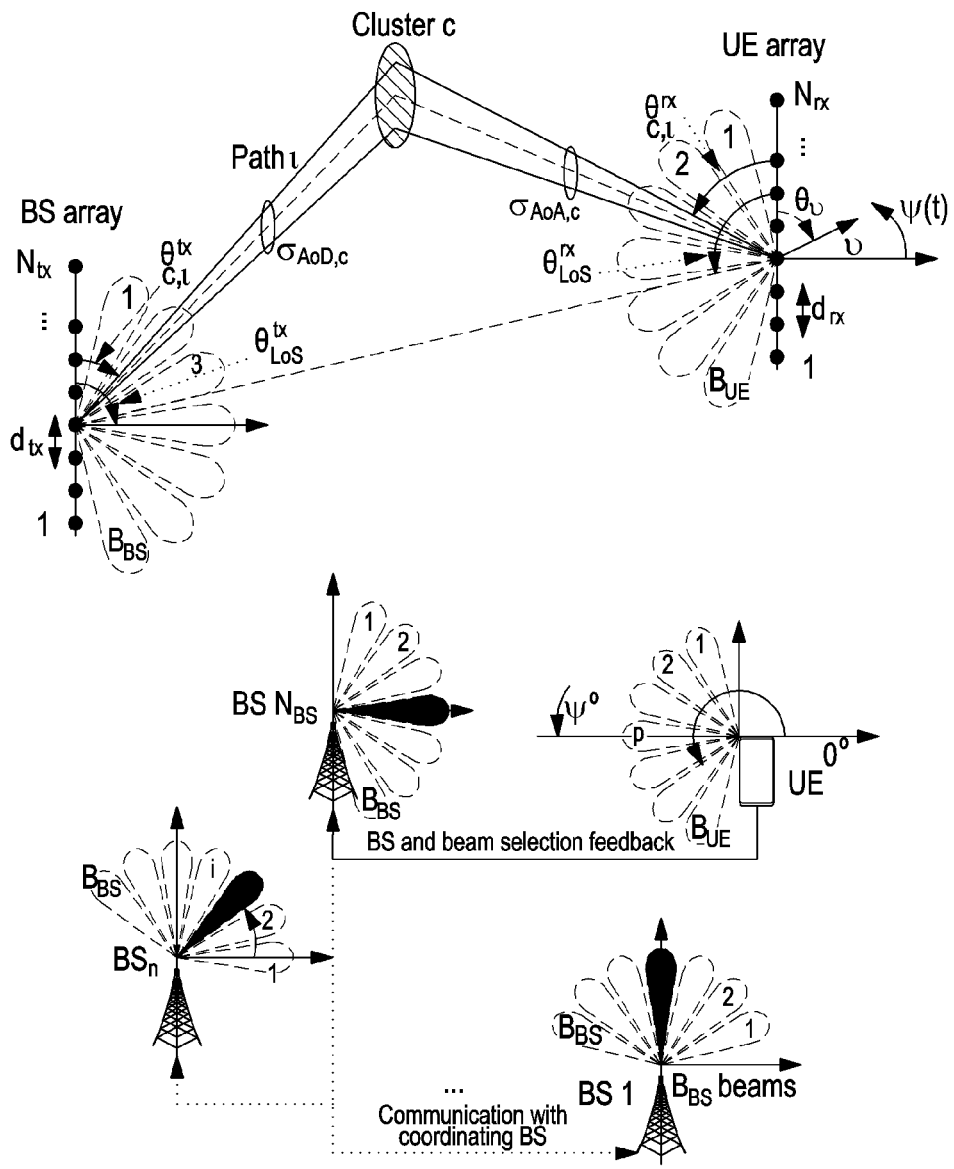
FIG. 3A depicts a beamforming-based communication system deriving a beam selection metric using a configured statistical model to select a transmit (Tx) and receive (Rx) beam pair for communication, according to an embodiment of the disclosure.

FIG. 3A depicts a beamforming-based communication system, in which the beam selection metric is derived using the configured statistical model to select the Tx and Rx beam pair for communication, according to an embodiment of the disclosure.

Embodiments herein explain deriving of the beam selection metric using a bivariate PDF model, an example of the statistical model and considering the beam parameters as the channel gain, the orientation of the UE 104, the AoA, and the correlation between the channel gain measured/determined at the different time-instances as an example, but it may be obvious to a person skilled in the art that any other statistical model may be used to derive the beam selection metric by considering the other beam parameters.

Embodiments herein denote the PDF and cumulative distribution function (CDF) of a random variable (RV)X by $f_X(\cdot)$ and $F_X(\cdot)$, respectively. Similarly, the conditional PDF and CDF conditioned on an event A are denoted by $f_x(\cdot|A)$ and $F_x(\cdot|A)$, respectively. The expectation with respect to an RV X is denoted by $E_x[\cdot]$ and the expectation conditioned on an event A by $E_x[|A]$. The covariance of RVs X and Y is denoted by Cov(X, Y), variance of RV X by Var(X), transpose by $(\cdot)^T$, Hermitian transpose by $(\cdot)^t$, real part by R $\{\cdot\}$, and derivative of a function f as $f'$.

Referring to FIG. 3A, a beamforming-based communication system 100 includes one or more BSs 102 and a UE 104. The UE 104 communicates with the coordinating BS 102 and receives BS and beam selection feedback from the coordinating BS. The other BSs can communicate with the coordinating BS and provide feedback to the coordinating BS.

The BS 102 is equipped with the ULA that consists of $N_{tx}$ antennas. The BS 102 transmits one beam from among BBS fixed directional beams in the azimuth direction. Similarly, the UE 104 is equipped with the URA 204a that consists of $N_{rx}$ antennas. The UE 104 receives on one beam from among $B_{UE}$ fixed directional beams in the azimuth direction. In an example herein, consider that, $B_{BS}=\{1, \ldots, B_{BS}\}$ and $B_{UE}=\{1, \ldots, B_{UE}\}$ denote the set of transmit beams at the BS 102 and the set of receive beams at the UE 104, respectively.

Further, consider that $\psi(t)$ be the orientation of the UE 104 with respect to the antenna array at time t. A Multiple Input Multiple Output (MIMO) channel matrix H(t, $\psi(t)) \in C^{N_{rx} \times N_{tx}}$ between the BS and the UE at time t, which also depends on $\psi(t)$ Equation 1

$$(t, \psi(t)) = \sqrt{\frac{1}{(K+1)L}} \sum_{c=1}^{C} \sum_{l=1}^{L} \alpha_{c,l} \quad (1)$$

$$(t) u_{rx}\left(\theta_{c,l}^{rx} + \psi(t)\right) u_{tx}^{\dagger}\left(\theta_{c,l}^{tx}\right) + \sqrt{\frac{K\Lambda}{K+1}} u_{rx}(\theta_{LoS}^{rx} + \psi(t)) u_{tx}^{\dagger}(\theta_{LoS}^{tx})$$

where C is the number of clusters, L is the number of path per cluster, $u_{rx}(\cdot)$ is the array response at the receiver, $u_{tx}(\cdot)$ is the array response at the transmitter, K is the Rician factor, $\theta_{c,l}^{tx}$ and $\theta_{c,l}^{rx}$ are the angle of departure (AoD) at the BS 102 and the AoA at the UE, respectively, for the $i^{th}$ path in the $c^{th}$ cluster, $\theta_{Los}^{tx}$ is the LoS AoD, $\theta_{Los}^{rx}$ is the LoS AoA, v is the speed of the UE that moves at an angle $\theta_v$, and $\Lambda$ is the path-loss. For the ULA, $u_{rx}(\cdot)$ and $u_{tx}(\cdot)$ are given by:

Equation 2

$$u_{rx}(\theta) = \frac{1}{\sqrt{N_{rx}}}[1, \exp(-j2\pi\mu^{rx}(\theta)), \ldots, \exp(-j2\pi(N_{rx}-1)\mu^{rx}(\theta))]^T \quad (2)$$

$$u_{tx}(\theta) = \frac{1}{\sqrt{N_{rx}}}[1, \exp(-j2\pi\mu^{tx}(\theta)), \ldots, \exp(-j2\pi(N_{tx}-1)\mu^{tx}(\theta))]^T \quad (3)$$

Equation 3 wherein $\mu^{rx}(\theta) = d_{tx}\cos(\theta)/\lambda$, $d_{tx}$ is the antenna spacing at the transmitter, $\lambda$ is the wavelength, and $f_c$ is the center frequency. Similarly, $\mu^{rx}(\theta) = d_{rx}\cos(\theta)/\lambda$, wherein $d_{rx}$ is the antenna spacing at the receiver. Further consider that $\propto_{c,i}(t) = \bar{a}_{c,i}\exp(j2\pi f_{Dt}\cos(w_{c,l}))$, wherein $f_D$ is the maximum Doppler shift, $w_{c,i} = \theta_{c,l}^{rx} - \theta_v$, $\bar{a}_{c,l}$ is a circularly symmetric complex Gaussian RV with zero mean and variance $\gamma_c\Lambda$, and $\gamma_c$ is the power of the $c^{th}$ cluster.

Consider that $g_{i,p}(t)$ denotes the channel gain between the $i^{th}$ transmit beam of the BS 102 and the $p^{th}$ receive beam of the UE 104 at time t. The channel gain may be represented as:

$$g_{i,p}(t) = |(V_p^{rx})^\dagger H(t, \psi(t)) V_i^{tx}| \quad (4)$$

wherein $V_i^{tx} = u_{tx}(\theta_i^{tx})$ is the beamforming vector of the $i^{th}$ transmit beam that points in the direction $\theta_i^{tx}$ and $V_p^{rx} = u_{rx}(\theta_p^{rx})$ is the beamforming vector of the $p^{th}$ receive beam that points in the direction $\theta_p^{rx}$. All angles are with respect to the Tx/Rx ULA.

The AoA $\theta_{c,l}^{rx}$ of the path l of cluster c is a Gaussian RV that is wrapped over an interval of $2\pi$ radians. An associated PDF $f_c^{rx}(\theta)$ is given by:

Equation 5

$$f_c^{rx}(\theta) = \frac{1}{\sqrt{2\pi}\sigma_{AoA,c}}\sum_{l=-\infty}^{\infty}\exp\left(\frac{-(\theta + 2\pi l - \bar{\theta}_{AoA,c})^2}{2\sigma_{AoA,c}^2}\right) \quad (5)$$

for $-\pi < \theta \leq \pi$

Embodiments herein refer $\bar{\theta}_{AoA,c}$ and $\sigma_{AoA,c}$ as the mean and standard deviation respectively, of $\theta_{c,l}^{rx}$. Similarly, the AoD $\theta_{c,l}^{tx}$ is a wrapped Gaussian RV with mean and standard deviation $\bar{\theta}_{AoD,c}$. The associated PDF is denoted by $f_c^{rx}(\theta)$. In the SCM, the angular spread parameters $\sigma_{AoA,c}$ and $\sigma_{AoD,c}$ are themselves exponential RVs with means $\xi_{AoA}$ and $\xi_{AoD}$, respectively.

The beam measurement and data transmission take place over beam measurement cycles, each of duration $T_{meas}$. A cycle comprises of three phases that overlap in time, namely, beam measurement, beam selection, and data transmission. In the beam measurement phase, the BS 102 transmits pilot bursts from different Tx beams. In the beam selection phase, the UE 104 selects the Rx beam, and the BS 102 selects the Tx beam. In the data transmission phase, the BS 102 transmits the data to the UE 104 using its serving beam ~i and the UE 104 receives the data using its serving beam p~.

In the beam measurement cycle, the BS 102 transmits pilot symbols in a pilot burst to the UE 104 from the BBS beams one after the other in a burst of duration $T_p$. The UE 104 receives the pilot symbols from one of the Rx beams. The pilot bursts are spaced $T_m$ apart.

In order to explore the trade-off between measuring more beam pairs and the increased sensitivity to time-variations in the channel gains, embodiments herein disclose two models for the beam measurements, a full measurement cycle (FMC) and a partial measurement cycle (PMC). In the FMC, the BS 102 transmits $B_{UE}$ bursts, so that the UE 104 can measure all the $B_{UE}B_{BS}$ beam pairs. In the PMC, the UE 104 determines/measures different subsets of the Tx and Rx beam pairs in different measurement cycles.

Figure 3B:
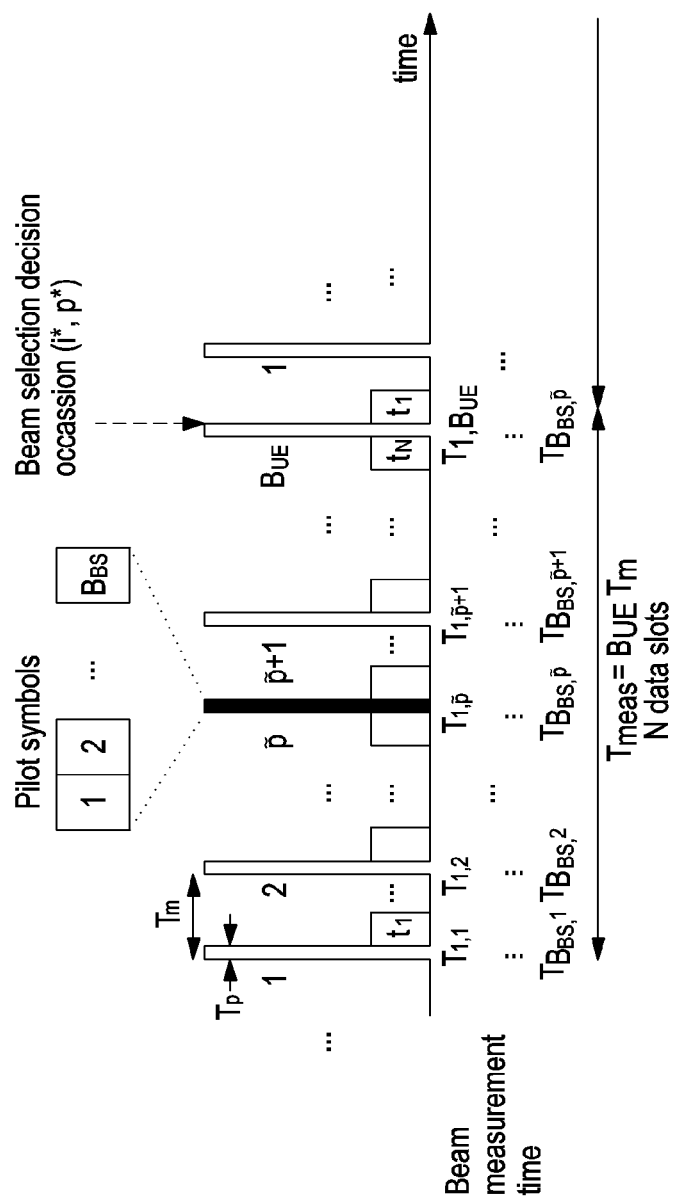
FIG. 3B depicts a full measurement cycle, according to an embodiment of the disclosure.

FIG. 3B depicts a full measurement cycle, according to an embodiment of the disclosure.

Referring to FIG. 3B, in the FMC, the beam measurement cycle comprises of $B_{UE}$ pilot bursts and is of duration $B_{UE}T_m$. In the first pilot burst, the UE 104 measures the channel gains from all the $B_{BS}$ Tx beams to a first Rx beam. The UE 104 measures the Tx and Rx beam pairs as (1, 1), (2, 1), . . . , ($B_{BS}$, 1), where the tuple (i, p) represents the beam pair that comprises of a Tx beam i and an Rx beam p. In the second pilot burst, the UE 104 receives the $B_{UE}$ Tx beams from a second Rx beam, and measures the Tx and Rx beam pairs as (1, 2), (2, 2), . . . , ($B_{BS}$, 2), and so on. After the $B_{UE}$ pilot bursts, the UE 104 measures all the $B_{UE}B_{BS}$ beam pairs.

Figure 3C:
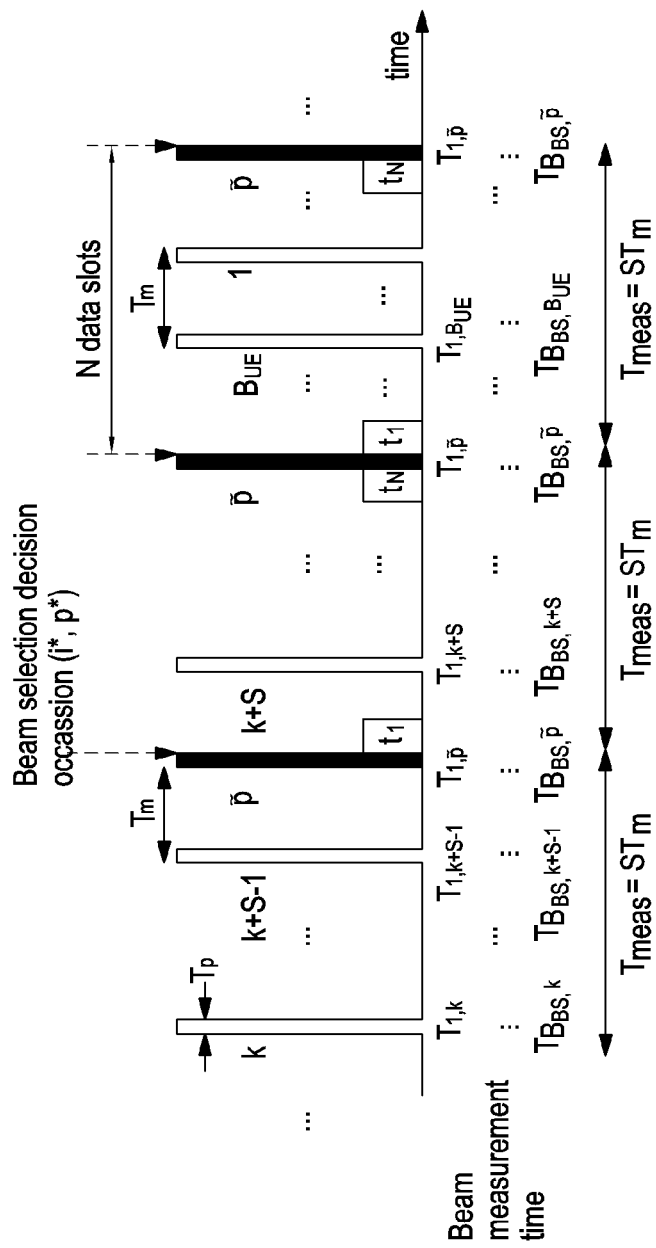
FIG. 3C depicts a partial measurement cycle (PMC), according to an embodiment of the disclosure.

FIG. 3C depicts a partial measurement cycle (PMC), according to an embodiment of the disclosure.

Referring to FIG. 3C, in the PMC, the beam measurement cycle comprises of $S < B_{UE}$ pilot bursts. Therefore, the duration of the $B_{UE}$ pilot bursts is $ST_m$. In an example herein, consider that the UE 104 receives the first pilot burst on the beam k. In such a scenario, the UE 104 measures the beam pairs (1, k), (2, k), . . . , ($B_{BS}$, k). The UE 104 receives the second pilot burst on a beam (k+1) and measures the beam pairs (1, k+1), (2, k+1), . . . , ($B_{BS}$, k+1). Similarly, the UE 104 receives the subsequent beam pairs and measures the subsequent beam pairs for (S−1) pilot bursts. In the last ($S^{th}$) pilot burst, the UE 104 receives with its serving beam p~ and measures the beam pairs (1, p~), (2, p~), . . . , ($B_{BS}$, p~), which allows the UE 104 to obtain fresh estimates for its serving Rx beam, which has higher odds of being reselected in a slowly varying environment. Thus, the UE 104 measures the channel gains using its Rx beams k, k+1, . . . , k+S−2, p~ in the measurement cycle. In the next measurement cycle, the UE 104 measures the channel gains using the receive beams k+S, k+S+1, . . . . In case p~ ∈ {k k+1, . . . , k+S−2}, then the UE 104 moves to the next Rx beam and skips receiving using p~, which the UE 104 may receive with in the last pilot burst in the measurement cycle.

In the beam selection cycle or at an end of each measuring cycle, the UE 104 selects the Tx and Rx beam pair (i*, p*) on the basis of g, and reports the transmit beam i* to the BS using its serving beam pair (~i, p~). Then, (i*, p*) becomes the serving beam pair in the next measurement cycle. The beam selection feedback delay and the time required to switch to the selected beams at the BS 102 and the UE 104 are assumed to be small compared to the time taken to measure the multiple beams. Thus, the BS 102 can switch the Tx beam with a periodicity of $ST_m$.

The data transmission cycle comprises of n slots, wherein each slot of duration $T_{slot}$. The n slot sspan the entire measurement cycle, as do the pilot bursts. The slot n starts at time $t_n$. At the beginning of every slot, the UE 104 feeds back to the BS 102 the rate at which the UE 104 can receive the data in that slot. The BS 102 can adapt its data rate multiple times with the same beam pair. The channel gain variations within a slot are negligible since the slot duration $T_{slot}$ is small compared to the coherence time of the channel.

The rate $R(g_{i*p*}(t))$ in bits/s/Hz on the selected beam pair, according to Shannon's capacity formula is given by:

Equation 6

$$R(g_{i,p}(t)) = \log_2\left(1 + \frac{P_{tx} g_{i*,p*}^2(t)}{\sigma^2}\right) \quad (6)$$

where $P_{tx}$ is the transmit power and $\sigma^2$ is the noise variance.

In order to the derive the beam selection metric, the UE 104 configures the analytically tractable and accurate statistical model. In an example herein, the statistical model is the bivariate PDF model. The bivariate PDF model is configured to characterize the joint statistics of the channel gains (an example of the beam parameters) of the Tx and Rx beam pairs, $g_{i,p}(t)$ measured at the first-time instance and $g_{i,p}(t+T)$ measured at the second-time instance, where T is the time lag. The channel gain measured for the Tx and Rx beam pair at the first-time instance and the channel gain measured for the Tx and Rx beam pair at the second-time instance may be negatively correlated. Alternatively, the channel gain measured for the Tx and Rx beam pair at the first-time instance and the channel gain measured for the Tx and Rx beam pair at the second-time instance may be non-negatively/positively correlated.

Consider an example scenario, wherein the channel gain measured for the Tx and Rx beam pair at the first-time instance and the channel gain measured for the Tx and Rx beam pair at the second-time instance are non-negatively/positively correlated. In such a scenario, the UE 104 configures the bivariate PDF model to characterize the joint PDF of the channel gain measured for the Tx and Rx beam pair at the first-time instance and the channel gain measured for the Tx and Rx beam pair at the second-time instance. The UE 104 characterizes the bivariate PDF of the channel gain measured for the Tx and Rx beam pair at the first-time instance $g_{i,p}(t)$ and the channel gain measured for the Tx and Rx beam pair at the second-time instance $g_{i,p}(t+T)$ as:

Equation 7

$$f_{g_{i,p}(t)g_{i,p}(t+\tau)}(r_1, r_2) = \frac{4m^{m+1} r_1^m r_2^m (\Omega_{i,p}(t)\Omega_{i,p}(t+\tau))^{\frac{-m+1}{2}}}{r(m)[1-\rho_{i,p}(t,t+\tau)](\rho_{i,p}(t,t+\tau))^{\frac{m-1}{2}}} \times$$

$$\exp\left[\frac{-m}{1-\rho_{i,p}(t,t+\tau)}\left(\frac{r_1^2}{\Omega_{i,p}(t)} + \frac{r_2^2}{\Omega_{i,p}(t+\tau)}\right)\right] \times$$

$$I_{m-1}\left(\frac{2mr_1 r_2 \sqrt{\rho_{i,p}(t,t+\tau)}}{\sqrt{\Omega_{i,p}(t)\Omega_{i,p}(t+\tau)}[1-\rho_{i,p}(t,t+\tau)]}\right) \quad (7)$$

where m is the Nakagami parameter, $\Omega_{i,p}(t)$ is the mean channel power at measurement time t, $\rho_{i,p}(t, t+T) \geq 0$ is the power correlation coefficient, and $I_m(\cdot)$ denotes the modified Bessel function of the first kind with order m. The Nakagami parameter may be derived from a Nakagami-m channel model, whose marginal PDF fits well with several reported measurements.

The UE 104 derives the parameters $\Omega_{i,p}(t)$, $\rho_{i,p}(t, t+T)$, and m (as depicted in Equation 7) in terms of the parameters of the SCM. For conciseness, embodiments herein denote $\rho_{i,p}(t, t+T)$ by $\rho_{i,p}(t)$ hence forth.

Equation 8

$$Z_p^{rx}(\theta) = \frac{1}{N_{rx}} \exp(-j(N_{rx}-1)\pi[\mu^{rx}(\theta) - \mu^{rx}(\theta_p^{rx})]) \frac{\sin(N_{rx}\pi[\mu^{rx}(\theta)-\mu^{rx}(\theta_p^{rx})])}{\sin(\pi[\mu^{rx}(\theta)-\mu^{rx}(\theta_p^{rx})])} \quad (8)$$

which follows:

Equation 9

$$|Z_p^{rx}(\theta)|^2 = \frac{1}{N_{rx}^2} \frac{\sin^2(N_{rx}\pi[\mu^{rx}(\theta)-\mu^{rx}(\theta_p^{rx})])}{\sin^2(\pi[\mu^{rx}(\theta)-\mu^{rx}(\theta_p^{rx})])} \quad (9)$$

Similarly, for the $i^{th}$ transmit beam gain $Z_p^{rx}(\theta) = (v_i^{tx})^\dagger u_{tx}(\theta)$ in the direction $\ominus$, Equation 10

$$|Z_p^{tx}(\theta)|^2 = \frac{1}{N_{tx}^2} \frac{\sin^2(N_{tx}\pi[\mu^{tx}(\theta)-\mu^{tx}(\theta_i^{tx})])}{\sin^2(\pi[\mu^{tx}(\theta)-\mu^{tx}(\theta_i^{tx})])} \quad (10)$$

wherein, the UE 104 measures the mean channel power $\Omega_{i,p}(t) = E[g_{i,p}^2(t)]$ as Equation 11

$$\Omega_{i,p}(t) = \frac{\Lambda}{K+1}$$

$$\sum_{c=1}^{C} \gamma_c \overline{G}_{p,c}^{rx}(t) \overline{G}_{i,c}^{tx}(t) + \frac{K\Lambda}{K+1} |Z_p^{rx}(\theta_{LoS}^{rx}) + \psi(t)|^2 |Z_i^{tx}(\theta_{LoS}^{tx})|^2 \quad (11)$$

where $Z^{rx}(\cdot)$ and $Z^{tx}(\cdot)$ are given in the above equations.

Equations 12 and 13

$$\overline{G}_{p,c}^{rx}(t) = \frac{1}{\sqrt{\pi}} \omega_q |Z_p^{rx}(\sqrt{2}\sigma_{AoA,c} x_q + \overline{\theta}_{AoA,c} + \psi(t))|^2 \quad (12)$$

$$\overline{G}_{i,c}^{tx}(t) = \frac{1}{\sqrt{\pi}} \sum_{q=1}^{N_{GH}} \omega_q |\sqrt{2}\sigma_{AoA,c} x_q + \overline{\theta}_{AoA,c}|^2 \quad (13)$$

where $\omega_q$ $x_q$ are the $q^{th}$ Gauss-Hermite (GH) weight and abscissa, respectively, and $N_{GH}$ is the GH integration order.

The UE 104 computes the power correlation coefficient $\rho_{i,p}(t, t+T)$ as Equation 14

$$\rho_{i,p}(t, t+T) \triangleq \frac{E[g_{i,p}^2(t) g_{i,p}^2(t+T)] - (\Omega_{i,p}(t)\Omega_{i,p}(t+T)}{\sqrt{\text{Var}(g_{i,p}^2(t)) \text{Var}(g_{i,p}^2(t+T))}} \quad (14)$$

The term $\text{Var}(g_{i,p}^2(t)) \triangleq E[g_{i,p}^2(t)] - \Omega_{i,p}^2(t)$ in the denominator equals Equation 15

$$\text{Var}(g_{i,p}^2(t)) = \frac{2\Lambda^2}{L(K+1)^2} \sum_{c=1}^{C} \gamma_c^2 F_{p,c}^{rx}(t) F_{i,c}^{tx}(t) + \qquad (15)$$

$$\frac{2K\Lambda^2}{(K+1)^2} \sum_{c=1}^{C} \gamma_c \bar{G}_{p,c}^{rx}(t) \bar{G}_{i,c}^{tx}(t) |Z_p^{rx}(\theta_{LoS}^{rx} + \psi(t))|^2 |Z_p^{rx}(\theta_{LoS}^{rx} + \psi(t))|^2$$

wherein

Equations 16 and 17

$$F_{p,c}^{rx}(t) = \frac{1}{\sqrt{\pi}} \sum_{q=1}^{N_{GH}} \omega_q |Z_p^{rx}(\sqrt{2}\sigma_{AoA,c}x_q + \bar{\theta}_{AoA,c} + \psi(t))|^4 \qquad (16)$$

$$F_{i,c}^{tx}(t) = \frac{1}{\sqrt{\pi}} \sum_{q=1}^{N_{GH}} \omega_q |Z_i^{tx}(\sqrt{2}\sigma_{AoA,c}x_q + \bar{\theta}_{AoD,c})|^4 \qquad (17)$$

The term $E[g_{i,p}^2(t) g_{i,p}^2(t+T)]$ in the numerator equals:

$$E[g_{i,p}^2(t) g_{i,p}^2(t+T)] = T_{i,p}^{NLoS}(t,T) + T_{i,p}^{LoS}(t,T) + T_{i,p}^{LoSNLoS}(t,T) \qquad (18)$$

Here, $T_{i,p}^{NLoS}(t,T)$ captures cross-products involving the NLoS terms and is given by:

Equation 19

$$T_{i,p}^{NLoS}(t,T) = \frac{\Lambda^2}{L(K+1)^2} \left[ 2 \sum_{c=1}^{C} \gamma_c^2 \bar{G}_{p,c}^{rx}(t) F_{i,c}^{tx}(t) \bar{G}_{p,c}^{rx}(t+T) + \right. \qquad (19)$$

$$\left. \left( \sum_{c_1=1}^{C} \gamma_{c_1} \bar{G}_{p,c_1}^{rx}(t) \bar{G}_{i,c_1}^{tx}(t) \right) \sum_{c_2=1}^{C} \gamma_c^2 \bar{G}_{p,c}^{rx}(t+T) \bar{G}_{i,c_2}^{tx}(t+T) \right]$$

$T_{i,p}^{LoS}(t,T)$ captures cross-products involves the LoS terms and is given by:

Equation 20

$$T_{i,p}^{LoS}(t,T) = \frac{K^2 \Lambda^2}{(K+1)^2} |Z_p^{rx}(\theta_{LoS}^{rx} + \psi(t))|^2 |Z_p^{rx}(\theta_{LoS}^{rx} + \psi(t))|^2 |Z_i^{tx}(\theta_{LoS}^{tx})|^4 \qquad (20)$$

$T_{i,p}^{LoSNLoS}(t,T)$ captures cross-products involving the LoS and NLoS terms and is given by:

Equation 21

$$T_{i,p}^{LoSNLoS}(t,T) = \frac{K\Lambda^2 |Z_i^{tx}(\theta_{LoS}^{tx})|^2}{(K+1)^2} \left[ \left( \sum_{c=1}^{C} \gamma_c \bar{G}_{p,c}^{rx}(t) \bar{G}_{i,c}^{tx}(t) \right) \right. \qquad (21)$$

$$|Z_p^{rx}(\theta_{LoS}^{rx} + \psi(t+T))|^2 + \sum_{c=1}^{C} \gamma_c \bar{G}_{p,c}^{rx}(t+T) \bar{G}_{i,c}^{tx}(t) \right)$$

$$\left( |Z_p^{rx}(\theta_{LoS}^{rx} + \psi(t))|^2 + 2R \left( \sum_{c=1}^{C} \gamma_c \theta_c^{rx}(t,T) \bar{G}_{i,c}^{tx}(t) \right) |Z_i^{tx}(\theta_{LoS}^{tx})|^4 \right.$$

$$\left. |Z_p^{rx}(\theta_{LoS}^{rx} + \psi(t))|^* Z_p^{rx}(\theta_{LoS}^{rx} + \psi(t+T)) \right) \right]$$

wherein,

Equation 22

$$\theta_c^{rx}(t,T) = \frac{1}{\sqrt{\pi}} \sum_{q=1}^{N_{GH}} \omega_q Z_p^{rx}(\sqrt{2}\sigma_{AoA,c}x_q + \bar{\theta}_{AoA,c} + \psi(t)) \times \qquad (22)$$

$$\left( Z_p^{rx}(\sqrt{2}\sigma_{AoA,c}x_q + \bar{\theta}_{AoA,c} + \psi(t+T)) \right)^* \times$$

$$\exp\left( 4\pi j t f_D \sin\left( \sqrt{2}\sigma_{AoA,c}x_q + \bar{\theta}_{AoA,c} + \right. \right.$$

$$\left. \frac{\psi(t) + \psi(t+T)}{2} - \theta_v \right) \sin\left( \frac{\psi(t+T) - \psi(t)}{2} \right) \right) \times$$

$$\exp\left( -2\pi j T f_D \cos\left( \sqrt{2}\sigma_{AoA,c}x_q + \bar{\theta}_{AoA,c} + \psi(t+T) - \theta_v \right) \right)$$

The UE 104 estimates a maximum-likelihood of m as:

Equation 23

$$\hat{m} = \frac{\Omega_{i,p}^2(t)}{\text{Var}(g_{i,p}^2(t))} \qquad (23)$$

wherein, $\Omega_{i,p}(t)$ is given in the Equation 11 and $\text{Var}(g_{i,p}^2(t))$ is given in the Equation 15.

Consider an example scenario, wherein the channel gain measured for the Tx and Rx beam pair at the first-time instance and the channel gain measured for the Tx and Rx beam pair at the second-time instance are negatively correlated. In such a scenario, the expression corresponding to the correlation depicted in equation is negative. The characterized bivariate PDF of the channel gain measured for the Tx and Rx beam pair at the first-time instance and the channel gain measured for the Tx and Rx beam pair at the second-time instance is analyzed using FIG. 3D.

Figure 3D:
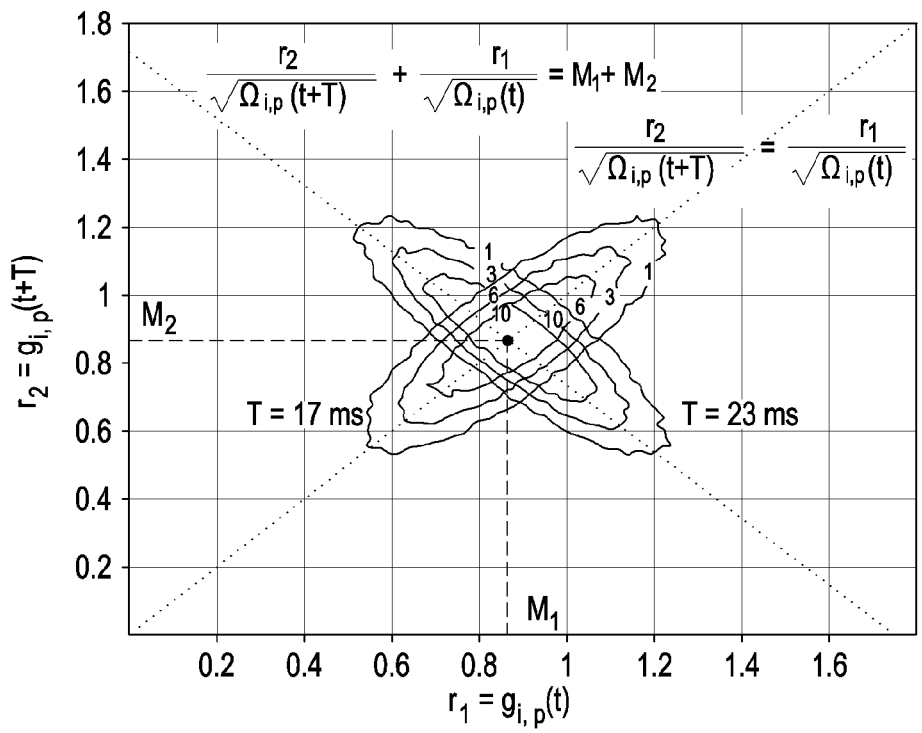
FIG. 3D depicts a plot of level set contours of a bivariate Probability Density Function (PDF) of a negatively correlated channel gains of the Tx and Rx beam pair, according to an embodiment of the disclosure.

FIG. 3D depicts a plot of level set contours of a bivariate Probability Density Function (PDF) of a negatively correlated channel gains of the Tx and Rx beam pair, according to an embodiment of the disclosure.

Referring to FIG. 3D, a level set contour plot of the empirical bivariate PDF of $g_{i,p}(t)$ and $g_{i,p}(t+T)$ for T=17 ms and 23 ms with $\rho_{i,p}(t,t+T)$=−0.815 and 0.816, respectively (K=3, $\xi_{AoD}$=10.2, $\xi_{AoA}$=15.5, C=4, and L=20), is depicted. The PDF $f_{g_{i,p}(t)g_{i,p}(t+T)}(r_1, r_2)$ levels chosen for the plot are 1, 3, 6, and 10. The power correlation coefficient for these two lags turns out to be −0.815 and 0.816, respectively. The contours are shown for PDF values of 1, 3, 6, and 10. The contours are generated from 900 traces of the channel gains of all beam pairs for BBS=18, BUE=18, Ntx=Nrx=20, drx=dtx=0.25$\lambda$, v=2 m/s, and fc=28 GHz. The SCM parameters are K=3, $\xi_{AoD}$=10.2°, $\xi_{AoD}$=15.5°, C=4, L=20, and $\theta_v$=90°, and the UE orientation change rate is $\Psi_j(t)$=0°/s. Each trace comprises of 300 samples that are spaced 1 ms apart. The UE 104 records the following observations:

Observation 1: The level set contours for positive power correlation coefficients are concentric, and so are those for negative power correlation coefficients. Furthermore, all the level set contours share a same center ($M_1$, $M_2$). The center is the point at which the bivariate Nakagami-m PDF peaks. The only exception is $\rho_{i,p}(t, t+T)$=0. When $g_{i,p}(t)$ and $g_{i,p}(t+T)$ and are mutually independent, $M_1$ is the value of $r_1$ at which the marginal Nakagami-m PDF $f_{g_{i,p}}(t)(r_1)$ is maximized, and $M_2$ is the value of $r_2$ at which the marginal Nakagami-m PDF $f_{g_{i,p}(t+T)}(r_2)$ is maximized.

Equation 24

$$M_1 = \sqrt{\frac{(2m-1)\Omega_{i,p}(t)}{2m}} \text{ and } M_2 = \sqrt{\frac{(2m-1)\Omega_{i,p}(t+T)}{2m}} \qquad (24)$$

In general, from the Equation 7, ($M_1$, $M_2$) may be the solution of the following two equations.

Equations 25 and 26

$$\frac{\partial}{\partial r_1} f_{g_{i,p}(t)g_{i,p}(t+T)}(r_1, r_2) = m(1 - 2K_1 r_1^2 + K_2 r_1 r_2 \frac{I'_{m-1}(K_2 r_1 r_2)}{I_{m-1}(K_2 r_1 r_2)}) = 0 \quad (25)$$

$$\frac{\partial}{\partial r_2} f_{g_{i,p}(t)g_{i,p}(t+T)}(r_1, r_2) = m(1 - 2K_3 r_2^2 + K_2 r_1 r_2 \frac{I'_{m-1}(K_2 r_1 r_2)}{I_{m-1}(K_2 r_1 r_2)}) = 0 \quad (26)$$

wherein, $$K_1 = ([1 - \rho_{i,p}(t, t+T)]\Omega_{i,p}(t))^{-1}$$

$$K_2 = \frac{2m\sqrt{\rho_{i,p}(t, t+T)}}{\sqrt{\Omega_{i,p}(t)\Omega_{i,p}(t+T)}(1 - \rho_{i,p}(t, t+T))}$$

$$K_3 = ([1 - \rho_{i,p}(t, t+T)]\Omega_{i,p}(t+T))^{-1}$$

The UE 104 eliminates the common terms to yield $$\frac{M_1}{\sqrt{\Omega_{i,p}(t)}} = \frac{M_2}{\sqrt{\Omega_{i,p}(t+T)}}$$

Further, the UE 104 substitutes $$\frac{M_1}{\sqrt{\Omega_{i,p}(t)}} = \frac{M_2}{\sqrt{\Omega_{i,p}(t+T)}}$$

in the Equation 25, so that $M_1$ is the solution of the following non-linear equation:

Equation 27

$$m(1 - 2K_1 r_1^2) + K_2 \sqrt{\frac{\Omega_{i,p}(t+T)}{\Omega_{i,p}(t)}} \frac{I'_{m-1}\left(\sqrt{\frac{\Omega_{i,p}(t+T)}{\Omega_{i,p}(t)}} r_1^2\right)}{I_{m-1}\left(\sqrt{\frac{\Omega_{i,p}(t+T)}{\Omega_{i,p}(t)}} r_1^2\right)} = 0 \quad (27)$$

Figure 3E:
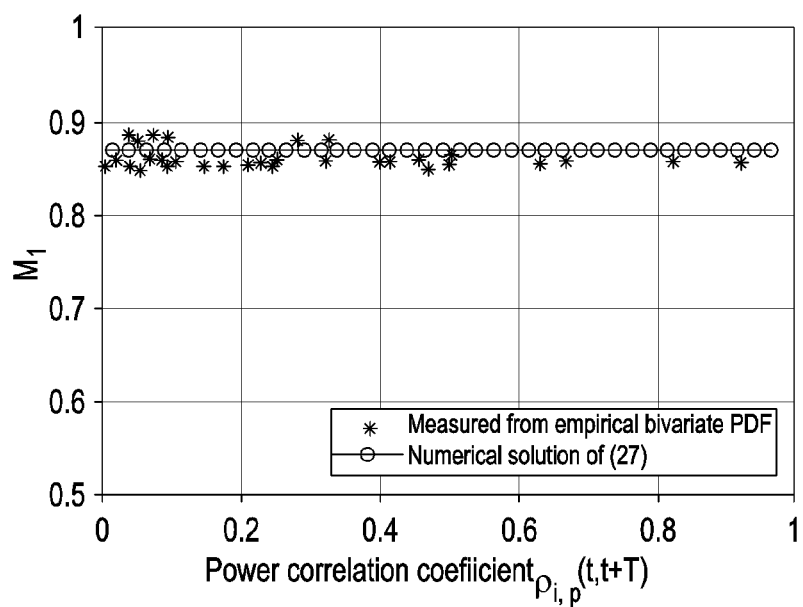
FIG. 3E depicts a plot of an M1 function, according to an embodiment of the disclosure.

FIG. 3E depicts a plot of an M1 function, according to an embodiment of the disclosure.

Referring to FIG. 3E, since no closed-form solution is known for the Equation 27, the UE 104 plots $M_1$ as a function of $\rho_{i,p}(t, t+T)$, as depicted in FIG. 3E. The UE 104 observes that $M_1$ is insensitive to $\rho_{i,p}(t, t+T)$. Therefore, $M_1$ and $M_2$ are accurately given by the Equation 24 for all $\rho_{i,p}(t, t+T) \geq 0$.

Observation 2: Major axes of the level set contours for the positive and negative power correlation coefficients are perpendicular to each other.

The channel gain is a random process that is stationary for a small change $\psi(t+T) - \psi(t)$ in the orientation if T is small, which implies that $$\Omega_{i,p}(t) \approx \psi_{i,p}(t+T)$$

Hence, $f_{g_{i,p}(t)g_{i,p}(t+T)}(r_1, r_2)$ in the Equation 7 is a symmetric function of variables $$\frac{r_1}{\sqrt{\Omega_{i,p}(t)}} \text{ and } \frac{r_2}{\sqrt{\Omega_{i,p}(t+\tau)}}.$$

Thus, the bivariate PDF is expected to be a symmetric function of the same variables for a negative power correlation coefficient as well, which occur only if the major axis of the bivariate PDF for any negative power correlation coefficient is perpendicular to the line $$\frac{r_2}{\sqrt{\Omega_{i,p}(t+\tau)}} = \frac{r_1}{\sqrt{\Omega_{i,p}(t)}}.$$

Therefore, the major axes pass through $(M_1, M_2)$, which is given in the Equation 24. The major axis may be shown to be given by the line:

Equation 28

$$\frac{r_2}{\sqrt{\Omega_{i,p}(t+\tau)}} = \sqrt{\frac{(2m-1)\Omega_{i,p}(t)}{2m}}\left(1 + \frac{\Omega_{i,p}(t)}{\Omega_{i,p}(t+\tau)}\right) - \frac{\Omega_{i,p}(t)}{\Omega_{i,p}(t+T)} \frac{r_1}{\sqrt{\Omega_{i,p}(t)}} \quad (28)$$

Based on the above observations (the observation 1 and the observation 2), the UE 104 derives the following bivariate PDF $f_{g_{i,p}(t)g_{i,p}(t+T)}(r_1, r_2)$:

Equation 29

$$f_{g_{i,p}(t)g_{i,p}(t+T)}(r_1, r_2) = \frac{4m^{m+1}(a - r_1)^m r_2^m [\Omega_{i,p}(t)\Omega_{i,p}(t+T)]^{\frac{-m+1}{2}}}{\zeta\left(m, 2(2m-1)(1-\rho)\rho^{\frac{m-1}{2}}\right)} \times$$

$$\exp\left[\frac{-m}{1-\rho}\left(\frac{(a-r_1)^2}{\Omega_{i,p}(t)} + \frac{r_2^2}{\Omega_{i,p}(t+T)}\right)\right] I_{m-1}\left(\frac{2m\sqrt{\rho}(a-r_1)r_2}{\sqrt{\Omega_{i,p}(t)\Omega_{i,p}(t+T)}(1-\rho)}\right), \quad (29)$$

for $0 \leq r_1 \leq a, r_2 \geq 0$ where $$a = \sqrt{\frac{2(2m-1)\Omega_{i,p}(t)}{m}}, \zeta(.,.)$$

is an incomplete gamma function and $\rho > 0$ is a parameter that models correlation.

The PDF in the Equation 29 is obtained by the following sequence of transformations of RVs that are designed to satisfy the above observations. First, consider the normalized RVs;

$$Y_1 = g_{i,p}(t)/\sqrt{\Omega_{i,p}(t)} \text{ and}$$

$$Y_2 = g_{i,p}(t+T)/\sqrt{\Omega_{i,p}(t)}$$

with the power correlation coefficient $\rho$. From the Equation 7, the UE 104 simplifies the PDF as:

$$f_{Y_1, Y_2}(y_1, y_2) = \frac{4m^{m+1} r_1^m r_2^m \exp\left[\frac{-m(r_1^2 + r_2^2)}{1 - \rho}\right]}{\Gamma(m)(1 - \rho)\rho^{\frac{m-1}{2}}} I_{m-1}\left(\frac{2m\sqrt{\rho} r_1 r_2}{\sqrt{1 - \rho}}\right)$$

for $y_1, y_2 \geq 0$.

To rotate the PDF by 90° in the counterclockwise direction around the point (M1, M2) as per the Observations 1 and 2, the UE 104 applies the following variable transformation:

$$\overline{Y}_1 = 2\sqrt{(2m-1)/(2m)} - Y_2$$

$$\overline{Y}_1 = Y_1$$

The UE 104 scales back the RVs using the following transformations:

$$g_{i,p}(t) = Y_1\sqrt{\Omega_{i,p}(t)}$$

$$g_{i,p}(t+T) = Y_2\sqrt{\Omega_{i,p}(t+T)}$$

The above-described sequence of transformations yields the PDF in the Equation 29. A support of the PDF is restricted to $0 \leq r_1 \leq \alpha$ and $r_2 \geq 0$ to ensure that the resultant RVs are positive. Thereby, leading to the scaling factor $\zeta$ (m, 2(2m−1)) appearing instead of $\lceil$(m) in the denominator so that $f_{g_{i,p}(t)g_{i,p}(t+T)}(r_1, r_2)$ is a valid PDF.

Intuitively, based on the above rationale, the UE 104 considers $\rho_{i,p}(t, t+T) \approx -\rho$. The UE 104 derives the expression for $\rho_{i,p}(t, t+T)$. As per the definition of $\rho_{i,p}(t, t+T)$ in the Equation 14, the UE 104 derives the following expressions for $\rho_{i,p}(t, t+T)$.

$$E[g_{i,p}^2(t)g_{i,p}^2(t+T)]$$

$$E[g_{i,p}^4(t+T)]$$

$$E[g_{i,p}^2(t+T)]$$

which determine $$Var(g_{i,p}^2(t+T))$$

$$E[g_{i,p}^4(t)]$$

$$E[g_{i,p}^2(t)]$$

which determine $$Var(g_{i,p}^2(t))$$

From the Equation 29, the expressions for the expressions for $\rho_{i,p}(t, t+T)$ as:

Equation 34

$$E[g_{i,p}^2(t)] = \frac{\Omega_{i,p}(t)}{m\zeta(m, 2(2m-1))}\left[2(2m-1)\zeta(m, 2(2m-1)) - 2\sqrt{2(2m-1)}\zeta\left(m+\frac{1}{2}, 2(2m-1)\right) + \zeta(m+1, 2(2m-1))\right] \quad (30)$$

$$E[g_{i,p}^4(t)] = \frac{\Omega_{i,p}(t)}{m^2\zeta(m, 2(2m-1))}\left[(41m^2 - 27m + 4)\zeta(m, 2(2m-1)) - 2\sqrt{2(2m-1)}(10m-3)\zeta\left(m+\frac{1}{2}, 2(2m-1)\right)\right] \quad (31)$$

$$E[g_{i,p}^2(t+T)] = \quad (32)$$

$$\frac{\Omega_{i,p}(t+T)(1-\rho)^{m+1}}{m\zeta(m, 2(2m-1))}\sum_{k=0}^{\infty}\frac{\rho^k \zeta\left(k+m, \frac{2(2m-1)}{1-\rho}\right)\Gamma(m+k+1)}{k!\Gamma(m+k)}$$

$$E[g_{i,p}^4(t+T)] = \quad (33)$$

$$\frac{\Omega_{i,p}^2(t+T)(1-\rho)^{m+2}}{m^2\zeta(m, 2(2m-1))}\sum_{k=0}^{\infty}\frac{\rho^k \zeta\left(k+m, \frac{2(2m-1)}{1-\rho}\right)\Gamma(m+k+2)}{k!\Gamma(m+k)}$$

$$E[g_{i,p}^2(t)g_{i,p}^2(t+T)] = \quad (34)$$

$$\frac{\Omega_{i,p}(t)\Omega_{i,p}^2(t+T)}{m^2\zeta(m, 2(2m-1))}\left[m(5m-2+\rho)\zeta(m, 2(2m-1)) - \sqrt{2(2m-1)}(2m+\rho)\zeta\left(m+\frac{1}{2}, 2(2m-1)\right)\right]$$

For $\rho=0$, the UE 104 simplifies the Equations 32 and 33 to:

$$E[g_{i,p}^2(t+T)] = \Omega_{i,p}(t+T) \text{ and } E[g_{i,p}^4(t+T)] = \Omega_{i,p}^2(t+T)\frac{(m+1)}{m} \quad (35)$$

Figure 3F:
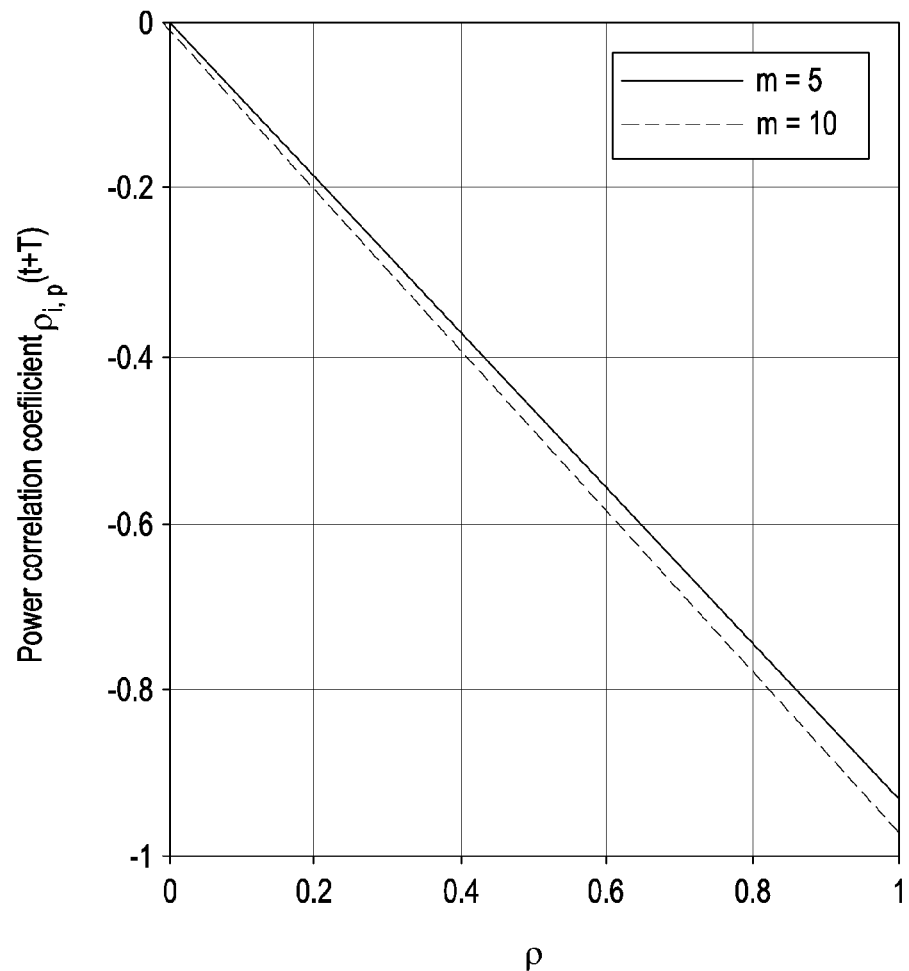
FIG. 3F plots a power correlation coefficient as a function of p, according to an embodiment of the disclosure.

FIG. 3F plots a power correlation coefficient as a function of the $\rho$, according to an embodiment of the disclosure.

Referring to FIG. 3F, the UE 104 plots the power correlation coefficient computed from the above expressions as a function of the $\rho$ for m=5 and 10, as depicted in FIG. 3F. The function of the $\rho$ is negative. It is close to $-\rho$ for both values of m. The match improves as m increases. Therefore, embodiments herein use $|\rho_{i,p}(t, t+T)|$ instead of $\rho$ henceforth for the bivariate PDF in the Equation 29. The UE 104 further observes that $E[g_{i,p}^4(t+T)]$ and $E[g_{i,p}^2(t+T)]$ are insensitive to $\rho$, i.e., the expressions in the Equation 35 apply for $\rho$ close to 1 as well.

The UE 104 further verifies the configured bivariate PDF model. The bivariate PDF depicted in the Equation 7 for $\rho_{i,p}(t, t+T) \geq 0$ and the bivariate PDF depicted in the Equation 29 for $\rho_{i,p}(t, t+T) < 0$ together constitute the configured bivariate PDF model. The UE 104 verifies the accuracy of the bivariate PDF model over a wide parameter range.

Figure 3G:
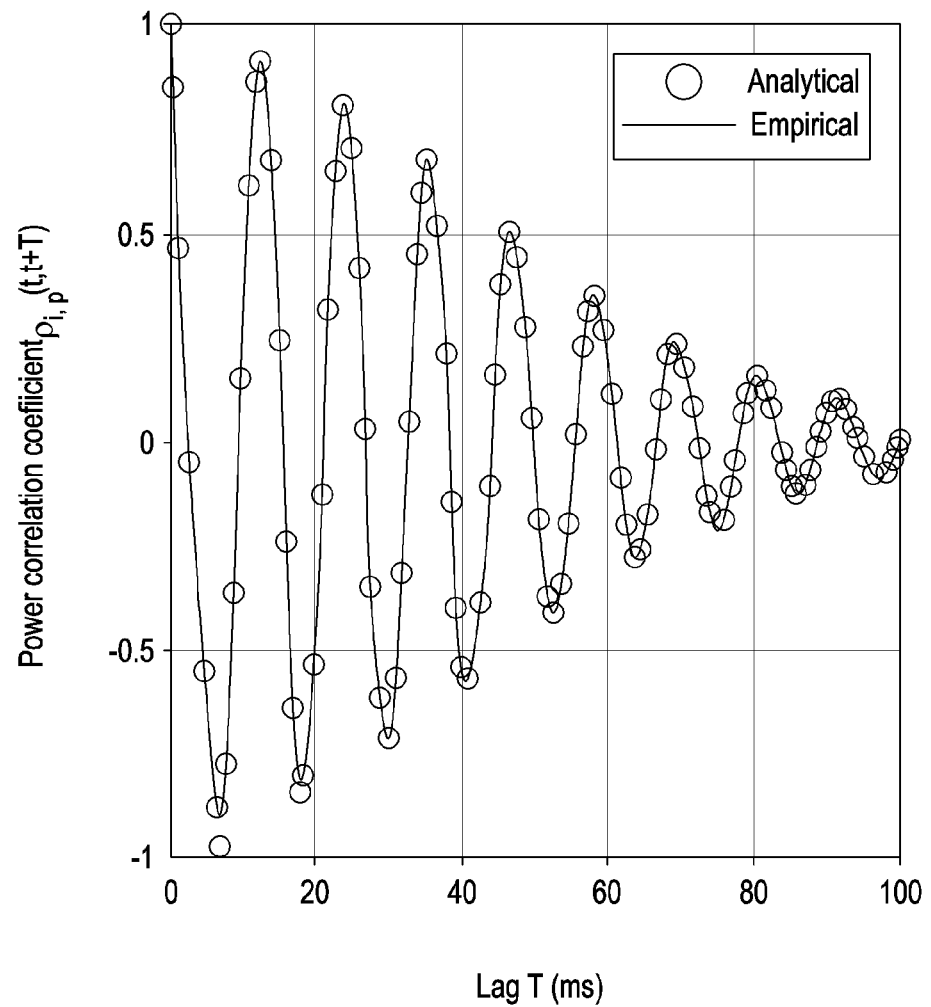
FIG. 3G plots an empirically measured value of $\rho_{i,p}(t, t+T)$ and a value analytically computed as a function of T, according to an embodiment of the disclosure.

FIG. 3G plots the empirically measured value of $\rho_{i,p}(t, t+T)$ and the value analytically computed as a function of T.

Referring to FIG. 3G, from the plot a good match is observed between the analytical and empirical curves for all the values of T, which span multiple coherence intervals. For $0 \leq T < 3$ ms, the power correlation coefficient is positive. However, for $3 \leq T < 9$ ms, it is negative. $\rho_{i,p}(t, t+T)$ exhibits a damped oscillatory behavior. The empirical values of $M_1$ and $M_2$ from FIG. 3G turn out to be 0.8664 and 0.8662. The empirical values are within 0.1% of the values computed from the Equation 27.

Figure 3H:
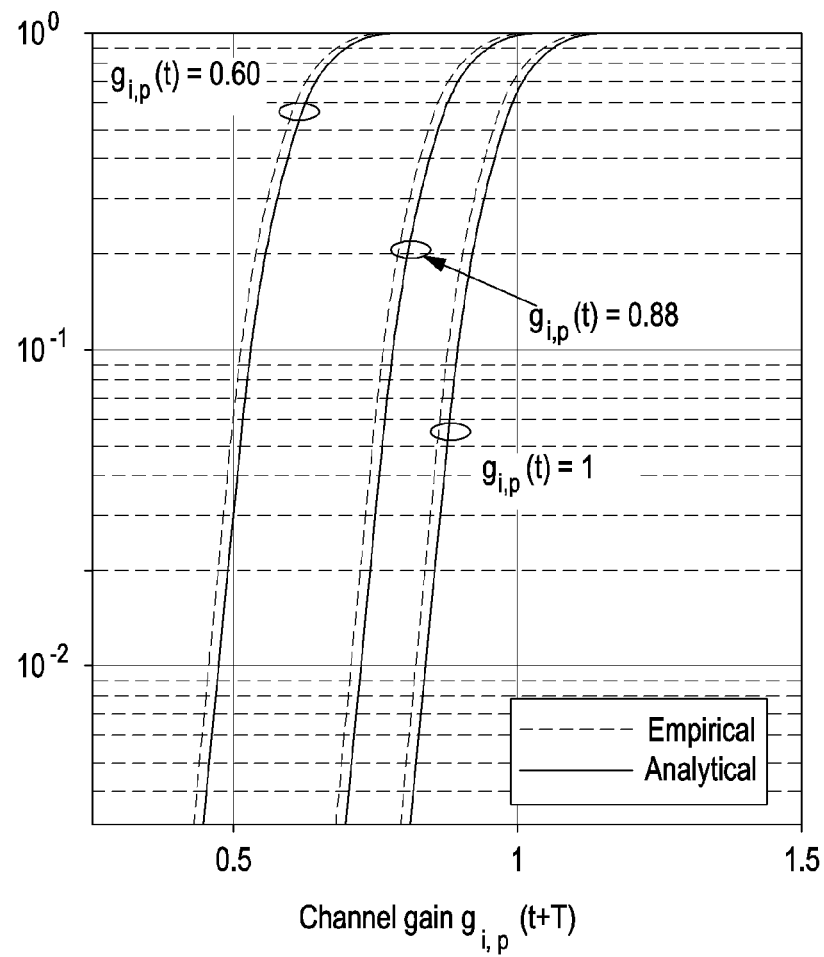
FIGS. 3H and 3I plot the conditional cumulative distribution function (CDF) for different values of $g_{i,p}(t)$ for $\rho_{i,p}(t, t+T)$, according to various embodiments of the disclosure.

To further assess the accuracy of the bivariate PDF model, the UE 104 plots the conditional CDFs $F_{g_{i,p}(t+T)}(x|g_{i,p}(t))$ for different values of $g_{i,p}(t)$ for $\rho_{i,p}(t, t+T)=0.91$ and $\rho_{i,p}(t, t+T)=-0.90$ as depicted in FIGS. 3F and 3G. The conditional CDFs influences the beam selection rules. From the plots depicted in FIGS. 3F, and 3G, a good match is observed over a three orders of magnitude range between the empirically obtained conditional CDF and the one derived from the bivariate PDFs in the Equation 7 and the Equation 29. Referring to FIG. 3H, $F_{g_{i,p}(t+T)}(x|g_{i,p}(t))$ shifts to the right as $g_{i,p}(t)$ increases because $\rho_{i,p}(t, t+T)$ is positive. On the other hand, referring to FIG. 3I, $F_{g_{i,p}(t+T)}(x|g_{i,p}(t))$ shifts to the left as $g_{i,p}(t)$ increases because $\rho_{i,p}(t, t+T)$ is negative. In general, some beam pairs can be positively correlated while others can be negatively correlated. Furthermore, $\rho_{i,p}(t, t+T)$ depends on the slot number can change signs even for the same beam pair.

Figure 3I:
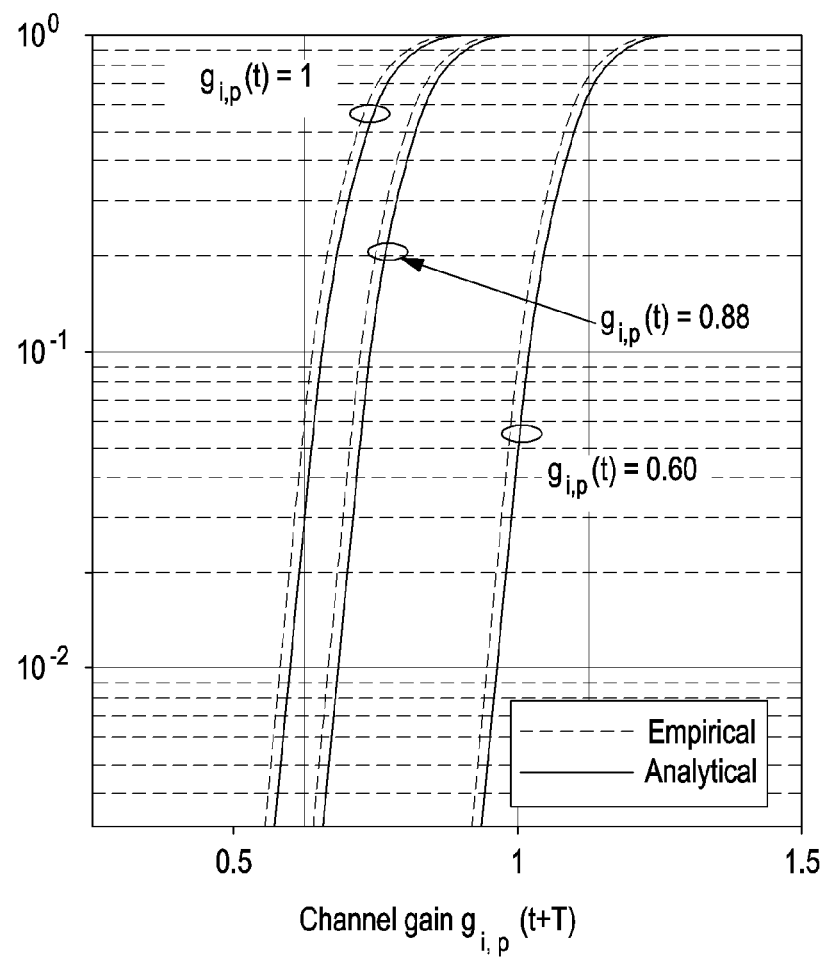

FIGS. 3H and 3I plot the conditional CDF for different values of $g_{i,p}(t)$ for $\rho_{i,p}(t, t+T)$, according to various embodiments of the disclosure.

The beam selection metric is a beam selection rule $\Phi$: $(R^+)^{B_{BS}} \times (R^+)^{B_{UE}} \rightarrow \{(1, 1) \ldots, (B_{BS}, B_{UE})\}$. The beam selection rule is mapping from the $B_{BS}B_{UE}$ measurements to a beam pair (i, p). The beam selection metric/beam selection rule finds the rule that maximizes the average data rate over the N data slots of a beam measurement cycle given the beam measurements g. Since the data rate is adapted in every slot, the data rate in the $k^{th}$ slot is $R(g_{i,p}(t_k))$ and its average is $E_{g,g_{i,p}(t_k)}[R(g_{i,p}(t_k))]$. The optimization problem is as follows:

Equation 36

$$\max_\Phi \left\{ \frac{1}{N} \sum_{k=1}^{N} E_{g,g_{i,p}(t_k)}[R(g_{i,p}(t_k))] \right\}, \quad (36)$$
$$\text{s.t.}(i, p) = \Phi(g)$$

The beam selection metric/beam selection rule selects the beam pair (i*, p*) that is given by:

Equation 37

$$(i^*, p^*) = \operatorname{argmax}_{i \in B_{BS}, p \in B_{UE}} \left\{ \frac{1}{N} \sum_{k=1}^{N} E_{g_{i,p}(t_k)}[R(g_{i,p}(t_k)) \mid g_{i,p}(T_{i,p})] \right\} \quad (37)$$

Thus, the Tx and Rx beam pair (i, p) that has the highest average data rate over the N slots conditioned on its beam measurement $g_{i,p}(T_{i,p})$ is optimal. From the Equation 7 and the Equation 29, the conditional expectations in the Equation 37 turn out to be single integrals; no closed-form expression is possible. The UE 104 has to compute the conditional expectations numerically for each value of $g_{i,p}(t)$. To reduce the computation, the UE 104 uses Jensen's inequality and a concave function (R(·)) to compute the conditional expectations as:

Equation 38

$$\frac{1}{N} \sum_{k=1}^{N} E_{g_{i,p}(t_k)}\left[R(g_{i,p}(t_k)) \mid g_{i,p}(T_{i,p})\right] \leq \frac{1}{N} \sum_{k=1}^{N} \log_2\left(1 + \frac{P_{tx} d_{i,p}(t_k)}{\sigma^2}\right). \quad (38)$$

wherein,

Equation 39

$$d_{i,p}(t) = E_{g_{i,p}(t_k)}\left[g_{i,p}^2(t) \mid g_{i,p}(T_{i,p})\right] \quad (39)$$

The expression for $d_{i,p}(t)$ can be derived in closed-form from the bivariate PDF model. When $\rho_{i,p}(t) \geq 0$, from the Equation 7, the conditional PDF $f_{g_{i,p}}(t)(r_2 | g_{i,p}(T_{i,p}) = r_1)$ may be represented as:

Equation 40

$$f_{q_{i,p}}(t)\left(r_2 \mid g_{i,p}(T_{i,p})\right) = r_1 = \frac{2mr_2^m}{r_1^{m-1} \Omega_{i,p}(t)[1 - \rho_{i,p}(t)]} \quad (40)$$

$$\left(\frac{\Omega_{i,p}(T_{i,p})}{\rho_{i,p}(t)\Omega_{i,p}(t)}\right)^{\frac{m-1}{2}} \times \exp\left(-\frac{m\rho_{i,p}(t)r_1^2}{[1 - \rho_{i,p}(t)]\Omega_{i,p}(T_{i,p})} - \right.$$

-continued $$\frac{mr_2^2}{[1 - \rho_{i,p}(t)]\Omega_{i,p}(t)} \times I_{m-1}\left(\frac{2m\sqrt{\rho_{i,p}(t)} r_1 r_2}{[1 - \rho_{i,p}(t)]\sqrt{\Omega_{i,p}(T_{i,p})\Omega_{i,p}(t)}}\right)$$

Using the Equation 40 and the identity $$\int_0^\infty r_2^{m+2} e^{-\delta r_2^2} I_{m-1}(\nu r_2) dr_2 = e^{-\nu_{4\delta}^2} \frac{\nu^{m-1}(\nu^2 + 4\delta m)}{(2\delta)^{m+2}}$$

to evaluate the conditional expectation in the Equation 39, the following closed-form expression is obtained:

Equation 41

$$d_{i,p}(t) = \frac{\Omega_{i,p}(t)}{\Omega_{i,p}(T_{i,p})}\left[(1 - \rho_{i,p}(t))\Omega_{i,p}(T_{i,p}) + \rho_{i,p}(t)g_{i,p}^2(T_{i,p})\right] \quad (41)$$

When $\rho_{i,p}(t) < 0$, from the bivariate PDF in the Equation 29, it is observed that $f_{g_{i,p}}(t)(r_2 | g_{i,p}(T_{i,p}) = r_1)$ has a form similar to the Equation 40 except that $r_1$ is replaced with $(a - r_1)$. Substituting $f_{g_{i,p}}(t)(r_2 | g_{i,p}(T_{i,p}) = r_1)$ in the Equation 39 and simplifying further yields:

Equation 42

$$d_{i,p}(t) = \frac{\Omega_{i,p}(t)}{\Omega_{i,p}(T_{i,p})}\left[(1 - \rho_{i,p}(t))\Omega_{i,p}(T_{i,p}) + \rho_{i,p}(t) \mid a - g_{i,p}(T_{i,p}))^2\right] \quad (42)$$

Using the above results, the UE 104 derives the bound-based selection rule for all the correlations:

Equation 43

$$(i^*, p^*) \operatorname{argmax}_{i \in B_{BS}, p \in B_{UE}} \left\{ \frac{1}{N} \sum_{k=1}^{N} \log_2\left(1 + \frac{P_{tx} d_{i,p}(t_k)}{\sigma^2}\right) \right\} \quad (43)$$

Embodiments herein refer to $d_{i,p}(t)$ as the selection metric. For $\rho_{i,p}(t) \geq 0$, it is a linear combination of the mean channel power $\Omega_{i,p}(t)$ and the beam measurement $g_{i,p}^2(T_{i,p})$. While, for $\rho_{i,p}(t) < 0$, it is a linear combination of $\Omega_{i,p}(t)$ and a quadratic function of $g_{i,p}(T_{i,p})$.

For $\rho_{i,p}(t) \geq 0$, when $g_{i,p}(T_{i,p})$ is large, the beam pair (i,p) may be selected increase. The reverse is true when $\rho_{i,p}(t) < 0$. As $|\rho_{i,p}(t)|$ decreases from 1 to 0, the weightage for the term that depends on $g_{i,p}(T_{i,p})$ decreases. From the Equation 11, it is observed that $\Omega_{i,p}(t)$ is a function of the orientation $\psi(t)$ of the UE 104. Thus, the beam selection metric is derived by considering the change in the orientation of the UE 104 in each of the N slots. The orientation can be tracked and predicted using orientation sensors installed in the UE. It can also be noted that the PABS rule is different from the conventional and widely used CPBS rule, in which:

$$(i^*, p^*) = \arg \max_{i \in B_{BS}, p \in B_{UE}} \{g_{i,p}^2(T_{i,p})\} \quad (44)$$

To implement, the bound-based selection rule, the UE 104 has to calculate the orientation of the UE 104 $\psi(t)$ and the speed, so that the UE 104 can estimate $\rho_{i,p}(t)$ and $\Omega_{i,p}(t)$. The UE 104 estimates the orientation using the one or more sensors and the speed from a level-crossing rate or the channel covariance. Alternatively, the UE 104 can directly estimate $\rho_{i,p}(t)$ and $\Omega_{i,p}(t)$ from the previous beam gain estimates.

Figure 4:
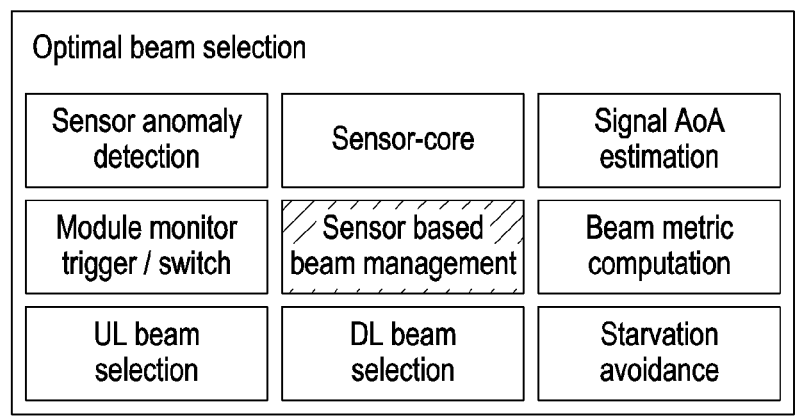
FIG. 4 is a conceptual diagram depicting a selection of the Tx and Rx beam pairs on a UE for communication, according to an embodiment of the disclosure.

FIG. 4 is a conceptual diagram depicting the selection of the Tx and Rx beam pairs on a UE for the communication, according to an embodiment of the disclosure.

Referring to FIG. 4, embodiments herein allow the UE 104 to select the Tx and Rx beam pair from the plurality of Tx and Rx beam pairs in the time varying channels for the communication. The UE 104 determines the beam parameters associated with each of the plurality of Tx and Rx beam pairs that are changing at the frequency above the first threshold. The UE 104 derives the beam selection metric for each Tx and Rx beam pair based on the associated beam parameters. The UE 104 selects the subset of Tx and Rx beam pairs from the plurality of Tx and Rx beam pairs, which is having the beam selection metric above the second threshold. The UE 104 prioritizes scanning/scheduling of the subset of Tx and Rx beam pairs to select the Tx and Rx beam pair for the communication.

Embodiments herein also allow the UE 104 to:
- manage the sensor data for determination of the beam parameters for each Tx and Rx beam pair;
- estimate the AoA of the signal received from the BS 102;
- pre-process the raw sensor data received from the one or more sensors;
- control operations of the one or more sensors such as, but are not limited to, tuning/power ON and OFF of the one or more sensors, or the like;
- avoid the measurement starvation of the Tx and Rx beam pairs during the prioritized scheduling;
- handle selection of the DL beams for optimizing the complexity of the prioritized measurement scheduling for the PDSCH receptions;
- handle selection of the UL beams for optimizing the complexity of prioritized measurement scheduling for the PUSCH transmissions;
- enable and disable motion compensation based on the motion of the UE 104 and throughput requirements; and
- detect the anomaly in the one or more sensors and allows the selection of the Tx and Rx beam pair using the round-robin based beam tracking method.

Figure 5:
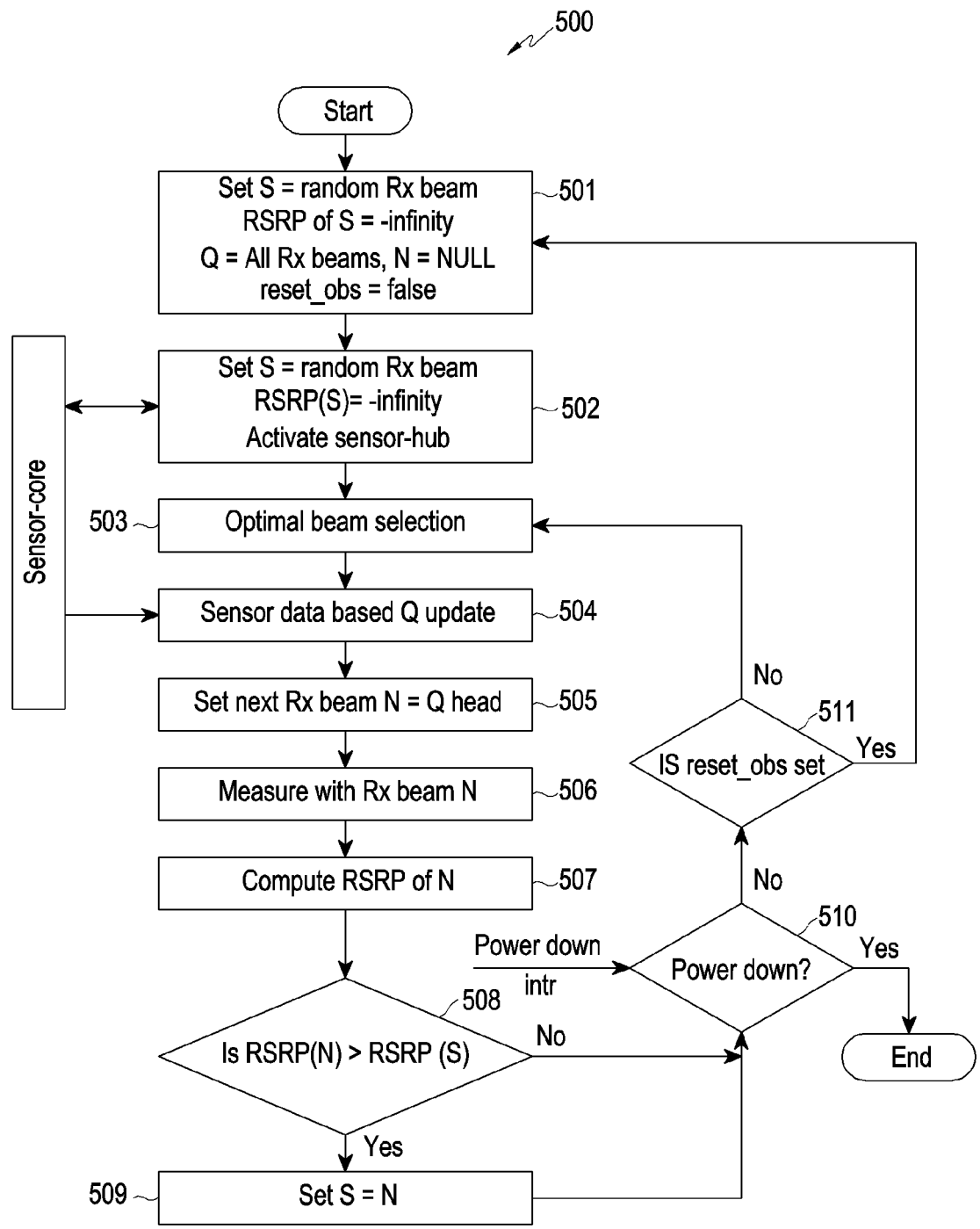
FIG. 5 is a flow diagram depicting a method for selecting the Tx and Rx beam pair for communication in a time-varying channel, according to an embodiment of the disclosure.

FIG. 5 is a flow diagram depicting a method for selecting the Tx and Rx beam pair for the communication in the time-varying channels, according to an embodiment of the disclosure.

Referring to FIG. 5, at operation 501, of flow diagram 500, the UE 104 sets/defines the RSRP threshold for the random Rx beam. At operation 502, the UE 104 activates the one or more sensors, the sensor core module 212b and the L1 controller 212c. The one or more sensors sense the raw sensor data associated with each Tx and Rx beam pair. The sensor core module 212b and the L1 controller 212c determine the beam parameters, based on the raw sensor data and the signals received from the BS 102 on the Tx beams, respectively.

At operation 503, the UE 104 selects the subset of Tx and Rx beam pairs from the plurality of Tx and Rx beam pairs, based on the determined beam parameters for each Tx and Rx beam pair. A method for selecting the subset of Tx and Rx beam pairs based on the associated beam parameters is described in detail in conjunction with FIG. 6.

On selecting the subset of Tx and Rx beam pairs, the UE 104 prioritizes the scheduling/scanning of the subset of Tx and Rx beam pairs to select the Tx and Rx beam pair for the communication. For the scheduling of the Tx and Rx beams, at operation 504, the UE 104 updates the sensor data-based queue (Q) with the selected subset of Tx and Rx beam pairs.

At operation 505, the UE 104 sets the Tx and Rx beam pair from the subset of Tx and Rx beam pairs to be scanned, as a Q head.

At operation 506, the UE 104 measures the Tx and Rx beam pair/Q head and, at operation 507, the UE 104 computes the RSRP value of the Tx and Rx beam pair. At operation 508, the UE 104 compares the RSRP value of the Tx and Rx beam pair with the RSRP threshold. If the RSRP value of the Tx and Rx beam pair is greater than the RSRP threshold, at operation 509, the UE 104 selects the corresponding Tx and Rx beam pair for the communication.

If the RSRP value of the Tx and Rx beam pair is not greater than the RSRP threshold value, at operation 510, the UE 104 checks if the power is down. If the power is down, the UE 104 ends the process of selecting the Tx and Rx beam pair.

If the power is not down, at operation 511, the UE 104 checks if a metric-based beam selection mode has been set or reset. In the metric-based beam selection mode, the UE 104 selects the subset of Tx and Rx beams pairs for the beam scheduling based on the beam selection metric. If the metric-based beam selection mode has been reset, the UE 104 performs the operations 501-511 for the remaining subset of Tx and Rx beam pairs, until the Tx and Rx beam pair is selected.

If the metric-based beam selection mode has been set, the UE 104 performs the operations 503-511 for the remaining subset of Tx and Rx beam pairs, until the Tx and Rx beam pair is selected. The various actions in flow diagram 500 may be performed in the order presented, in a different order or simultaneously. Further, in some embodiments, some actions listed in FIG. 5 may be omitted.

Figure 6:
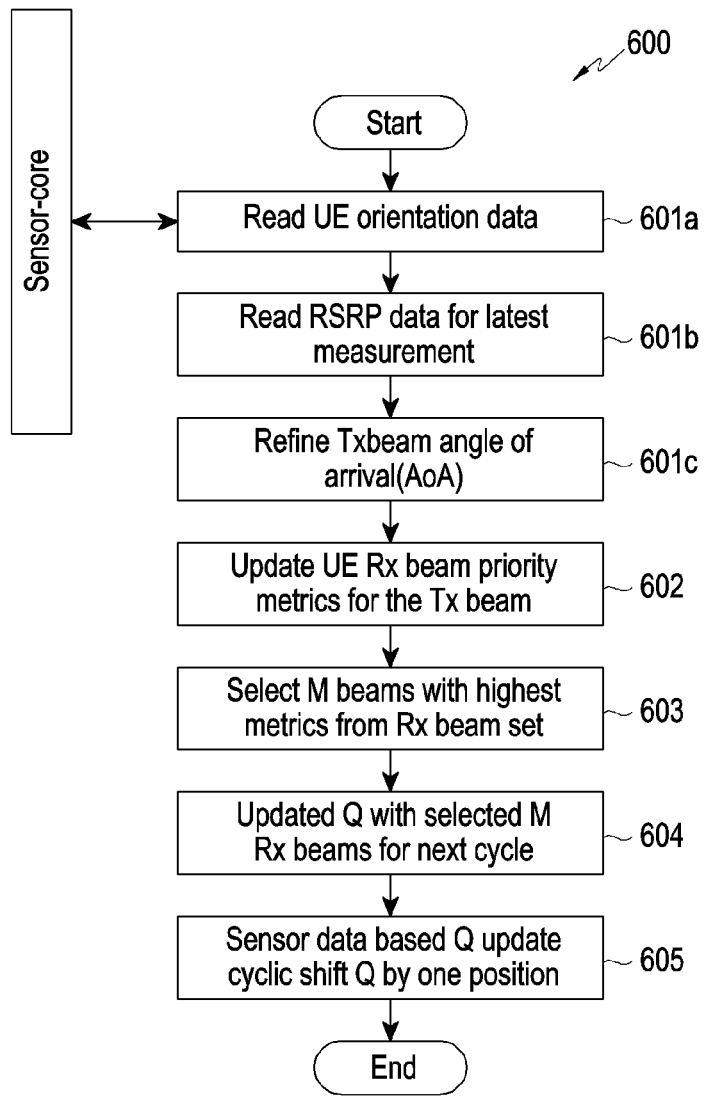
FIG. 6 is a flow diagram depicting a method for selecting a subset of Tx and Rx beam pairs for prioritized scheduling, according to an embodiment of the disclosure.

FIG. 6 is a flow diagram depicting a method for selecting the subset of Tx and Rx beam pairs for the prioritized scheduling, according to an embodiment of the disclosure.

Referring to FIG. 6, the UE 104 determines the beam parameters for each of the plurality of Tx and Rx beams, which are changing at the frequency above the first threshold. In an example herein, at operation 601a, of flow diagram 600, the UE 104 determines the orientation of the UE 104 (an example beam parameter) using the sensor core module 212b for each Tx and Rx beam pair. The sensor core module 212b processes the raw sensor data sensed by the one or more sensors to determine the orientation of the UE 104. At operation 601b, the UE 104 determines the RSRP value/channel gain (an example beam parameter) associated with each Tx and Rx beam pair, using the L1 controller 212c. At operation 601c, the UE 104 determines the Tx beam AoA (an example beam parameter) using the L1 controller 212c.

At operation 602, the UE 104 derives the beam selection metric for each Tx and Rx beam pair based on the determined beam parameters for each Tx and Rx beam pair. For deriving the beam selection metric, the UE 104 configures the statistical model by characterizing the beam parameters determined for each Tx and Rx beam pair at the first-time instance and the subsequent beam parameters determined for each Tx and Rx beam pair at the second-time instance. The UE 104 uses the configured statistical model to derive the beam selection metric for each Tx and Rx beam pair.

At operation 603, the UE 104 selects the subset of Tx and Rx beams pairs (for example, M beam pairs) from the plurality of Tx and Rx beam pairs, which are having the beam selection metric above the second threshold.

At operation 604, the UE 104 updates the sensor-based queue with the selected subset of Tx and Rx beam pairs. At operation 605, the UE 104 prioritizes the scanning of the subset of Tx and Rx beam pairs in the senor-based queue one by one to select the Tx and Rx beam pair for the communication (as described in FIG. 5). The various actions in the flow diagram 600 may be performed in the order presented, in a different order or simultaneously. Further, in some embodiments, some actions listed in FIG. 6 may be omitted.

Figure 7:
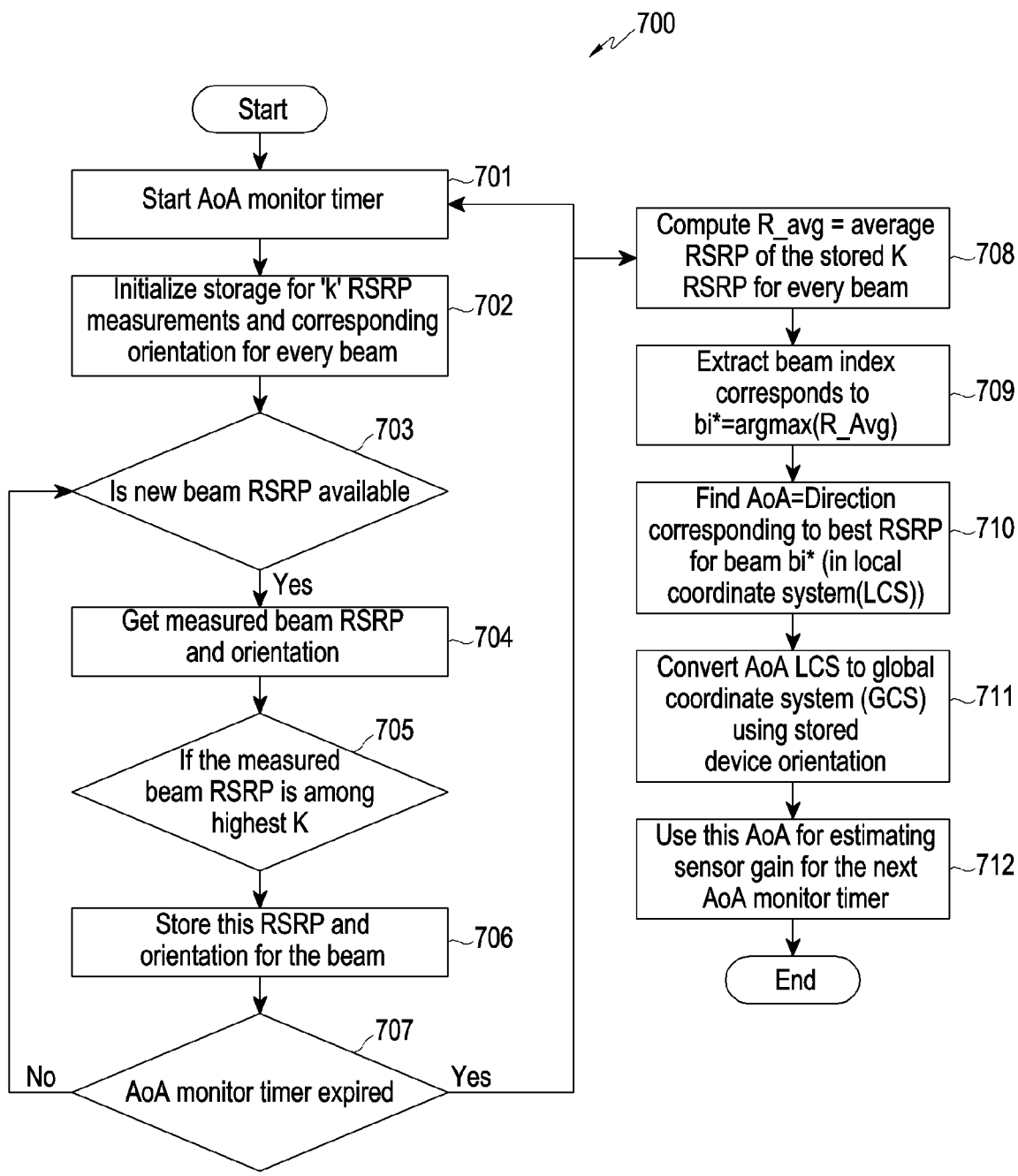
FIG. 7 is a flow diagram depicting a method for determining an angle of arrival (AoA) of a Tx beam (an example beam parameter), according to an embodiment of the disclosure.

FIG. 7 is a flow diagram depicting a method for determining the AoA of the Tx beam (an example beam parameter), according to an embodiment of the disclosure.

Referring to FIG. 7, at operation 701, of flow diagram 700, the UE 104 initiates the AOA monitor timer window. At operation 702, the initiates storage of 'the highest K' RSRP measurements and the corresponding orientation for each Tx and Rx beam pair.

At operation 703, the UE 104 checks if a new Tx and Rx beam pair is available. If the new Tx and Rx beam pair is available, at operation 704, the UE 104 measures the RSRP value and the corresponding orientation for the new Tx and Rx beam pair. At operation 705, the UE 104 checks if the measured RSRP value of the Tx and Rx beam pair is among the highest 'K' RSRP measurements. If the measured RSRP value of the Tx and Rx beam pair is among the highest 'K' RSRP measurements, at operation 706, the UE 104 stores the RSRP value of the Tx and Rx beam pair and the corresponding orientation.

At operation 707, the UE 104 checks if the AoA monitor timer window has expired. If the AoA monitor timer window has not been expired, the UE 104 performs the operations 703-707, until the expiry of the AoA monitor timer window.

If the AoA monitor timer window has been expired, at operation 708, the UE 104 computes the average RSRP value measurements for each Tx and Rx beam pair.

At operation 709, the UE 104 extracts the beam index based on the computed average RSRP value measurements.

At operation 710, the UE 104 determines the AoA as the direction corresponding to the best RSRP for the beam index. The determined AoA is in the LCS.

At operation 711, the UE 104 converts the AoA in the LCS to the GCS using the stored orientation. At operation 712, the UE 104 uses the AoA to estimate the sensor gain for the next AoA monitor timer window. The various actions in the flow diagram 700 may be performed in the order presented, in a different order or simultaneously. Further, in some embodiments, some actions listed in FIG. 7 may be omitted.

Figure 8:
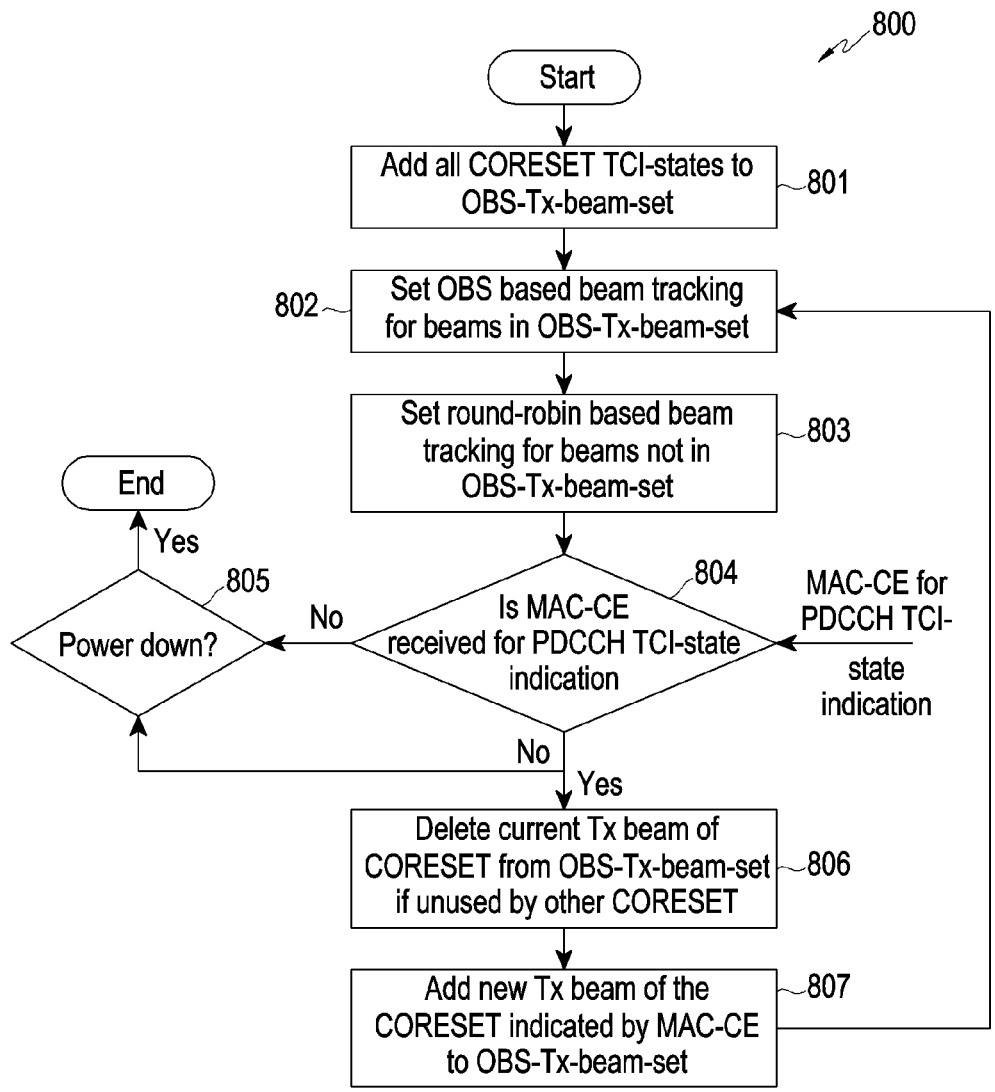
FIG. 8 is a flow diagram depicting a method for managing selection of downlink (DL) beams, if a tci-PresentInDCi is not configured on a UE, according to an embodiment of the disclosure.

FIG. 8 is a flow diagram depicting a method for managing selection of the DL beams, if the tci-PresentInDCi is not configured on a UE, according to an embodiment of the disclosure.

Referring to FIG. 8, at operation 801, of flow diagram 800, the UE 104 adds all the CORESET TCI-states (including the DL beams) to the beam selection metric-based beam set. At operation 802, the UE 104 initializes the beam selection metric-based tracking for the DL beams present in the beam selection metric-based beam set. At operation 803, the UE 104 initializes the round-robin based beam tracking method for the DL beams that have not been present in the beam selection metric-based beam set.

At operation 804, the UE 104 checks if the MAC-CE is received for the CORESET PDCCH TCI-state change to update the DL beams. If the MAC-CE is not received, at operation 805, the UE 104 checks if the power is down. If the power is not down, the UE 104 ends the process of selecting the DL beams for the DL transmission.

If the MAC-CE is received, at operation 806, the UE deletes the current DL beams of the CORESET from the beam selection metric-based beam set, if the current DL beams have been unused by other CORESET and deletes the beam selection metric-based tracking for the deleted DL beams. At operation 807, the UE adds the new/updated DL beams of the CORESET indicated by the MAC-CE to the beam selection metric-based beam set and allows the beam selection metric-based tracking for the updated DL beams. The UE 104 continues performing the operations 802-807, until all the DL beams have been scanned. The various actions in the flow diagram 800 may be performed in the order presented, in a different order or simultaneously. Further, in some embodiments, some actions listed in FIG. 8 may be omitted.

Figure 9:
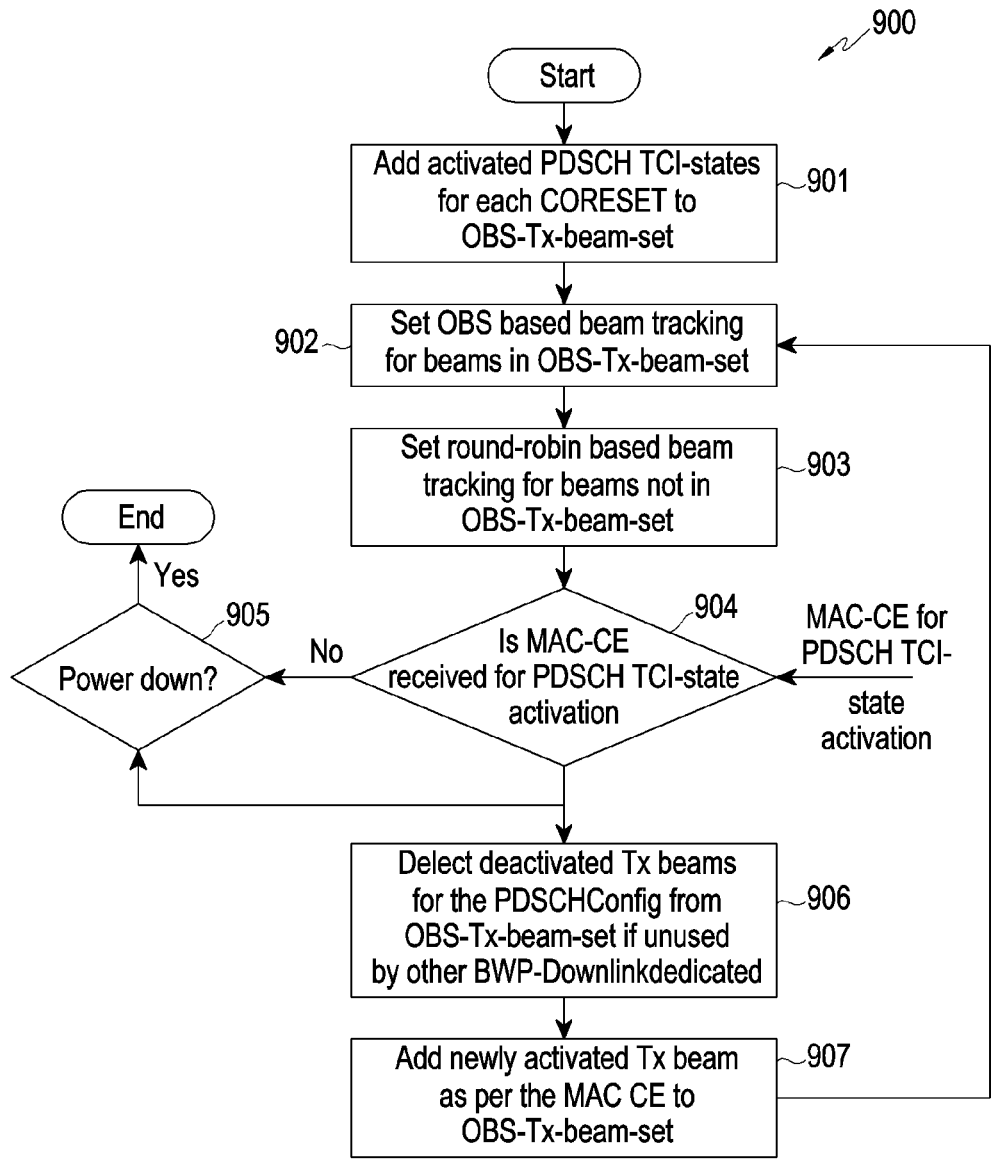
FIG. 9 is a flow diagram depicting a method for selecting DL beams for DL transmissions, if a tci-PresentInDCi is configured on a UE, according to an embodiment of the disclosure.

FIG. 9 is a flow diagram depicting a method for selecting the DL beams for the DL transmissions, if the tci-PresentInDCi is configured on a UE, according to an embodiment of the disclosure.

Referring to FIG. 9, at operation 901, of flow diagram 900, the UE 104 receives the beams corresponding to the activated PDSCH TCI-states for each BWP-Downlink-Dedicated, and adds the beams corresponding to the activated PDSCH TCI-states received for each CORESET to the beam selection metric-based beam set. At operation 902, the UE 104 initializes the beam selection metric-based tracking for the DL beams present in the beam selection metric-based beam set. At operation 903, the UE 104 initializes the round-robin based beam tracking method for the DL beams that have not been present in the beam selection metric-based beam set.

At operation 904, the UE 104 checks if the MAC-CE is received for the PDCCH TCI-state activation/deactivation to update the DL beams. If the MAC-CE is not received, at operation 905, the UE 104 checks if the power is down. If the power is down, the UE 104 ends the process of selecting the DL beams for the DL transmissions.

If the MAC-CE is received, at operation 906, the UE 104 deletes the current DL beams of the CORESET from the beam selection metric-based beam set, if the current DL beams have been unused by any other BWP-Downlink-Dedicated configured on the UE 104 and allows the round-robin based beam tracking method for the deleted current DL beams. At operation 907, the UE 104 adds the new/updated DL beams of the CORESET indicated by the MAC-CE to the beam selection metric-based beam set and allows the beam selection metric-based tracking for the updated DL beams. The UE 104 continues performing the operations 902-907, until all the DL beams have been scanned. The various actions in the flow diagram 900 may be performed in the order presented, in a different order or simultaneously. Further, in some embodiments, some actions listed in FIG. 9 may be omitted.

Figure 10:
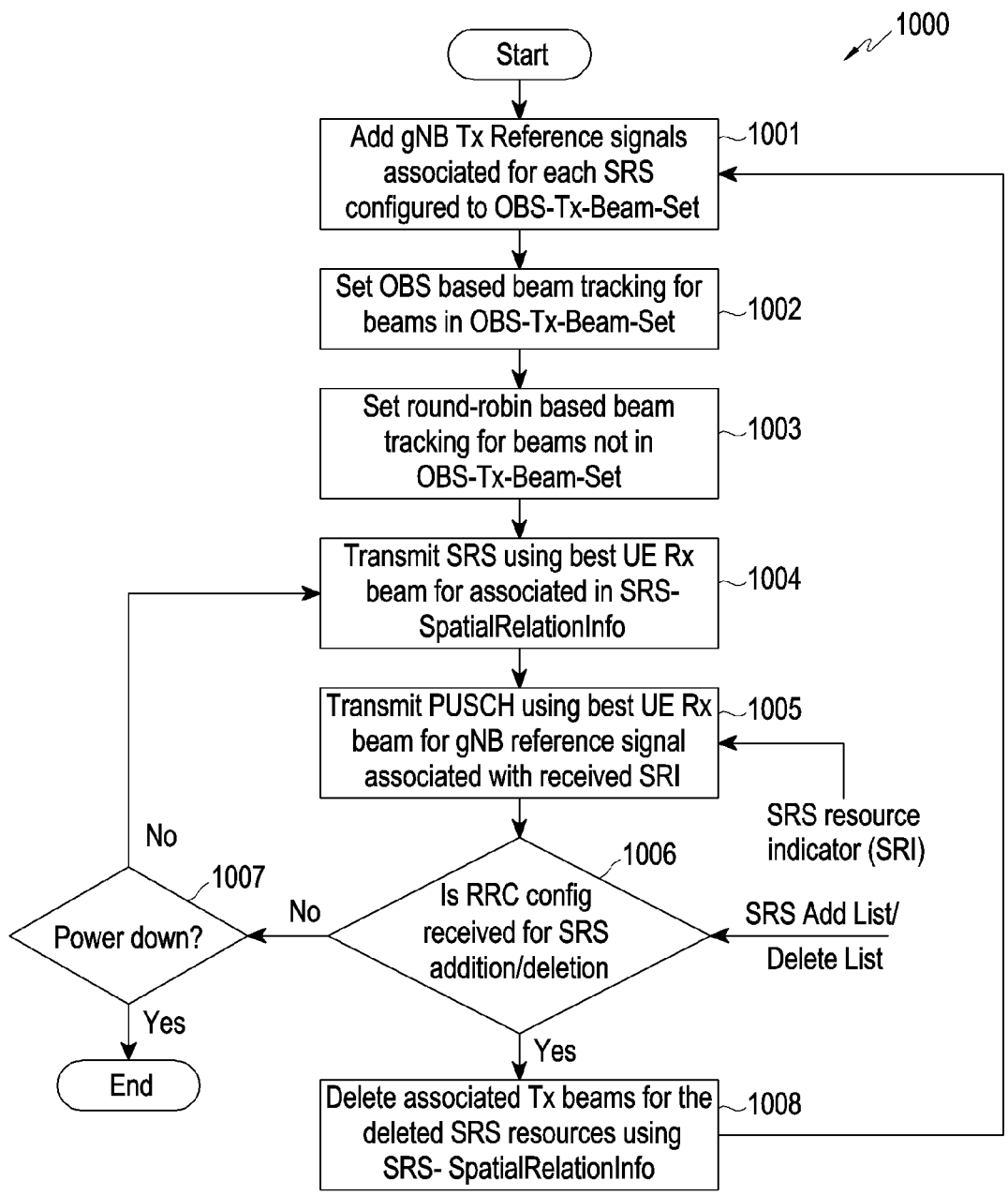
FIG. 10 is a flow diagram depicting a method for selecting UL beams by optimizing a complexity of prioritized measurement scheduling for PUSCH transmissions, according to an embodiment of the disclosure.

FIG. 10 is a flow diagram depicting a method for selecting the UL beams by optimizing the complexity of prioritized measurement scheduling for the PUSCH transmissions, according to an embodiment of the disclosure.

Referring to FIG. 10, at operation 1001, of flow diagram 1000, the UE 104 adds all the Tx reference signals (i.e., the UL beams) present in the SRS resources to the beam selection metric-based beam set. At operation 1002, the UE 104 sets the beam selection metric-based tracking for the UL beams present in the beam selection metric-based beam set. At operation 1003, the UE 104 sets the round-robin based beam tracking method for the UL beams, which have not been present in the beam selection metric-based beam set. At operation 1004, the UE 104 selects the Rx beam used for the reception of the SRS resources from the BS 102 as the UL beam and transmits the SRS to the BS 102 using the selected UL beam. At operation 1005, the UE 104 selects the Rx beam used for the reception of the SRI from the BS as the UL beam and uses the selected UL beam to transmit the PUSCH to the BS.

At operation 1006, the UE 104 checks if the RRC reconfiguration message is received for the SRS addition or deletion. If the RRC reconfiguration is not received, at operation 1007, the UE 104 checks if the power is down. If the power is down, the UE 104 ends the process of selecting the UL beams for the UL transmission. If the power is not down, the UE 104 starts performing from the operation 1004.

If the RRC reconfiguration message is received, at operation 1008, the UE 104 updates the beam selection metric-based beam set to include and delete the associated UL beams for the deleted SRS resources using the SRS spatial relation information. The various actions in the flow diagram 1000 may be performed in the order presented, in a different order or simultaneously. Further, in some embodiments, some actions listed in FIG. 10 may be omitted.

Figure 11:
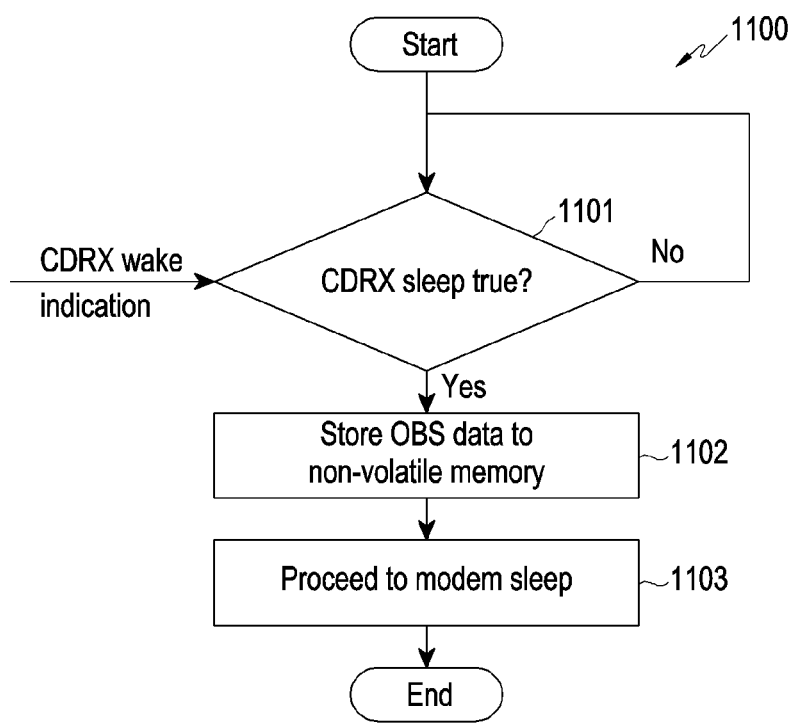
FIGS. 11 and 12 are flow diagrams depicting a method for handling Connected mode Discontinuous Reception (CDRX) cycles, while selecting a Tx and Rx beam pair for communication, according to various embodiments of the disclosure.
Figure 12:
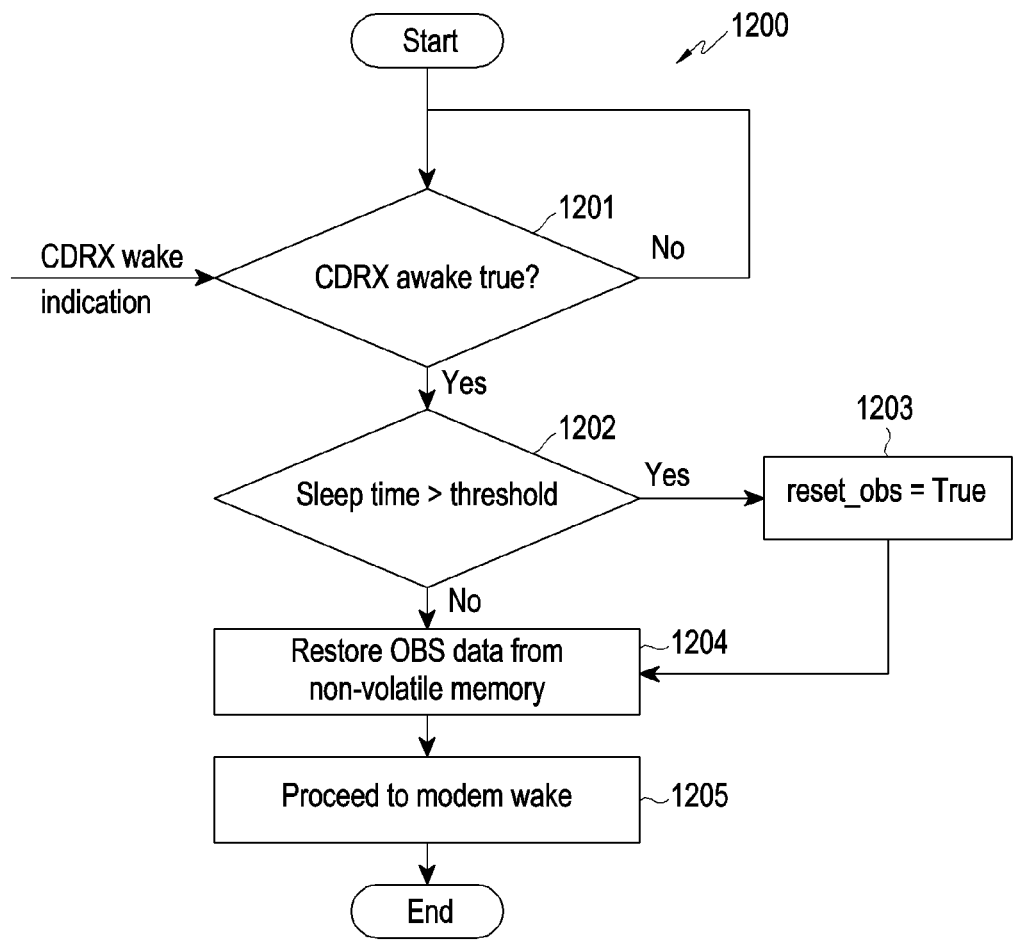

FIGS. 11 and 12 are flow diagrams depicting a method for handling the CDRX cycles, while selecting the Tx and Rx beam pair for the communication, according to various embodiments of the disclosure.

Referring to FIG. 11, on receiving the CDRX sleep initiation signal, at operation 1101, of flow diagram 1100, the UE 104 checks if the received CDRX sleep initiation signal is true. If the received CDRX sleep initiation signal is not true, the UE 104 again performs the operation 1101.

If the received CDRX sleep initiation signal is true, at operation 1102, the UE stores the beam selection metric and the selected Tx and Rx beam pair in the memory 202. At operation 1103, the UE 104 transits into the sleep state.

Referring to FIG. 12, on receiving the CDRX wake up signal, at operation 1201, of flow diagram 1200, the UE 104 checks if the received CDRX wake up signal (awake signal) is true. If the received CDRX wake up signal is not true, the UE 104 again performs the operation 1201.

If the received CDRX wake up signal is true, at operation 1202, the UE 104 checks if the sleep duration exceeds the pre-defined sleep threshold. If the sleep duration exceeds the pre-defined sleep threshold, at operation 1203, the UE 104 resets the process of selecting the Tx and Rx beam pair.

If the sleep duration does not exceed the pre-defined sleep threshold, at operation 1204, the UE 104 retrieves the beam selection metric and the selected Tx and Rx beam pair for further process. At operation 1205, the UE 104 transits from the sleep mode to the wake up/awake mode. The various actions in the flow diagram 1100 and the flow diagram 1200 may be performed in the order presented, in a different order or simultaneously. Further, in some embodiments, some actions listed in FIGS. 11 and 12 may be omitted.

Figure 13:
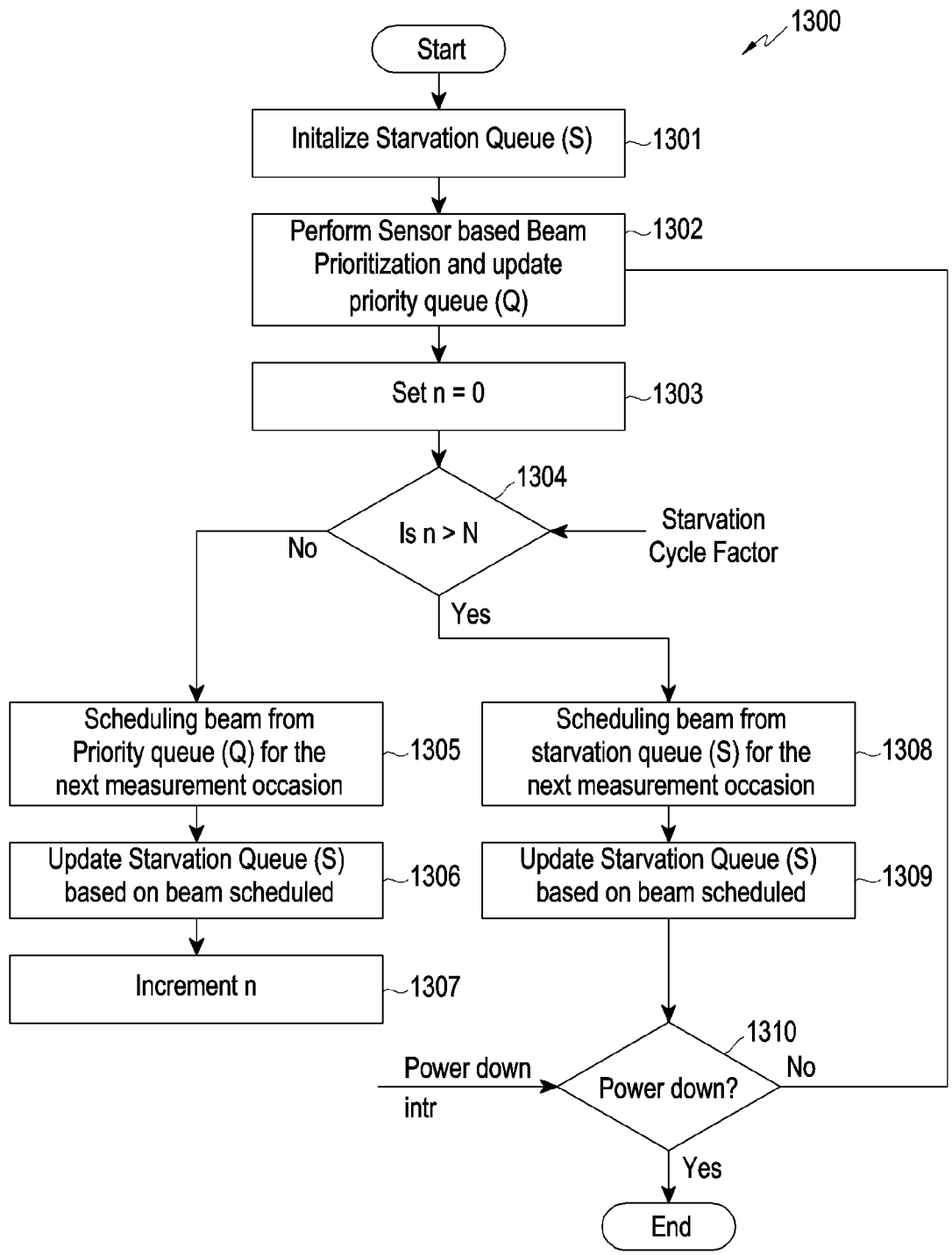
FIG. 13 is a flow diagram depicting a method for handling a measurement starvation of Tx and Rx beam pairs during prioritized scanning/scheduling of a subset of the Tx and Rx beam pairs, according to an embodiment of the disclosure.

FIG. 13 is a flow diagram depicting a method for handling the measurement starvation of the Tx and Rx beam pairs during the prioritized scanning/scheduling of the subset of the Tx and Rx beam pairs, according to an embodiment of the disclosure.

Referring to FIG. 13, at operation 1301, of flow diagram 1300, the UE 104 initializes the priority queue and the starvation queue. The UE 104 adds the prioritized Tx and Rx beam pairs in the prioritized queue and the non-prioritized Tx and Rx beams (starvation beams) in the starvation queue. The UE 104 arranges the Tx and Rx beam pairs in the starvation queue based on associated starved time. The starved time may be the difference between the Tx and Rx beam pair last measured and measured at the current instance.

At operation 1302, the UE 104 schedules the scanning of the Tx and Rx beams present in the prioritized queue. At operation 1303, the UE 104 sets the number of Tx and Rx beam pairs to zero. At operation 1304, the UE checks if the number of Tx and Rx beam pairs is greater than the N number of prioritized Tx and Rx beams. If the number of Tx and Rx beam pair is lesser than the N number of prioritized Tx and Rx beams, at operation 1305, the UE 104 schedules/scans the Tx and Rx beams present in the prioritized queue for the next measurement occasion. At operation 1306, the UE 104 updates the prioritized queue based on the scheduled Tx and Rx beam pair. At operation 1307, the UE 104 increments the number of Tx and Rx beam pairs by 1 and performs the operations 1304-1307 for all the remaining number of Tx and Rx beam pairs.

If the number of Tx and Rx beam pair is greater than the N number of prioritized Tx and Rx beams, at operation 1308, the UE 104 schedules/scans the Tx and Rx beams present in the starvation queue for the next measurement occasion. At operation 1309, the UE 104 updates the starvation queue based on the scheduled Tx and Rx beam pair. At operation 1310, the UE 104 checks if the power is down. If the power is down, the UE 104 ends the process of handling the measurement starvation of the beams. The various actions in the flow diagram 1300 may be performed in the order presented, in a different order or simultaneously. Further, in some embodiments, some actions listed in FIG. 13 may be omitted.

Figure 14:
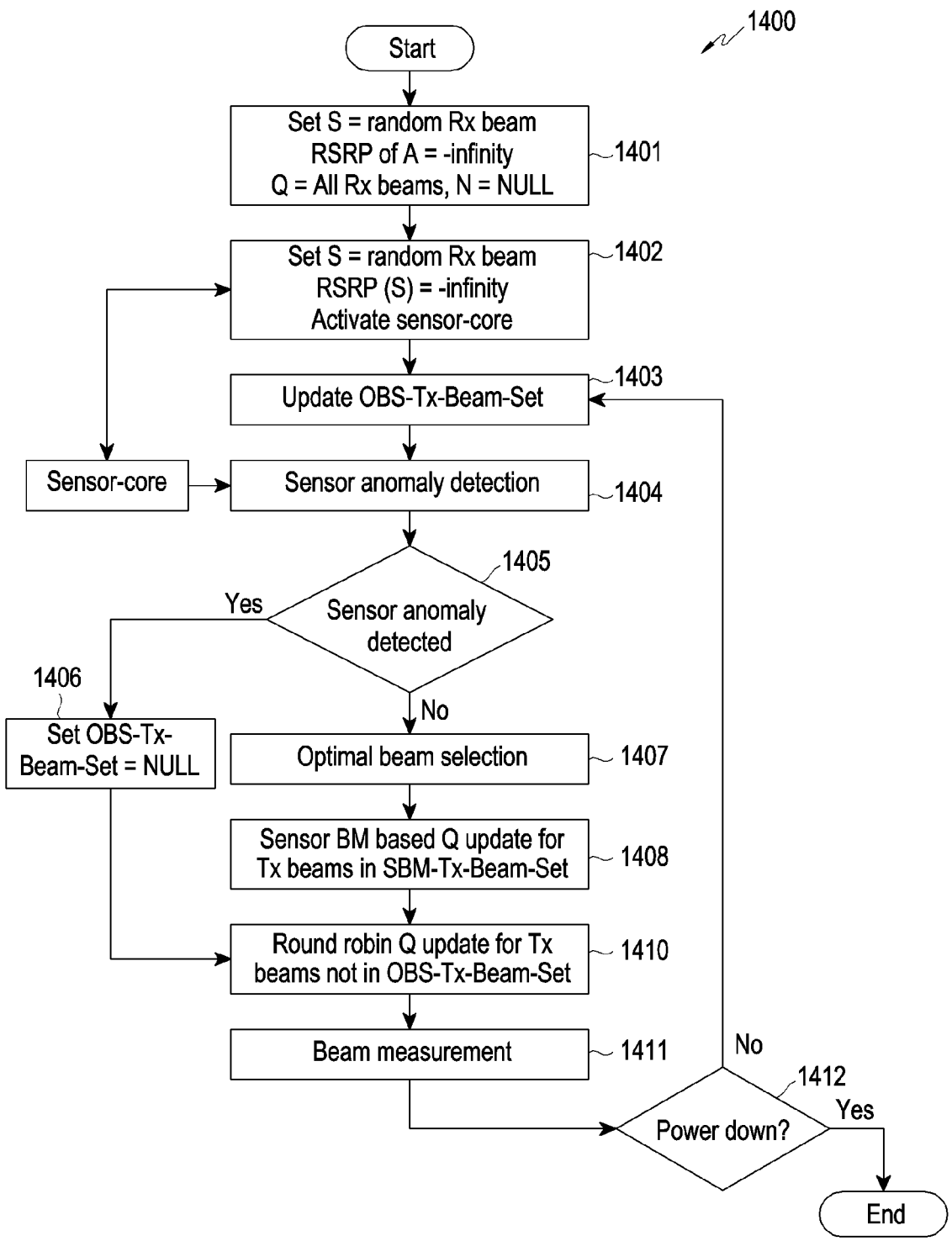
FIG. 14 is a flow diagram depicting a method for beam selection with sensor anomaly detection, according to an embodiment of the disclosure.

FIG. 14 is a flow diagram depicting a method for the beam selection with the sensor anomaly detection, according to an embodiment of the disclosure.

Referring to FIG. 14, at operation 1401, of flow diagram 1400, the UE 104 sets/defines the RSRP threshold for the random Rx beam. At operation 1402, the UE 104 activates the one or more sensors, the sensor core module 212b and the L1 controller 212c. The one or more sensors sense the raw sensor data associated with each Tx and Rx beam pair. The sensor core module 212b and the L1 controller 212c determine the beam parameters, based on the raw sensor data and the signals received from the BS 102 on the Tx beams, respectively.

At operation 1403, the UE 104 updates the Tx and Rx beam pairs for the beam selection. At operation 1404, the UE 104 initiates the process of detecting the anomaly in the one or more sensors of the sensor unit 208. At operation 1405, the UE 104 checks if the anomaly is detected in the one or more sensors. If the anomaly is detected in the one or more sensors, at operation 1406, the UE 104 updates the Tx and Rx beam pairs and performs operation 1410. At operation 1410, the UE 104 performs the round robin-based beam tracking method.

If the anomaly is not detected in the one or more sensors, at operation 1407, the UE 104 selects the subset of Tx and Rx beam pairs based on the beam selection metric. At operation 1408, the UE 104 updates the selected subset of Tx and Rx beam pairs in the sensor data-based queue. At operation 1411, the UE 104 performs the beam scheduling for the Tx and Rx beam pairs present in the sensor data based queue, and then determines whether to power down, at operation 1412. The various actions in the flow diagram 1400 may be performed in the order presented, in a different order or simultaneously. Further, in some embodiments, some actions listed in FIG. 14 may be omitted.

Figure 15:
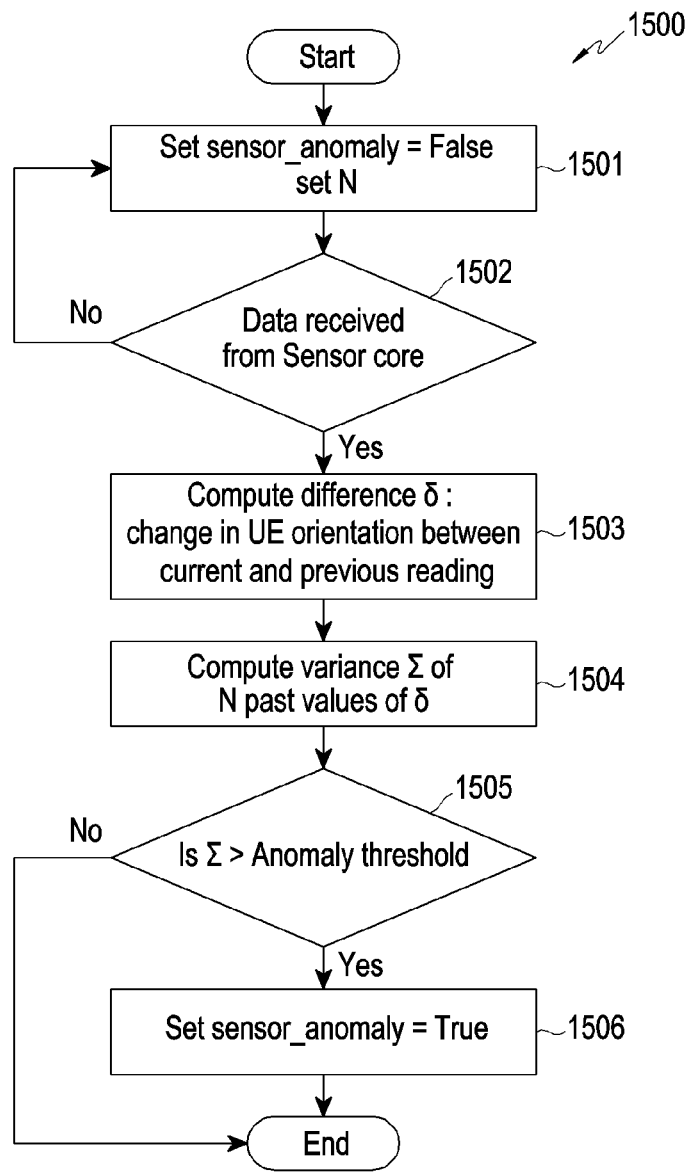
FIG. 15 is a flow diagram depicting a method for detecting an anomaly in one or more sensors used for determining an orientation of a UE, according to an embodiment of the disclosure.

FIG. 15 is a flow diagram depicting a method for detecting the anomaly in the one or more sensors, according to an embodiment of the disclosure.

Referring to FIG. 15, at operation 1501, of flow diagram 1500, the UE 104 sets an anomaly status as false. At operation 1502, the UE 104 checks if the raw sensor data (i.e., the orientation of the UE 104) have been received from the sensor core module 212b. If the data have not received, the UE 104 restarts from the operation 1501.

If the data have been received, at operation 1503, the UE 104 computes the difference between the currently received raw sensor data and the previously received raw sensor data. The difference depicts the change in the orientation of the UE 104. At operation 1504, the UE 104 computes the variance using the computed difference between the between the currently received raw sensor data and the previously received raw sensor data. At operation 1505, the UE 104 compares the variance with the anomaly threshold. If the variance is lesser than the anomaly threshold, the UE 104 detects no failure/anomaly in the one or more sensors. If the variance is greater than the anomaly threshold, at operation 1506, the UE 104 detects the failure/anomaly in the one or more sensors for further management. The various actions in the flow diagram 1500 may be performed in the order presented, in a different order or simultaneously. Further, in some embodiments, some actions listed in FIG. 15 may be omitted.

Figure 16:
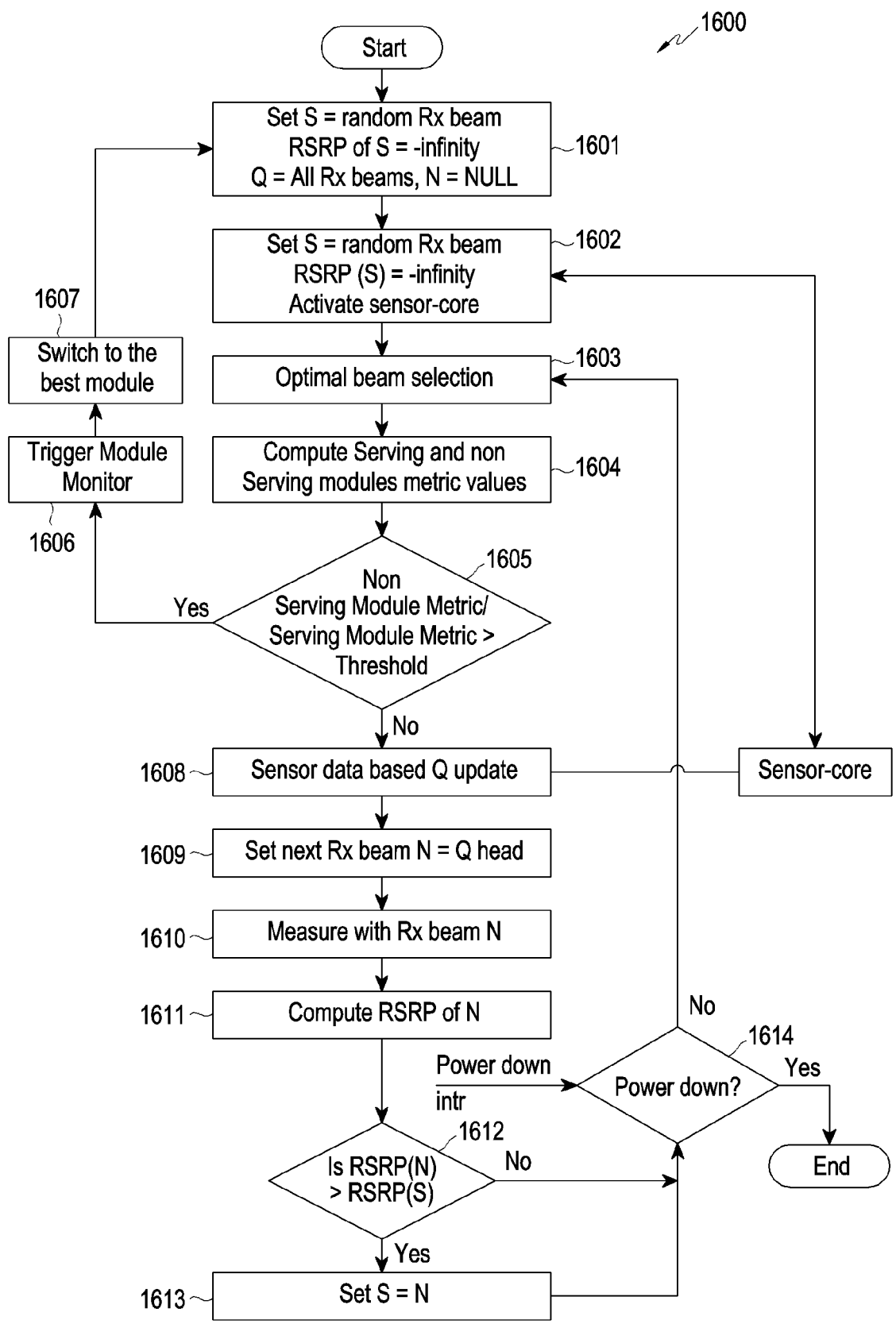
FIG. 16 is a flow diagram depicting a method for selecting a radio frequency (RF) module for transmissions and receptions, according to an embodiment of the disclosure.

FIG. 16 is a flow diagram depicting a method for selecting an RF module for the transmissions and receptions, according to an embodiment of the disclosure.

Referring to FIG. 16, at operation 1601, of flow diagram 1600, the UE 104 sets/defines the RSRP threshold for the random Rx beam. At operation 1602, the UE 104 activates the one or more sensors, the sensor core module 212b and the L1 controller 212c. The one or more sensors sense the raw sensor data associated with each Tx and Rx beam pair. The sensor core module 212b and the L1 controller 212c determine the beam parameters, based on the raw sensor data and the signals received from the BS 102 on the Tx beams, respectively.

At operation 1603, the UE 104 derives the beam selection metric for the Tx and Rx beam pairs to identify the subset of Tx and Rx beams for the beam scheduling.

At operation 1604, the UE 104 computes the SM for the serving RF module 204 and the OM for the non-serving RF modules 204. At operation 1605, the UE 104 compares the ratio of the SM to the OM with the module metric threshold. If the ratio of the SM to the OM is greater than the module metric threshold, at operation 1606, the UE 104 selects and allows the RF module 204 associated with the highest RSRP, compared to others for the data transmissions and receptions. At operation 1607, the UE 104 switches to the enabled RF module 204 for the data transmissions and receptions.

If the ratio of the SM to the OM is not greater than the module metric threshold, at operation 1608, the UE 104 updates the Tx and Rx beam pairs in the sensor data-based queue. At operation 1609, the UE 104 sets the Tx and Rx beam pair from the subset of Tx and Rx beam pairs to be scanned, as the Q head.

At operation 1610, the UE 104 measures the set Tx and Rx beam pair and at operation 1611, the UE 104 computes the RSRP value of the Tx and Rx beam pair. At operation 1612, the UE 104 compares the RSRP value of the Tx and Rx beam pair with the RSRP threshold. If the RSRP value of the Tx and Rx beam pair is greater than the RSRP threshold, at operation 1613, the UE 104 selects the corresponding Tx and Rx beam pair for the communication.

If the RSRP value of the Tx and Rx beam pair is not greater than the RSRP threshold, at operation 1614, the UE 104 checks if the power is down. If the power is down, the UE 104 ends the process of selecting the Tx and Rx beam pair.

If the power is not down, the UE 104 repeats the operations 1603-1614, until the Tx and Rx beam pair is selected. The various actions in the flow diagram 1600 may be performed in the order presented, in a different order or simultaneously. Further, in some embodiments, some actions listed in FIG. 16 may be omitted.

The embodiments disclosed herein may be implemented through at least one software program running on at least one hardware device and performing network management functions to control the elements. The elements shown in FIGS. 1-3A, may be at least one of a hardware device, or a combination of hardware device and software module.

The embodiments disclosed herein describe methods and systems for selecting beam pairs in a beamforming-based communication system. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g., very high speed integrated circuit hardware description language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and field programmable gate array (FPGA), or at least one microprocessor and at least one memory with software modules located therein. The method embodiments described herein could be implemented partly in hardware and partly in software. Alternatively, the disclosure may be implemented on different hardware devices, e.g., using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for selecting beam pairs in a beamforming-based communication system, the method comprising:
   receiving, by a user equipment (UE) from a base station (BS), a plurality of transmit (Tx) beams on a plurality of receive (Rx) beams;
   determining, by the UE, beam parameters associated with a plurality of Tx and Rx beam pairs changing at a frequency above a first threshold;

deriving, by the UE, a beam selection metric for the plurality of Tx and Rx beam pairs using the beam parameters;

identifying, by the UE, a subset of Tx and Rx beam pairs among the plurality of Tx and Rx beam pairs with the beam selection metric above a second threshold; and prioritizing scanning of the subset of Tx and Rx beam pairs to select a Tx and Rx beam pair for communication.

2. The method of claim 1, further comprising at least one of:

reporting, by the UE, the Tx and Rx beam pair to the BS for reselecting at least one Tx beam to transmit data to the UE; or prioritizing, by the UE, beam measurements in at least one beam measurement scenario based on the Tx and Rx beam pair.

3. The method of claim 1, wherein the beam parameters comprise at least one of channel gain, an orientation of the UE, a beam gain pattern, an angle of arrival (AoA) of the plurality of Tx beams, channel gain measurement, and channel correlation in time, wherein the first threshold indicates a time-varying nature of a channel over which the UE receives the plurality of Tx beams, and wherein the second threshold comprises a beam selection metric value defined by monitoring the beam selection metric associated with at least one Tx and Rx beam pair from a sorted list of beam selection metric associated with the plurality of Tx and Rx beam pairs in a descending order.

4. The method of claim 3, further comprising:

determining the orientation of the UE, wherein the determining of the orientation of the UE comprises:

receiving raw sensor data associated with the UE from at least one sensor; and combining the received sensor data using a sensor fusion method to determine the orientation of the UE.

5. The method of claim 4, further comprising:

determining a difference between currently sensed raw sensor data and previously sensed raw sensor data by the at least one sensor;

computing a variance using the difference;

comparing the variance with an anomaly threshold;

based on the variance being less than the anomaly threshold, detecting absence of an anomaly in the at least one sensor; and based on the variance being greater than the anomaly threshold, detecting presence of the anomaly in the at least one sensor and allowing a round-robin based beam tracking to select the Tx and Rx beam pair for the communication.

6. The method of claim 3, further comprising:

determining the AoA, wherein the determining of the AoA comprises:

defining an AoA monitor time window;

monitoring the plurality of Tx and Rx beam pairs and measuring reference signal received power (RSRP) values and corresponding orientation of the UE for each of the plurality of Tx and Rx beams during the AoA monitor time window;

storing highest RSRP values among the measured RSRP values and the corresponding orientation of the UE for each Tx and Rx beam monitored during the AoA monitor time window;

averaging the highest RSRP values and determining a beam index using the averaged RSRP values;

determining the AoA using the beam index and the orientation of the UE, wherein the determined AoA is in a local coordinate system (LCS); and converting the AoA in the LCS to an AoA in a global coordinate system using the stored orientation of the UE.

7. The method of claim 3, wherein the determining of the beam parameters comprises:

determining the beam parameters associated with each of the plurality of Tx and Rx beam pairs at a first-time instance, and wherein the first-time instance is time at which beam measurements are received by the UE for each Tx and Rx beam pair.

8. The method of claim 7, wherein the deriving of the beam selection metric comprises:

determining subsequent beam parameters associated with each of the plurality of Tx and Rx beam pairs at a second-time instance, the second-time instance being at least one of a time at which the UE selects the Tx and Rx beam pair, a time at which the UE receives data from the BS, or a time at which the UE transmits the data to the BS;

configuring a statistical model to characterize joint statistics of the beam parameters of each Tx and Rx beam pair determined at the first-time instance and the subsequent beam parameters of each Tx and Rx beam pair determined at the second-time instance; and deriving the beam selection metric for each Tx and Rx beam pair based on the configured statistical model.

9. The method of claim 8, wherein the beam parameters of each Tx and Rx beam pair determined at the first-time instance and the subsequent beam parameters of each Tx and Rx beam pair determined at the second-time instance is non-negatively correlated; or wherein the beam parameters of each Tx and Rx beam pair determined at the first-time instance and the subsequent beam parameters of each Tx and Rx beam pair determined at the second-time instance is negatively correlated.

10. The method of claim 8, wherein the statistical model comprises one of a bivariate probability density function (PDF) model, a PDF model, and a modified bivariate Nakagami-m (MBN) model.

11. The method of claim 8, wherein the statistical model comprises a function of at least one of mean channel power, power correlation coefficient, or a first set of parameters, and wherein the power correlation coefficient is based on the orientation of the UE, speed, and a second set of parameters.

12. The method of claim 8, wherein the deriving of the beam selection metric based on the configured statistical model comprises:

measuring a third set of parameters corresponding to each Tx and Rx beam pair;

in response to the beam parameters of each Tx and Rx beam pair determined at the first-time instance and the subsequent beam parameters of each Tx and Rx beam pair determined at the second-time instance being non-negatively correlated, utilizing the configured statistical model to derive the beam selection metric for each Tx and Rx beam pair based on the third set of parameters; and in response to the beam parameters of each Tx and Rx beam pair determined at the first-time instance and the subsequent beam parameters of each Tx and Rx beam pair determined at the second-time instance being negatively correlated, utilizing the configured statistical model to derive the beam selection metric for each Tx and Rx beam pair based on the third set of parameters and a constant (a).

13. The method of claim 12, wherein the third set of parameters comprise at least one of an average channel gain measured at the first-time instance, an average channel power gain measured at the second-time instance, a correlation between the channel gain measured at the first-time instance and the subsequent channel gain measured at the second-time instance and channel power measurement.

14. A user equipment (UE) in a beamforming-based communication system, the UE comprising:
- a radio frequency (RF) circuit configured to receive, from a base station (BS), a plurality of transmit (Tx) beams on a plurality of receive (Rx) beams; and
- a control processor coupled to the RF circuit, the control processor being configured to:
  - determine beam parameters associated with a plurality of Tx and Rx beam pairs changing at a frequency above a first threshold,
  - derive a beam selection metric for the plurality of Tx and Rx beam pairs using the beam parameters,
  - identify a subset of Tx and Rx beam pairs among the plurality of Tx and Rx beam pairs with the beam selection metric above a second threshold, and
  - prioritize scanning of the subset of Tx and Rx beam pairs to select a Tx and Rx beam pair for communication.

15. The UE of claim 14, wherein the control processor is further configured to:
report the Tx and Rx beam pair to the BS for reselecting at least one Tx beam to transmit data to the UE, or
prioritize beam measurements in at least one beam measurement scenario based on the Tx and Rx beam pair.

16. The UE of claim 14,
wherein the control processor is further configured to determine an orientation of the UE, and
wherein, as at least part of the determining of the orientation of the UE, the control processor is further configured to:
receive raw sensor data associated with the UE from at least one sensor; and
combine the received sensor data using a sensor fusion method to determine the orientation of the UE.

17. The UE of claim 16, wherein the control processor is further configured to:
determine a difference between currently sensed raw sensor data and previously sensed raw sensor data by the at least one sensor,
compute a variance using the difference,
compare the variance with an anomaly threshold,
based on the variance being less than the anomaly threshold, detect absence of an anomaly in the at least one sensor, and
based on the variance being greater than the anomaly threshold, detect presence of the anomaly in the at least one sensor and allowing a round-robin based beam tracking to select the Tx and Rx beam pair for the communication.

18. The UE of claim 14,
wherein the control processor is further configured to determine an angle of arrival (AoA), and
wherein, as at least part of the determining of the AoA, the control processor is further configured to:
define an AoA monitor time window,
monitor the plurality of Tx and Rx beam pairs and measure reference signal received power (RSRP) values and corresponding orientation of the UE for each of the plurality of Tx and Rx beams during the AoA monitor time window,
store highest RSRP values among the measured RSRP values and the corresponding orientation of the UE for each Tx and Rx beam monitored during the AoA monitor time window,
average the highest RSRP values and determine a beam index using the averaged RSRP values,
determine the AoA using the beam index and the orientation of the UE, the determined AoA being in a local coordinate system (LCS), and
convert the AoA in the LCS to an AoA in a global coordinate system using the stored orientation of the UE.

19. The UE of claim 14,
wherein the beam parameters comprise at least one of channel gain, an orientation of the UE, a beam gain pattern, an angle of arrival (AoA) of the plurality of Tx beams, channel gain measurement, and channel correlation in time,
wherein the first threshold indicates a time-varying nature of a channel over which the UE receives the plurality of Tx beams, and
wherein the second threshold comprises a beam selection metric value defined by monitoring the beam selection metric associated with at least one Tx and Rx beam pair from a sorted list of beam selection metric associated with the plurality of Tx and Rx beam pairs in a descending order.

20. The UE of claim 19,
wherein, as at least part of the determining of the beam parameters, the control processor is further configured to determine the beam parameters associated with each of the plurality of Tx and Rx beam pairs at a first-time instance, and
wherein the first-time instance is time at which beam measurements are received by the UE for each Tx and Rx beam pair.

* * * * *